US012663663B2

(12) United States Patent
Li et al.

(10) Patent No.: US 12,663,663 B2
(45) Date of Patent: Jun. 23, 2026

(54) INTEGRATED CAVITY ACOUSTO-OPTICS FOR FREQUENCY DOMAIN OPTICAL COMPUTING AND FREQUENCY COMB GENERATION

(71) Applicant: UNIVERSITY OF WASHINGTON, Seattle, WA (US)

(72) Inventors: Mo Li, Seattle, WA (US); Han Zhao, Seattle, WA (US); Bingzhao Li, Seattle, WA (US)

(73) Assignee: UNIVERSITY OF WASHINGTON, Seattle, WA (US)

( * ) Notice: Subject to any disclaimer, the term of this patent is extended or adjusted under 35 U.S.C. 154(b) by 287 days.

(21) Appl. No.: 18/333,113

(22) Filed: Jun. 12, 2023

(65) Prior Publication Data
US 2023/0408851 A1 Dec. 21, 2023

Related U.S. Application Data

(60) Provisional application No. 63/352,140, filed on Jun. 14, 2022.

(51) Int. Cl.
G02F 1/00 (2006.01)
G02F 1/03 (2006.01)
G02F 1/035 (2006.01)

(52) U.S. Cl.
CPC .......... G02F 1/0072 (2013.01); G02F 1/0311 (2013.01); G02F 1/0356 (2013.01); G02F 2203/15 (2013.01)

(58) Field of Classification Search
None
See application file for complete search history.

(56) References Cited

U.S. PATENT DOCUMENTS 7,187,491 B1 * 3/2007 Bratkovski ........ G02B 26/0875
359/321
10,338,630 B2 * 7/2019 Abel .................... G06N 3/0442
(Continued)

FOREIGN PATENT DOCUMENTS

CN 111538368 B 1/2021
WO 2019/222185 A1 11/2019

OTHER PUBLICATIONS

Balram, K. C. et al. Acousto-optic modulation and optoacoustic gating in piezo-optomechanical circuits. Phys. Rev. Applied 7, 024008 (2017).
(Continued)

*Primary Examiner* — Sharrief I Broome
*Assistant Examiner* — Journey F Sumlar
(74) *Attorney, Agent, or Firm* — Christensen O'Connor Johnson Kindness PLLC

(57) ABSTRACT

Systems and methods for optical computation and acousto-optic modulation are described. The systems and methods comprise acousto-optic modulators with reflectors and transducers used for actuation and modulation of mechanical waves. The systems further comprise multilayer optical computing systems incorporating arrays of acousto-optic modulators. In an embodiment, the acousto-optic modulator comprises a substrate; an optical layer coupled to a first portion of the substrate, the optical layer comprising: a free-standing portion shaped and positioned to define a gap between the free-standing portion of the optical layer and the substrate; and a rib waveguide comprising a photonic crystal, formed in the free-standing portion; and a piezoelectric transducer mechanically coupled to the free-standing portion, wherein the piezoelectric transducer comprises a piezoelectric material and a plurality of conductive electrodes disposed in electrically conductive contact with the piezoelectric material, the plurality of conductive electrodes
(Continued)

extending from a base portion of the piezoelectric transducer.

19 Claims, 32 Drawing Sheets

(56) References Cited

U.S. PATENT DOCUMENTS

| | | | | |
|---|---|---|---|---|
| 2011/0001063 A1* | 1/2011 | Barker | ..................... | G21B 3/00 |
| | | | | 250/493.1 |
| 2014/0070082 A1* | 3/2014 | Guo | ....................... | G01N 21/59 |
| | | | | 250/227.14 |
| 2022/0276149 A1* | 9/2022 | Kuyken | ............. | G01N 21/1702 |

OTHER PUBLICATIONS

Bell, B. A. et al. Spectral photonic lattices with complex long-range coupling. Optica 4, 1433-14336 (2017).

Bochmann, J., Vainsencher, A., Awschalom, D. D. & Cleland, A. N. Nanomechanical coupling between microwave and optical photons. Nat. Phys. 9, 712-716 (2013).

Bogaerts, W. et al. Programmable photonic circuits. Nature 586, 207-216 (2020).

Bai, B. et al., "Towards silicon photonic neural networks for artificial intelligence," Science China Information Sciences; Jun. 2020, vol. 63 160403:1-160403:14 <https://doi.org/10.1007/s11432-020-2872-3>.

Buddhiraju, S. et al. Arbitrary linear transformations for photons in the frequency synthetic dimension. Nat. Commun. 12, 2401 (2021).

Caulfield, H. J. & Dolev, S. Why future supercomputing requires optics. Nat. Photonics 4, 261-263 (2010).

Dong, M. et al., "High-speed programmable photonic circuits in a cryogenically compatible, visible-near-infrared 200 mm CMOS architecture," Nature Photonics; Jan. 2022; 59-65.

Dutt A., et al. A single photonic cavity with two independent physical synthetic dimensions. Science 367, 59-64 (2020).

Estakhri, N. M., Edwards, B. & Engheta, N. Inverse-designed metastructures that solve equations. Science 363, 1333-1338 (2019).

Feldmann, J. et al., "Calculating with light using a chip-scale all-optical abacus," Nature Communications; 8: 1256; 2017; pp. 1-8.

Feldmann, J. et al. Parallel convolutional processing using an integrated photonic tensor core. Nature 589, 52-58 (2021).

Forsch, M. et al. Microwave-to-optics conversion using a mechanical oscillator in its quantum ground state. Nat. Phys. 16, 69 (2020).

Hamerly, R. et al. Large-scale optical neural networks based on photoelectric multiplication. Phys. Rev. X. 9, 021032 (2019).

Jiang, W. et al., Efficient bidirectional piezo-optomechanical transduction between microwave and optical frequency. Nat. Commun. 11, 1166 (2020).

Karim, Muhammed Ahosan Ul. Inkjet-Printed Microelectromechanical Systems: Materials, Process and Devices. UC Berkeley. ProQuest ID: AhosanUlKarim_berkeley_0028E_16466. Merritt ID: ark:/13030/m5xq2285. Retrieved from https://escholarship.org/uc/item/49s588kc. Published 2016. Inkjet-Printed Microelectromechanical Systems: Materials, Process and Devices (escholarship.org).

Kittlaus, E. A. et al. Electrically driven acousto-optics and broadband non-reciprocity in silicon photonics. Nat. Photonics 15, 43-52 (2021).

Kues, M. et al. On-chip generation of high-dimensional entangled quantum states and their coherent control. Nature 546, 622-626 (2017).

Kues, M. et al. Quantum optical microcombs. Nat. Photonics 13, 170-179.

Li, H., Tadesse, S. A., Liu, Q. & Li, M. Nanophotonic cavity optomechanics with propagating acoustic waves at frequencies up to 12 GHz. Optica 2, 826-831 (2015).

Lin, X. et al. All-optical machine learning using diffractive deep neural networks. Science 361, 1004-1008 (2018).

Liu, W. et al. A fully reconfigurable photonic integrated signal processor. Nat. Photonics 10, 190-195 (2016).

Liu, H., Dai, Z., So, D. R. & Le, Q. V. Pay Attention to MLPs. Preprint at https://arxiv.org/abs/2105.08050 (2021).

Lukens, J. M. & Lougovski, P. Frequency-encoded photonic qubits for scalable quantum information processing. Optica 4, 8-16 (2017).

Mirhosseini, M., Sipahigil, A., Kalaee, M. & Painter, O. Superconducting qubit to optical photon transduction. Nature 588, 599-603 (2020).

Nahmias, M. A. et al. Photonic multiply-accumulate operations for neural networks. IEEE J. Sel. Top. Quantum Electron. 26, 7701518 (2019).

Ozawa, T. et al. Synthetic dimensions in integrated photonics: From optical isolation to four-dimensional quantum Hall physics. Phys. Rev. A 93, 043827 (2016).

Prucnal, P. R. & Shastri, B. J. Neuromorphic photonics. (CRC Press, 2017).

Rakich, P. T., Davids, P. & Wang, Z. Tailoring optical forces in waveguides through radiation pressure and electrostrictive forces. Opt. Express 18, 14439 (2010).

Schülein, F. J. et al. Fourier synthesis of radiofrequency nanomechanical pulses with different shapes. Nat. Nanotech. 10, 512-516 (2015).

Shao, L. et al. Microwave-to-optical conversion using lithium niobate thin-film acoustic resonators. Optica 6, 1498-1505 (2019).

Shen, Y. et al. Deep learning with coherent nanophotonic circuits. Nat. Photonics 11, 441-446 (2017).

Solli, D. R. & Jalali, B. Analog optical computing. Nat. Photonics 9, 704-706 (2015).

Spall, J., Guo, X., Barrett, T. D. & Lvovsky A. I. Fully reconfigurable coherent optical vector-matrix multiplication. Opt. Lett. 45, 5752-5755 (2020).

Tait, A. N. et al. Silicon photonic modulator neuron. Phys. Rev. Applied 11, 064043 (2019).

Tian, H. et al., Hybrid integrated photonics using bulk acoustic resonators. Nat. Commun. 11, 3073 (2020).

Tian, H., Liu, J., Siddharth, A. et al. Magnetic-free silicon nitride integrated optical isolator. Nat. Photon. 15, 828-836 (2021). https://doi.org/10.1038/s41566-021-00882-z.

Titchener, J. G. et al. Synthetic photonic lattice for single-shot reconstruction of frequency combs. APL Photonics 5, 030805 (2020).

Tusnin, A. K., Tikan, A. M. & Kippenberg, T. J. Nonlinear states and dynamics in a synthetic frequency dimension. Phys. Rev. A 102, 023518 (2020).

Wang, C., et al. Integrated lithium niobate electro-optic modulators operating at CMOS-compatible voltages. Nature 562 101-104 (2018).

Wang, J. et al. Multidimensional quantum entanglement with large-scale integrated optics. Science 360, 285-291 (2018).

Weiß, M. et al. Multiharmonic frequency-chirped transducers for surface-acoustic-wave optomechanics. Phys. Rev. Applied 9, 014004 (2018).

Xu, X. et al. 11 TOPS photonic convolutional accelerator for optical neural networks. Nature 589, 44-51 (2021).

Yuan, L., Lin, Q., Xiao, M. & Fan, S. Synthetic dimension in photonics. Optica 5, 1396-1405 (2018).

Zhang, M., Wang, C., Kharel, P., Zhu, D., Lončar, M. Integrated lithium niobate electro-optic modulators: when performance meets scalability. Optica 8 652-657 (2021).

Zhang, H. et al. An optical neural chip for implementing complex-valued neural network. Nat. Commun. 12, 457 (2021).

Zhou, T. et al. Large-scale neuromorphic optoelectronic computing with a reconfigurable diffractive processing unit. Nat. Photonics 15, 367-373 (2021).

* cited by examiner

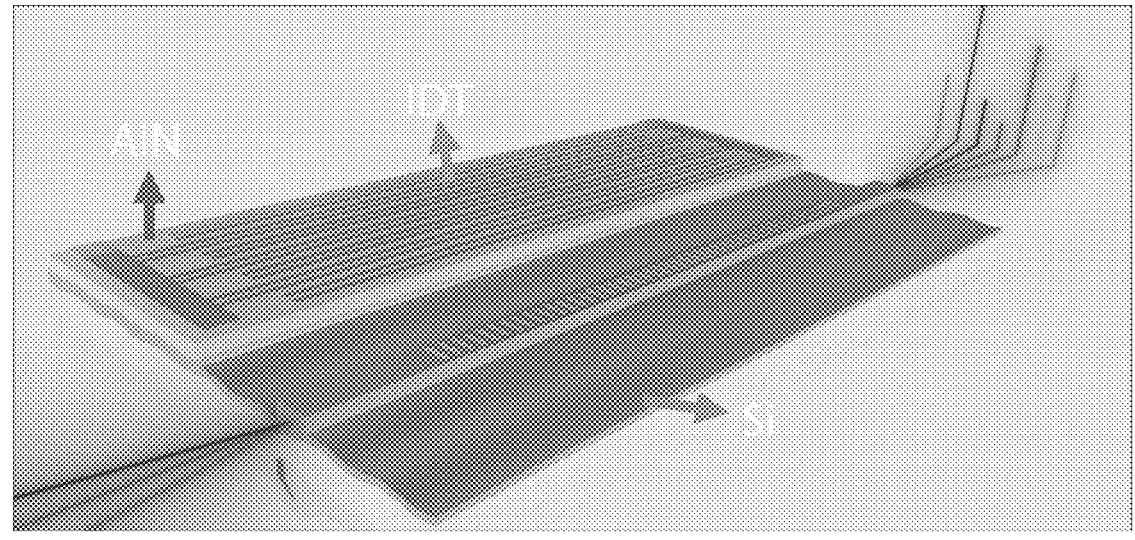
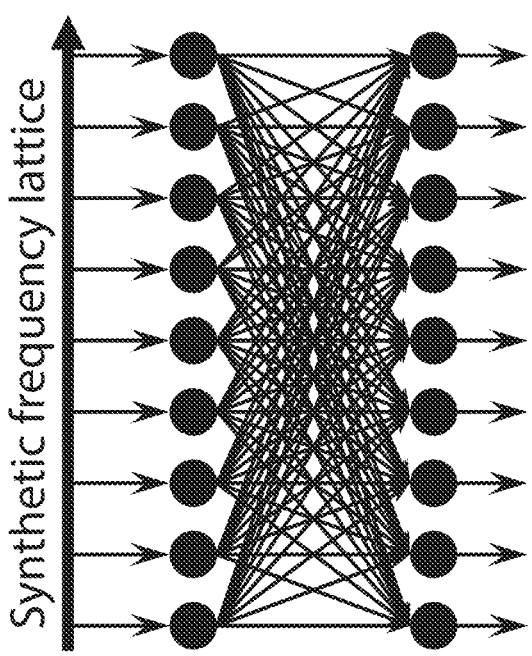
FIG. 1A

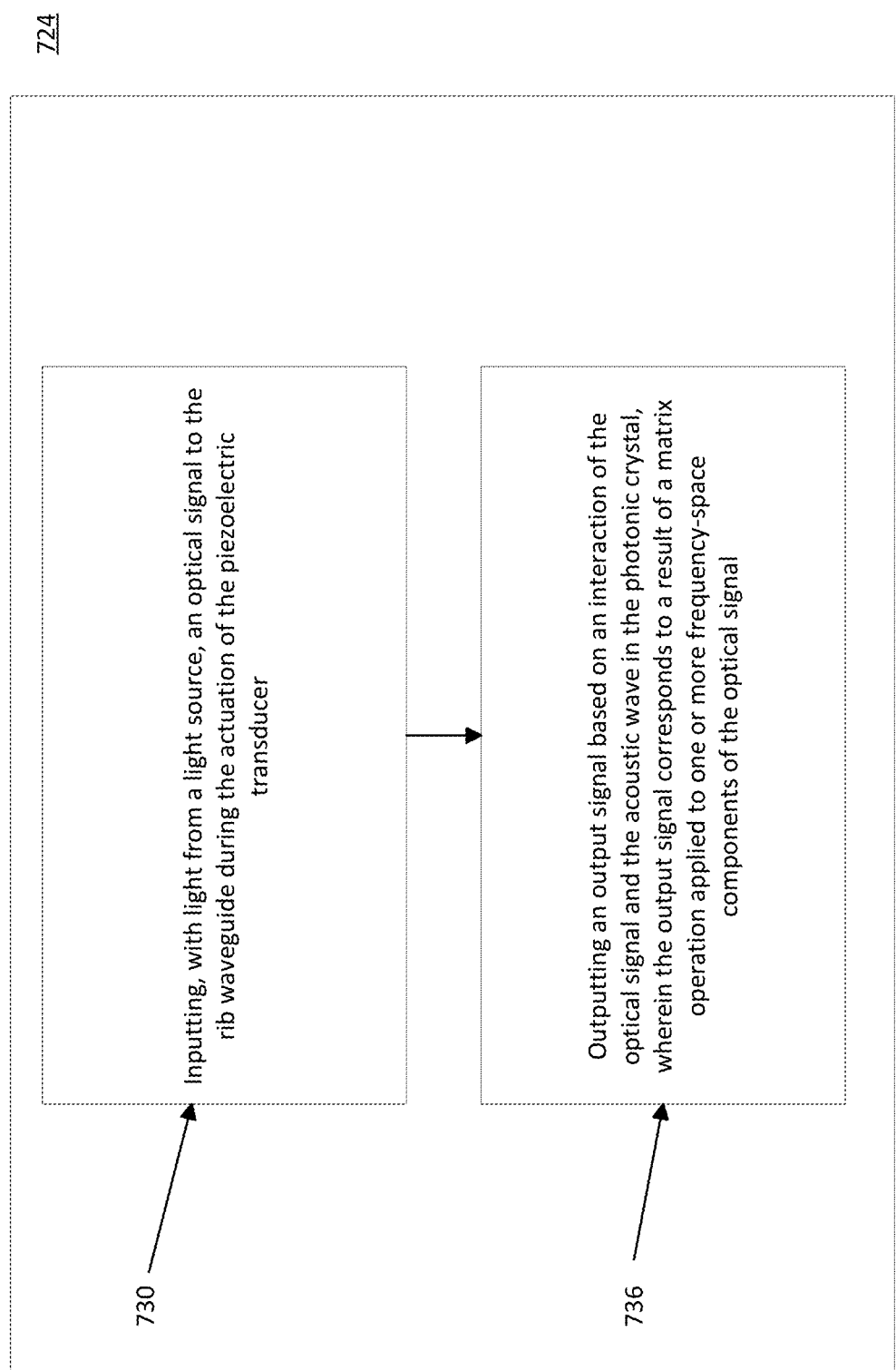

724

730 — Inputting, with light from a light source, an optical signal to the rib waveguide during the actuation of the piezoelectric transducer 736 — Outputting an output signal based on an interaction of the optical signal and the acoustic wave in the photonic crystal, wherein the output signal corresponds to a result of a matrix operation applied to one or more frequency-space components of the optical signal

FIG. 7C

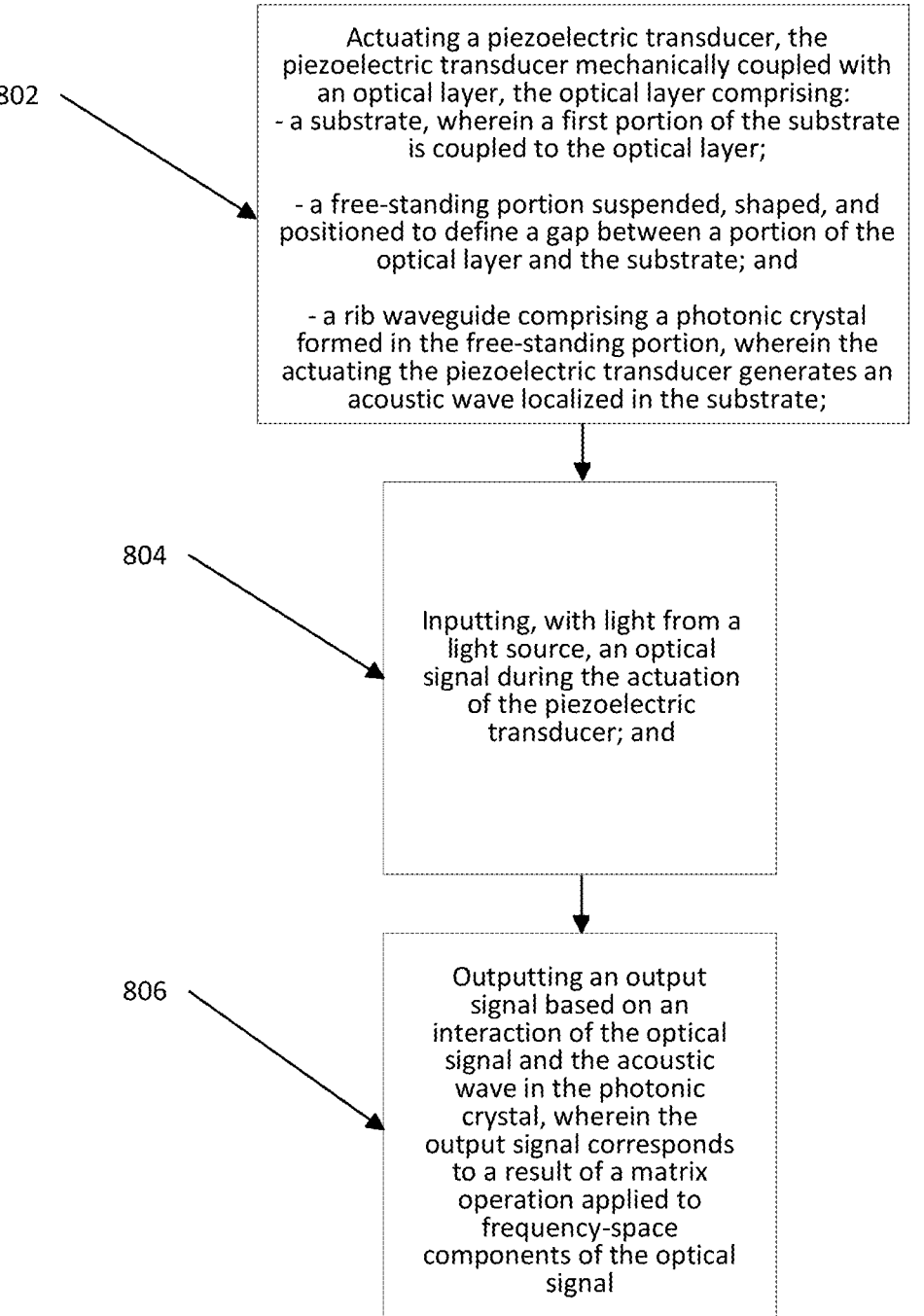

802

Actuating a piezoelectric transducer, the piezoelectric transducer mechanically coupled with an optical layer, the optical layer comprising:
- a substrate, wherein a first portion of the substrate is coupled to the optical layer;

- a free-standing portion suspended, shaped, and positioned to define a gap between a portion of the optical layer and the substrate; and

- a rib waveguide comprising a photonic crystal formed in the free-standing portion, wherein the actuating the piezoelectric transducer generates an acoustic wave localized in the substrate;

800

804

Inputting, with light from a light source, an optical signal during the actuation of the piezoelectric transducer; and

806

Outputting an output signal based on an interaction of the optical signal and the acoustic wave in the photonic crystal, wherein the output signal corresponds to a result of a matrix operation applied to frequency-space components of the optical signal

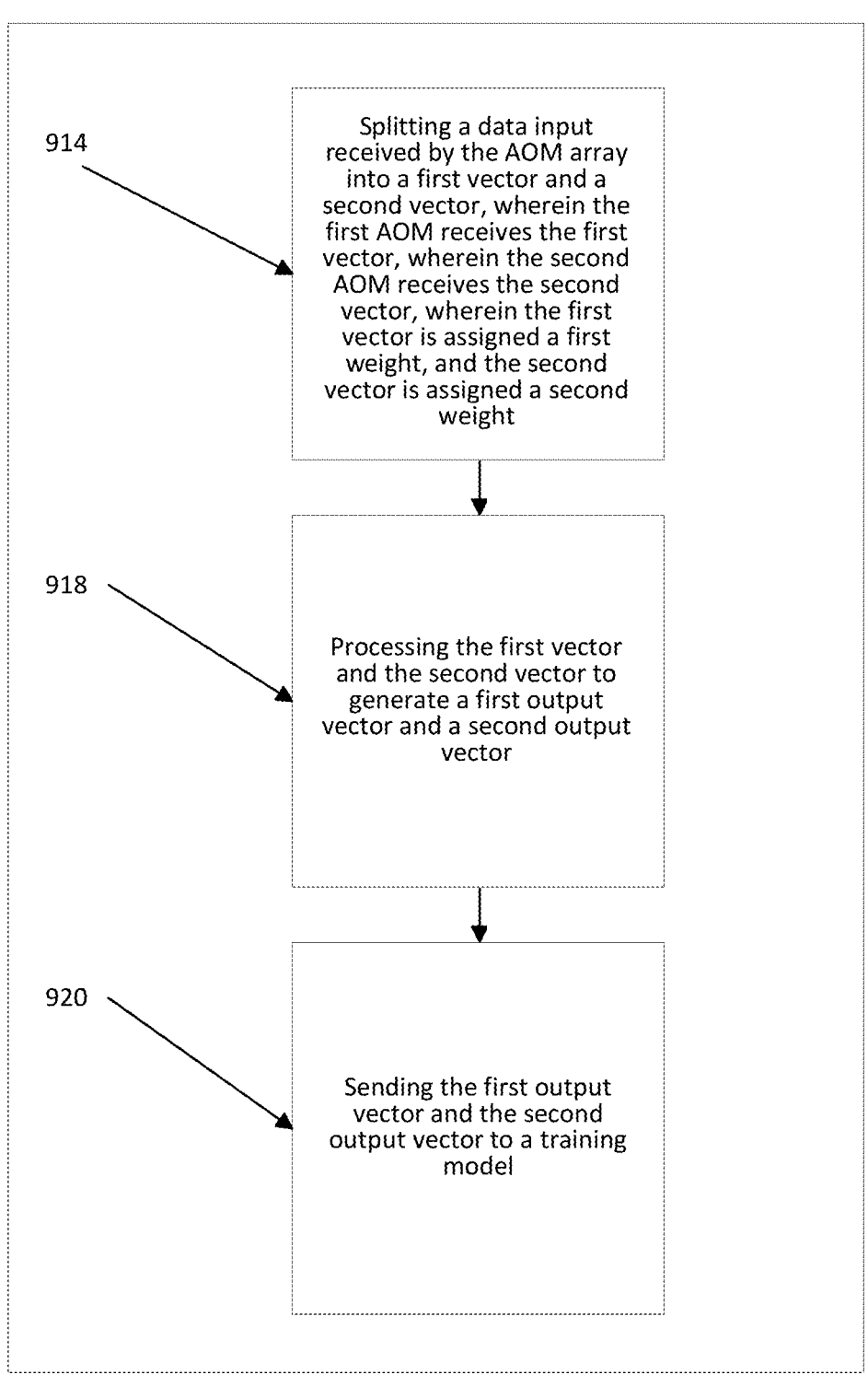

914

Splitting a data input received by the AOM array into a first vector and a second vector, wherein the first AOM receives the first vector, wherein the second AOM receives the second vector, wherein the first vector is assigned a first weight, and the second vector is assigned a second weight

918

Processing the first vector and the second vector to generate a first output vector and a second output vector

920

Sending the first output vector and the second output vector to a training model

FIG. 9B

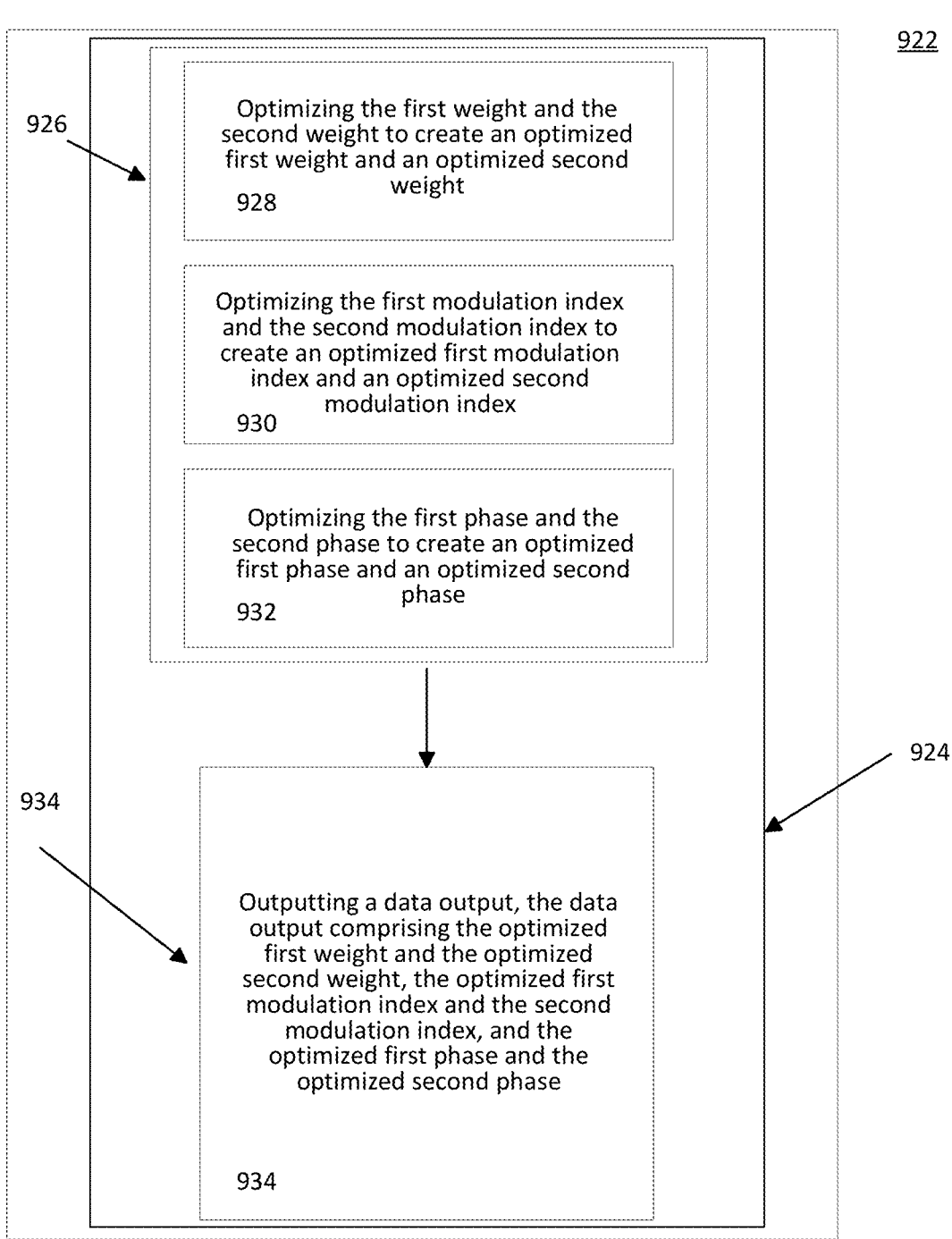

922

926

Optimizing the first weight and the second weight to create an optimized first weight and an optimized second weight
928

Optimizing the first modulation index and the second modulation index to create an optimized first modulation index and an optimized second modulation index
930

Optimizing the first phase and the second phase to create an optimized first phase and an optimized second phase
932

924

934

Outputting a data output, the data output comprising the optimized first weight and the optimized second weight, the optimized first modulation index and the second modulation index, and the optimized first phase and the optimized second phase

INTEGRATED CAVITY ACOUSTO-OPTICS FOR FREQUENCY DOMAIN OPTICAL COMPUTING AND FREQUENCY COMB GENERATION

CROSS-REFERENCE TO RELATED APPLICATION

This application claims the benefit of U.S. Provisional Application No. 63/352,140, filed Jun. 14, 2022, which is incorporated herein by reference in its entirety.

STATEMENT OF GOVERNMENT LICENSE RIGHTS

This invention was made with Government support under Grant Nos. 1641109 and EFMA-1741656 and OIA-2040527, awarded by the National Science Foundation. The Government has certain rights in the invention.

BACKGROUND

Analog optical computing encodes and processes data using continuously variable quantities of light. While optical nonlinearity requires high power expense, linear optical components can perform data movement, temporal-spatial signal processing and multiply-accumulate operations with potentially unparalleled bandwidth, speed, and energy efficiency.

SUMMARY

In an aspect, the present disclosure provides an acousto-optic modulator (AOM). In an embodiment, the AOM comprises a substrate; an optical layer coupled to a first portion of the substrate, the optical layer comprising: a free-standing portion shaped and positioned to define a gap between the free-standing portion of the optical layer and the substrate; and a rib waveguide comprising a photonic crystal, formed in the free-standing portion; and a piezoelectric transducer mechanically coupled to the free-standing portion, wherein the piezoelectric transducer comprises a piezoelectric material and a plurality of conductive electrodes disposed in electrically conductive contact with the piezoelectric material, the plurality of conductive electrodes extending from a base portion of the piezoelectric transducer.

In another aspect, the present disclosure provides an optical computation system, the system. In an embodiment, the optical computing system comprises a piezoelectric transducer, the piezoelectric transducer mechanically coupled with an optical layer, the optical layer comprising: a substrate, wherein a first portion of the substrate is coupled to the optical layer; a free-standing portion suspended shaped and positioned to define a gap between a portion of the optical layer and the substrate; and a rib waveguide comprising a photonic crystal formed in the free-standing portion, wherein an actuation of the piezoelectric transducer generates an acoustic wave localized in the substrate; a controller comprising a memory and one or more processors, wherein the controller is operably connected to the piezoelectric transducer, wherein the memory comprises computer-executable instructions stored thereon that, if executed by the one or more processors, cause the system to perform: inputting, with light from a light source, an optical signal to the rib waveguide during the actuation of the piezoelectric transducer; and outputting an output signal based on an interaction of the optical signal and the acoustic wave in the photonic crystal, wherein the output signal corresponds to a result of a matrix operation applied to one or more frequency-space components of the optical signal.

In another aspect, the present disclosure provides a method of optical computation. In an embodiment, the method comprises actuating a piezoelectric transducer, the piezoelectric transducer mechanically coupled with an optical layer, the optical layer comprising: a substrate, wherein a first portion of the substrate is coupled to the optical layer; a free-standing portion suspended shaped and positioned to define a gap between a portion of the optical layer and the substrate; and a rib waveguide comprising a photonic crystal formed in the free-standing portion, wherein the actuating the piezoelectric transducer generates an acoustic wave localized in the substrate; inputting, with light from a light source, an optical signal during the actuation of the piezoelectric transducer; and outputting an output signal based on an interaction of the optical signal and the acoustic wave in the photonic crystal, wherein the output signal corresponds to a result of a matrix operation applied to frequency-space components of the optical signal.

BRIEF DESCRIPTION OF THE DRAWINGS

Non-limiting and non-exhaustive embodiments of the subject disclosure are described with reference to the following figures, wherein like reference numerals refer to like parts throughout the various views unless otherwise specified.

FIG. 1A is a perspective illustration of an acousto-optic modulator (AOM) (top) according to an embodiment of the present disclosure, and a synthetic frequency lattice for optical computing (bottom) according to an embodiment of the present disclosure;

FIG. 7C is a non-limiting flow chart of operations of the controller of the optical computation system of FIG. 7A, according to an embodiment of the present disclosure;

FIG. 8 is a non-limiting method, also implementable as a system executing operations, relating to optical computation, according to an embodiment of the present disclosure;

FIG. 9B is a non-limiting flow chart of operations of the controller of the multilayer optical computing system of FIG. 9A, according to an embodiment of the present disclosure;

FIG. 9C is a non-limiting flow chart of operations of the training model of the multilayer optical computing system of FIG. 9A, according to an embodiment of the present disclosure;

DETAILED DESCRIPTION

Figure 1B:
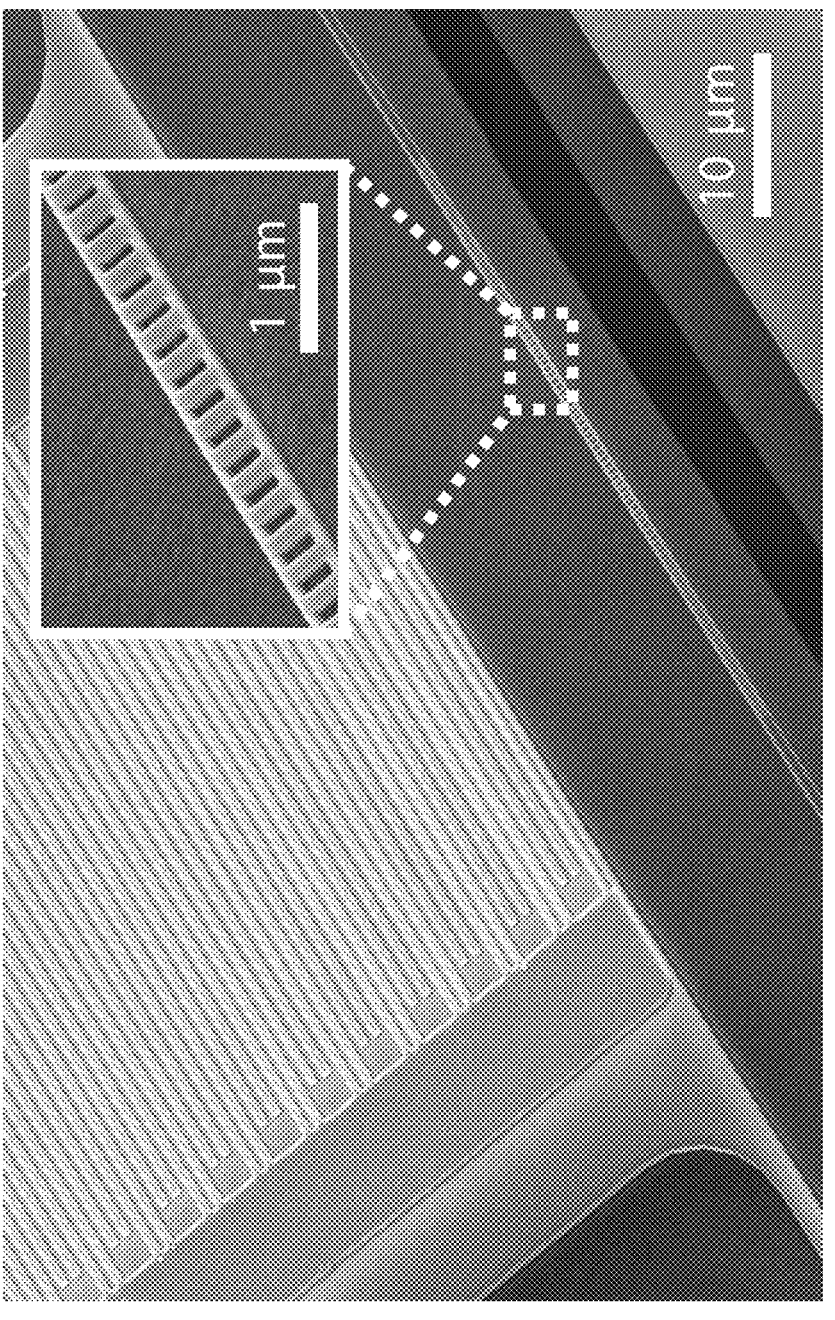
FIG. 1B is a scanning electron microscopy (SEM) image of a portion of an AOM with an inset image of a photonic crystal of the AOM according to an embodiment of the present disclosure.

While illustrative embodiments have been illustrated and described, it will be appreciated that various changes can be made therein without departing from the spirit and scope of the invention.

As the current digital electronic computing technologies approach the physical limit, such advantages of optics motivate the recent development in building optical accelerators that can sustain the ever-growing data demand at the hardware level. Integrated photonics provides a powerful optical computing platform that benefits from scalable fabrications and integration compatibility with electronic circuits, affording architectures with rapid programmability. Considerable progress has been made in building integrated photonic neural networks with high data throughput by incorporating time and/or wavelength division multiplexing. However, realizing large-scale, fully connected networks on photonic chips can be very challenging. Most N×N optical computing layers based on spatial encoding require $O(N_2)$ scaling of photonic components (quadratic scaling with respect to N), occupying huge device footprints compared to the electronic counterparts. Such footprint-inefficient scaling represents one of the roadblocks for integrated photonic computing.

The emerging notion of synthetic frequency dimension provides a promising strategy to drastically scale up the optical computing systems in both classical and quantum regimes. Encoding information as coherent optical fields on a synthetic frequency lattice increases the fan-in/fan-out of a single photonic logic unit, thus improving the scalability of data processing by orders of magnitude. The implementation of frequency-domain N×N optical networks depends in part on efficient modulators that link N discrete nodes via coherent frequency conversions. While the electro-optic modulators provide broadband modulation, integrated acousto-optic modulators can provide improved modulation efficiency and large modulation depth with significant reduction in device footprint by exploiting the strong optomechanical interaction between co-localized optical and acoustic modes. Recent thin-film lithium niobate modulators have reached modulation depth that can couple a few sidebands, but a single device that can compose a fully connected computing layer on a sizable synthetic frequency lattice remains unrealized.

On-chip acousto-optic modulation includes balancing optomechanical coupling with piezoelectric transduction on a monolithic material platform to determine an optimum configuration. To that end, heterogeneous integration of silicon on insulator (SOI) with complementary metal-oxide-semiconductor (CMOS)-compatible piezoelectric materials such as aluminum nitride (AlN) are described for high-performance large-scale integrated modulators, representing integral building blocks for data-intensive frequency-domain optical computing systems.

Embodiments of the present disclosure include photonic devices structured to perform scalable matrix-vector multiplications (MVM))—a computation step that forms a basis of algorithms such as neural networks—in the synthetic frequency dimension by leveraging an efficient nanophotonic cavity acousto-optic modulator on the AlN-on-SOI platform. The large dynamic modulation depth arising from the engineered strong electro-optomechanical coupling enables the coherent frequency conversions among multiple sidebands spanning a synthetic frequency lattice. In this way, a single such modulator performs as a large-scale, fully connected computing layer that performs linear transformations on the complex-valued vector inputs encoded as spectrally coherent optical fields as illustrated in FIG. 1A. Advantageously, embodiments of the present disclosure exhibit persistent long-range spectral phase coherence of the MVM operations and represent a component for highly scalable and hardware-efficient integrated photonic computing architecture based on cascaded layers of modulators.

As used herein, "homodyne" refers to homodyne detection, a method of extracting information encoded as modulation of the phase and/or frequency of an oscillating signal, by comparing that signal with a standard oscillation that would be identical to the signal if it carried null information.

As used herein, "heterodyne" refers to heterodyne detection or optical heterodyne detection, a method of extracting information encoded as modulation of the phase, frequency, or both of electromagnetic radiation in the wavelength band of visible or infrared light.

In an aspect, the present disclosure provides an acousto-optic modulator (AOM). In an embodiment, the AOM comprises a substrate; an optical layer coupled to a first portion of the substrate, the optical layer comprising: a free-standing portion shaped and positioned to define a gap between the free-standing portion of the optical layer and the substrate; and a rib waveguide comprising a photonic crystal, formed in the free-standing portion; and a piezoelectric transducer mechanically coupled to the free-standing portion, wherein the piezoelectric transducer comprises a piezoelectric material and a plurality of conductive electrodes disposed in electrically conductive contact with the piezoelectric material, the plurality of conductive electrodes extending from a base portion of the piezoelectric transducer.

Figure 5A:
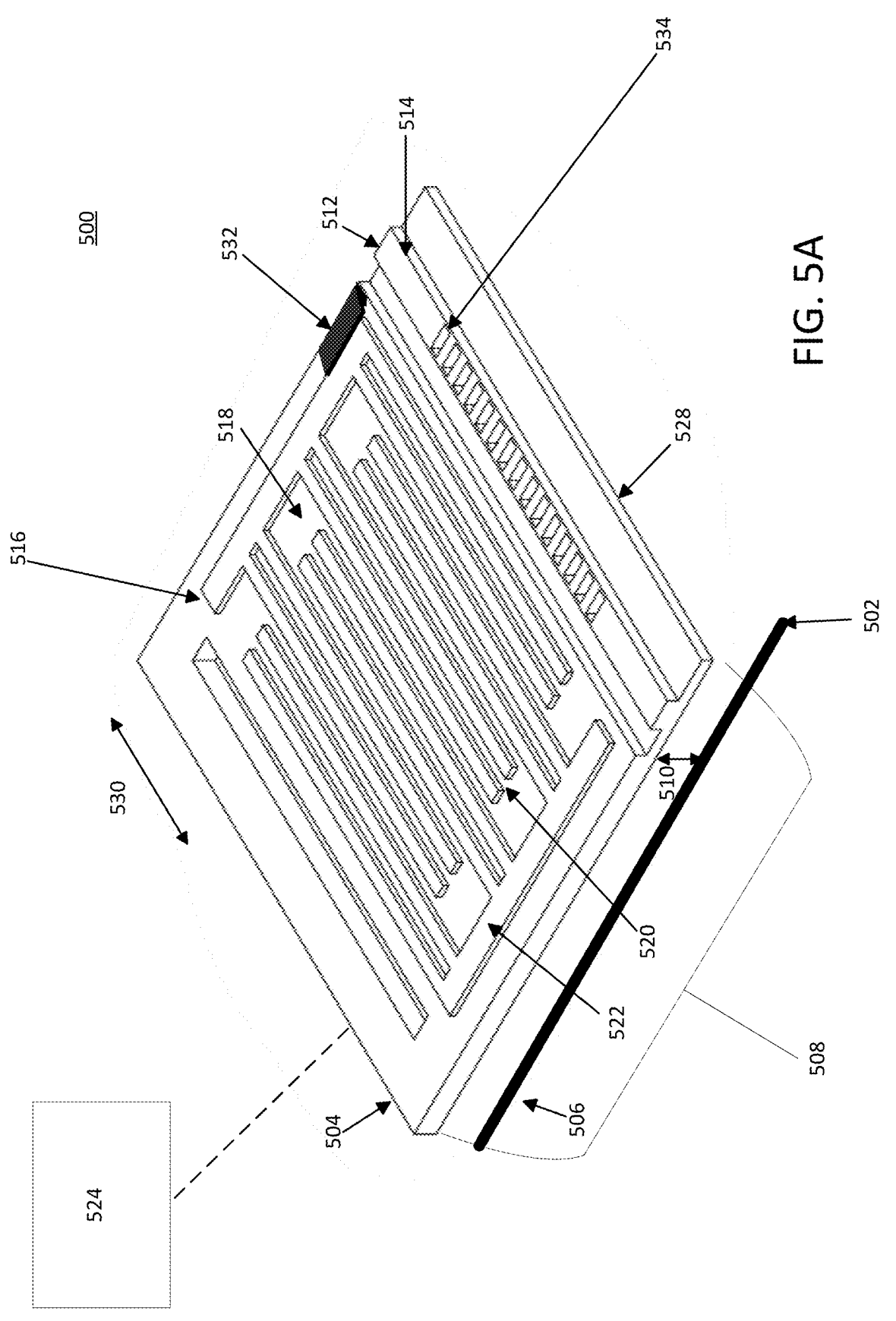
FIG. 5A is a non-limiting illustration of an acousto-optic modulator (AOM), according to an embodiment of the present disclosure.

In this regard, attention is directed to FIG. 5A in which an AOM 500 according to an embodiment of the present disclosure is illustrated. As shown in FIG. 5A, the AOM 500 includes a substrate 502, which serves as a foundation for the AOM 500. In the illustrated embodiment, the substrate 502 comprises a first portion 506 that is coupled to an optical layer 504. In the illustrated embodiment, the optical layer 504 include or otherwise comprise a free-standing portion 508 that is shaped and positioned to define a gap 510 between the free-standing portion 508 of the optical layer 504 and the substrate 502. In the illustrated embodiment, the optical layer 504 includes or otherwise comprises a rib waveguide 512 comprising a photonic crystal 514. In an embodiment, the photonic crystal 514 is formed in the free-standing portion 508. The optical layer 504 includes or otherwise comprises a piezoelectric transducer 516 mechanically coupled to the free-standing portion 508. In the illustrated embodiment, the piezoelectric transducer 516 comprises piezoelectric material 518 and a plurality of conductive electrodes 520 disposed in electrically conductive contact with the piezoelectric material 518. In the illustrated embodiment, the plurality of conductive electrodes 520 comprises extending from a base portion 522 of the piezoelectric transducer 516. In an embodiment, when the plurality of conductive electrodes 520 are configured to provide transmission of energy in the form of a radiofrequency (RF) signal driving the piezoelectric transducer 516. As described further herein, providing the RF signal to the piezoelectric transducer 516 in turn produces an acoustic wave that interacts with an optical light or optical signal traveling through the rib waveguide 512.

As above, the AOM 500 includes or otherwise comprises a substrate 502. In one or more embodiments, the substrate 502 comprises a silicon on insulator (SOI) material. In this regard, and as discussed further herein, the advantage(s) of utilizing a SOI material is the high optical refractive index of silicon, the high material quality of SOI, the ease of fabricating free-standing silicon layer by removing the buried oxide and the low-cost and availability of the SOI wafers. In one embodiment, the substrate 502 comprises a thin layer of silicon and a layer of silicon dioxide on a silicon substrate. In another embodiment, the substrate 502 comprises a thin layer of silicon on an insulator substrate such as sapphire.

As shown in FIG. 5A, the AOM 500 includes or otherwise comprises an optical layer 504 configured to transmit an optical signal. In one or more embodiments, the optical layer 504 is coupled to a first portion 506 of the substrate 502. In one or more embodiments, the optical layer 504 comprises a free-standing portion 508, which is shaped and positioned to define a gap 510 located between the free-standing portion 508 of the optical layer 504 and the substrate 502. In this regard, and as discussed further herein, the gap 510 provides efficient modulation of the acoustic waves as the free-standing portion 508 confines the acoustic wave. In an embodiment, as an RF signal drives the piezoelectric transducer 516, the resulting acoustic wave reverberates within the free-standing portion 508. In an additional embodiment, the acoustic wave subsequently propagates to the rib waveguide 512.

As above and as shown in FIG. 5A, the AOM 500 includes or otherwise comprises an optical layer 504. In one or more embodiments, the optical layer 504 comprises a rib waveguide 512 configured to confine and transmit an optical signal received by the rib waveguide 512. In one or more embodiments, the rib waveguide 512 comprises a photonic crystal 514. In one or more embodiments, the photonic crystal 514 is disposed in the free-standing portion 508. In an embodiment, an acoustic wave reverberates within the confines of the free-standing portion 508. In an additional embodiment, the acoustic wave results from an RF signal driving the piezoelectric transducer 516. In an additional embodiment, as the acoustic wave traverses within the confines of the free-standing portion 508, an optical signal received by the waveguide 512 is modulated with efficiency. In an additional embodiment, the photonic crystal 514 efficiently modulates the acoustic wave such that multiple sidebands generated by the modulation are resolved. In this regard, and as further discussed herein, the photonic crystal 514 is etched in a suspended silicon rib waveguide, such as the rib waveguide 512 of the AOM 500. In one or more embodiments, the photonic crystal 514 is a one-dimensional photonic crystal cavity, which has the advantage of a very small area and a very high optical resonance quality factor (Q factor). In one embodiment, a periodicity of the photonic crystal 514 comprises 350 nanometers (nm), which forms a reflector with high reflectance to form the cavity. While the illustrated periodicity is 350 nm, it is foreseeable that other ranges of can be utilized for the periodicity of the photonic crystal 514 and within the scope of the present disclosure. While a rib waveguide 512 is illustrated, other waveguides can be utilized and are within the scope of the present disclosure. In one embodiment, waveguides such as side coupled waveguides are applicable.

Figure 2A:
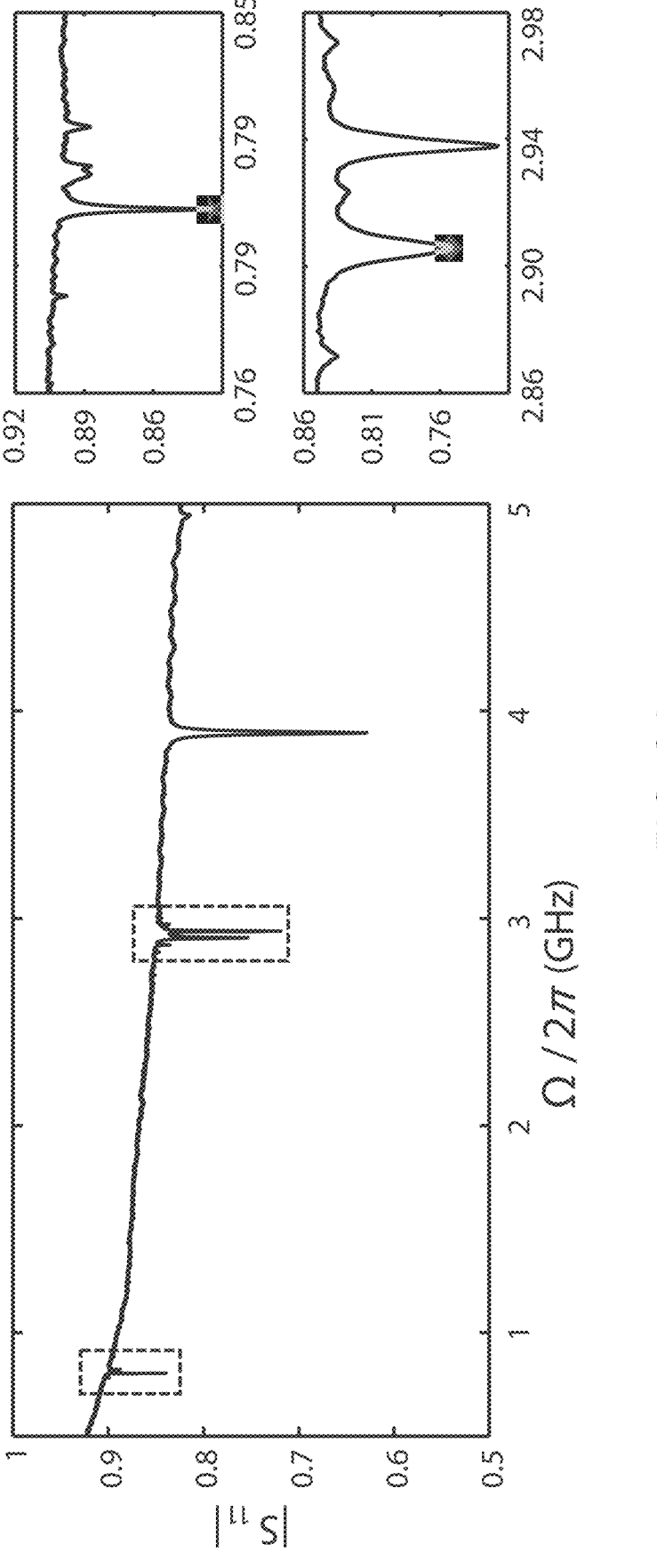
FIG. 2A is a reflection (amplitude) spectrum, illustrating mechanical resonances in the zoom-in spectra according to an embodiment of the present disclosure.
Figure 5B:
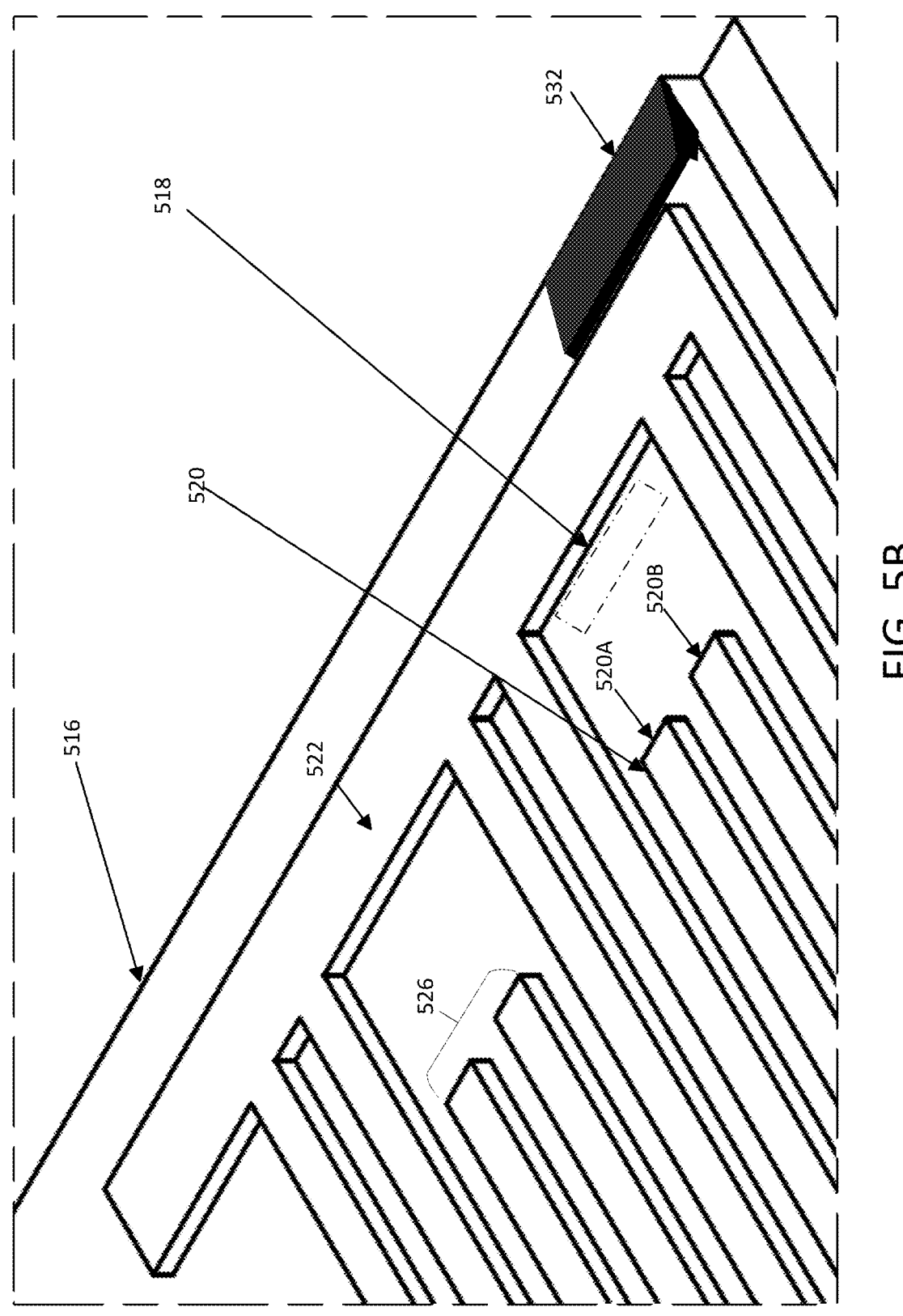
FIG. 5B is a close-up of a section of the AOM of FIG. 5A, according to an embodiment of the present disclosure.

Referring to FIG. 5B, in one or more embodiments, the piezoelectric transducer 516 includes or otherwise comprises an interdigital transducer (IDT). In one embodiment, the IDT is disposed overlying the optical layer 504. In one or more embodiments, the piezoelectric transducer 516 includes or otherwise comprises in addition to, or in lieu of an IDT, the following: a bulk acoustic wave (BAW) transducer or a shear-horizontal (SH) mode transducer. In one embodiment, the IDT comprises conductive electrodes, such as the plurality of conductive electrodes 520. In one or more embodiments, a distance between pairs of conductive electrodes, such as conductive electrodes 520A and 520B noting one pair of the plurality of conductive electrodes 520, defines a period 526. In an embodiment, excitation of the plurality of the conductive electrodes 520 occurs at one or more frequencies, where an angular frequency (52) of the one or more frequencies is greater than a total optical cavity decay rate (K) of the optical layer 504. As shown in FIG. 2A and Example 2, the mechanical resonances have pronounced modulation efficiencies with the above stated parameters. In one embodiment, the plurality of conductive electrodes 520 comprises a period 526 in a range of 100 nanometers (nm)-10 micrometers (μm). In an additional embodiment, the plurality of conductive electrodes 520 comprises a period 526 of 3 micrometers (μm), which determines the acoustic wavelength.

Figure 5C:
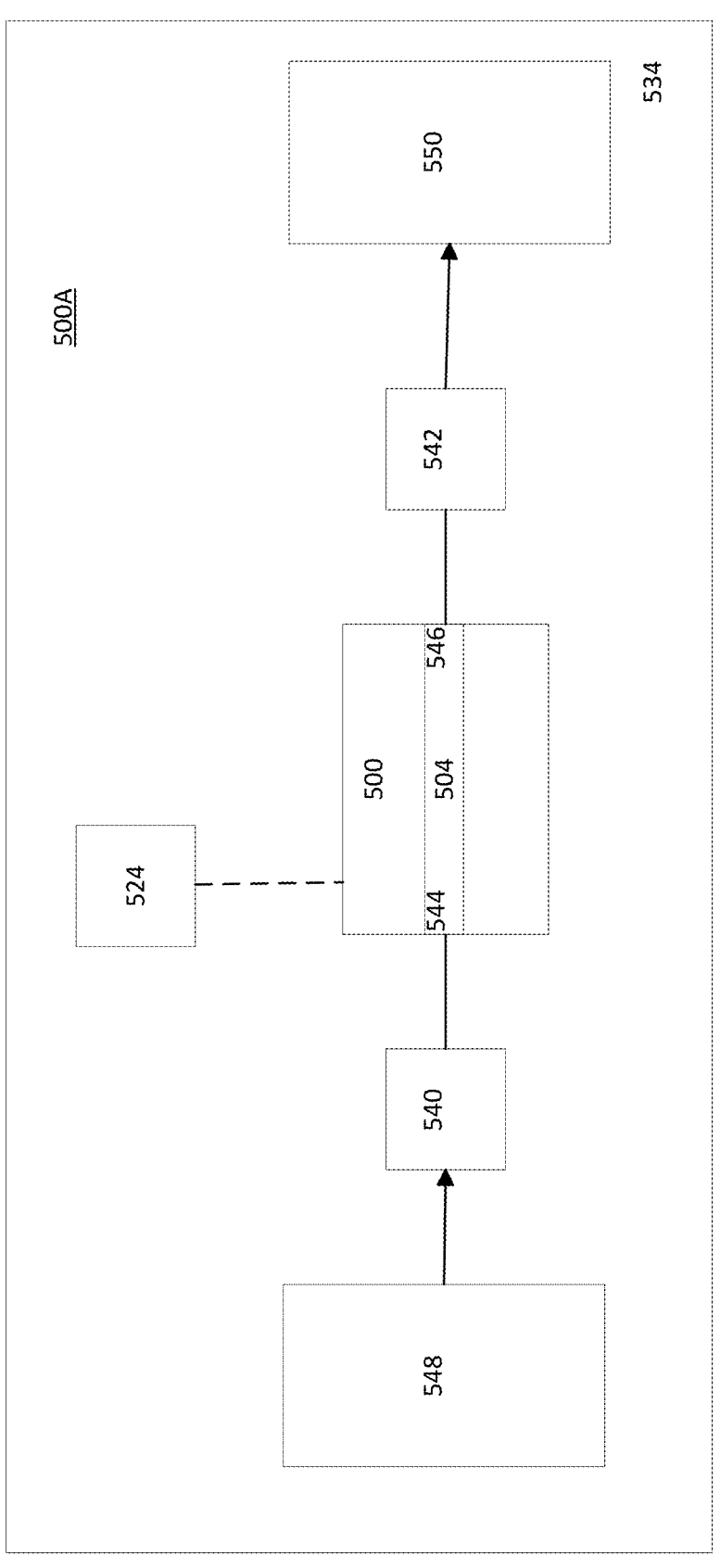
FIG. 5C is a non-limiting illustration of a system incorporating the AOM of FIG. 5A, according to an embodiment of the present disclosure.
Figure 5D:
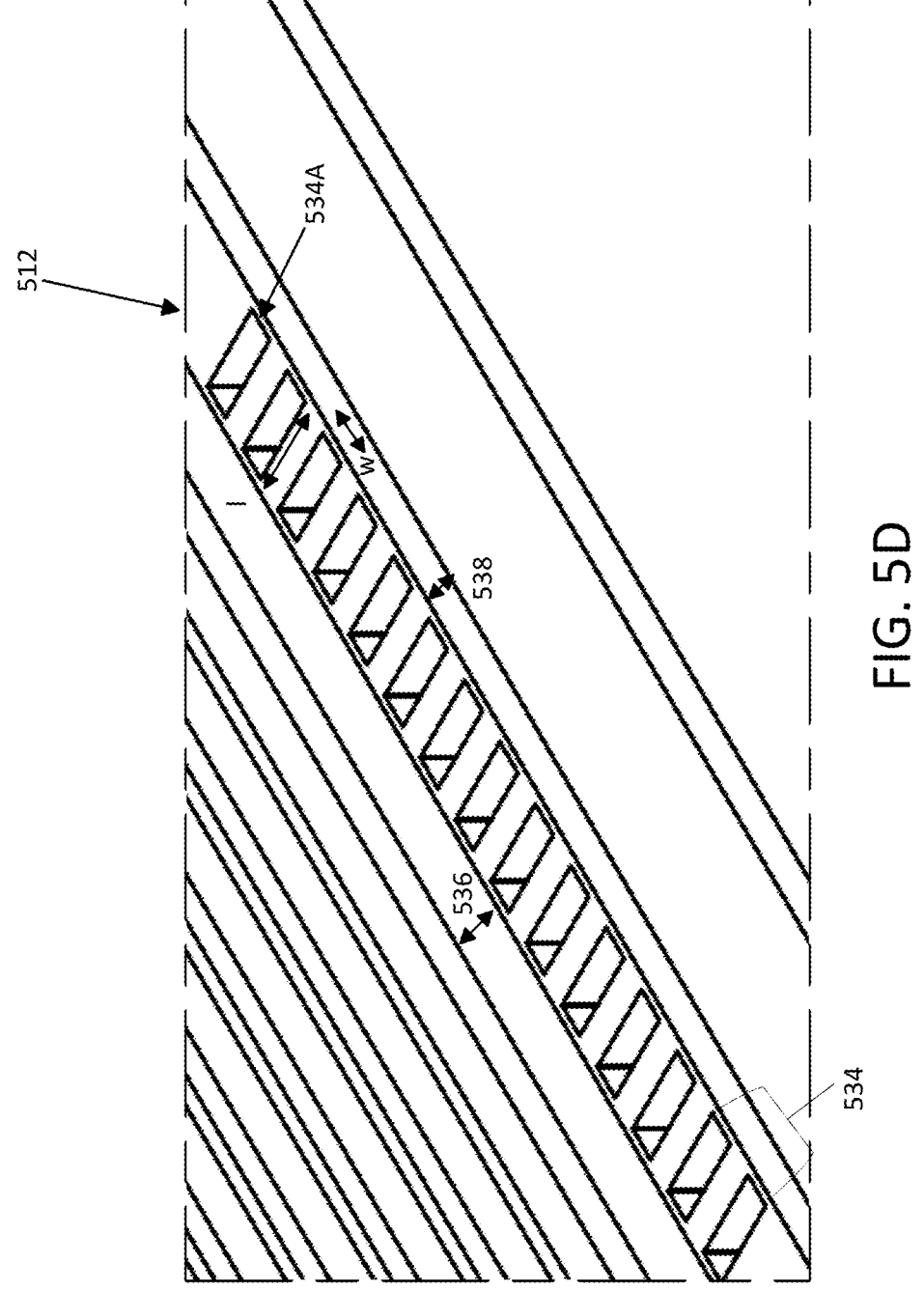
FIG. 5D is a close-up of a section of the AOM of FIG. 5A, according to an embodiment of the present disclosure.

FIG. 5D illustrates a section of the AOM 500, specifically the photonic crystal 514. As shown in FIG. 5D, the photonic crystal 514 defines a plurality of recesses 534 in the rib waveguide 512. In one embodiment, a recess 534A of the plurality of recesses 534 is characterized by a width w. In one or more embodiments, the width w, normal to a major axis of the rib waveguide 512, is a range of about 100 nm to about 500 nm. In one embodiment, the width w, normal to a major axis of the rib waveguide 512, is in a range of about 50 nm to about 200 nm. These geometries determine, at least in part, the optical resonance frequency and quality factor of the photonic crystal 514, and, thereby, affect the AOM 500 modulation efficiency.

Still referring to FIG. 5D, in one embodiment, a recess 534A of the plurality of recesses 534 is characterized by a length 1. In one or more embodiments, the length 1, aligned with a major axis of the rib waveguide 512, is in a range of about 100 nm to about 1000 nm. In one embodiment, the length 1, aligned with a major axis of the rib waveguide 512, is in a range of about 350 nm to about 400 nm.

FIG. 5D further illustrates a section of the AOM 500 including the rib waveguide 512. As shown, the piezoelectric transducer 516 and the rib waveguide 512 define a gap 536 therebetween. In one or more embodiments, the gap 536 is characterized by a width in a range of about 0 μm to about 1000 μm. In one embodiment, the width of the gap 536 is in a range of about 5 μm to about 15 μm, which makes the photonic crystal cavity 534 situated at the anti-node of the acoustic wave generated by the IDT to achieve high modulation efficiency.

FIG. 5D further illustrates a section of the AOM 500 including the rib waveguide 512. In one or more embodiments, the rib waveguide 512 is characterized by a strip height 538. In one or more embodiments, the strip height 538 is in a range of about 100 nm to about 1000 nm. In one embodiment, the range is between about 100 nm to about 300 nm, which determines, at least in part, the optical resonance frequency and quality factor of the cavity.

Referring back to FIG. 5A, the AOM 500 includes or otherwise comprises a piezoelectric transducer 516 mechanically coupled to the free-standing portion 508. A piezoelectric region, such as the piezoelectric transducer 516, is configured to be driven with an RF signal to excite acoustic waves. In one or more embodiments, the piezoelectric transducer 516 includes or otherwise comprises a piezoelectric material 518. In one or more embodiments, the piezoelectric transducer 516 includes or otherwise comprises a plurality of conductive electrodes 520 disposed in electrically conductive contact with the piezoelectric material 518. In one or more embodiments, the plurality of conductive electrodes 520 extends from a base portion 522 of the piezoelectric transducer 516. In one or more embodiments, the piezoelectric transducer 516 includes or otherwise comprises an aluminum nitride (AlN) layer 532, also illustrated in FIG. 5B. In one or more embodiments, the piezoelectric transducer 516 includes or otherwise comprises one or more of: zinc oxide (ZnO), gallium arsenide (GaAs), and lead zirconate titanate (PZT), which are commonly used piezoelectric materials in integrated devices. In one or more embodiments, the piezoelectric transducer 516 includes or otherwise comprises a layer in lieu of, or in addition to, AlN layer 532, be it ZnO, GaAs, and/or PZT, that is characterized by a thickness in a range of about 1 nanometer (nm) to about 1000 nm. In one embodiment, the thickness comprises a range of about 250 nm to about 1000 nm to achieve efficient electromechanical excitation of acoustic waves.

In one or more embodiments, the piezoelectric transducer 516 is on top of the silicon membrane, or on the bottom side of the silicon membrane.

Still referring to FIG. 5A, in one embodiment, the piezoelectric transducer 516 is conductively coupled to a power source 524. In an embodiment, the power source 524 is configured to provide electrical power to the piezoelectric transducer 516, such as electrical power configured to excite the piezoelectric transducer 516 to generate an acoustic wave. In one embodiment, an RF frequency range at which the power source 524 resonantly excites the IDT comprises a range of 1 MHz-1000 GHz. In one embodiment, the range is between about 500 MHz to about 8 GHz. In an embodiment, the range is between about 1 MHz and about 100 GHz, such as for microwave applications.

Still referring to FIG. 5A, the AOM 500 includes a free-edge reflector 528 disposed on a side of the optical layer 504 opposite the rib waveguide 512. In an additional embodiment, the free-edge reflector 528 is configured to reverberate an acoustic wave in the substrate 502 on a plane 530 relative to the side of the optical layer 504 opposite the rib waveguide 512. In one or more embodiments, the AOM 500 comprises a reflection component (not shown) in lieu of or in addition to the free-edge reflector 528. Examples of the reflection component can include, but are not limited to, Distributed Bragg reflector (or Bragg reflector), a phononic bandgap reflector, such as a phononic crystal reflector, a metal pad reflector. Use of a Bragg reflector 626 is utilized and is described further herein with respect to FIG. 6.

FIG. 5C is a schematic illustration of a system 500A including an AOM 500 according to an embodiment of the present disclosure. As shown, the system 500A includes an AOM 500 connected to a power source 524, a grating coupler 540 optically coupled to an end 544 of the optical layer 504. In an embodiment, AOM 500 is an example of AOM 500 discussed further herein with respect to FIG. 5A. In an additional embodiment, the grating coupler 540 is configured to be used in conjunction with a grating coupler 542, wherein the grating coupler 542 is coupled to end 546. In one embodiment, the grating coupler 540 is a first grating coupler, and the grating coupler 542 is a second grating coupler. In an additional embodiment, the grating coupler 540 is an input coupler, and the grating coupler 542 is an output coupler. In the same embodiment or in an additional embodiment, the grating coupler 540 is configured to receive an optical input from a coherent light source 548, and the grating coupler 542 is configured to produce an optical output to an optical collection device 550, such as photodetectors and optical spectrum analyzers. In addition to, or in lieu of grating couplers 540 and 542, in one or more embodiments, the coherent light source 548 can be coupled to the AOM 500 via a light-coupling component. Examples can include, but are not limited to a waveguide edge coupler, inversed taper coupler, and prism coupler.

Figure 6:
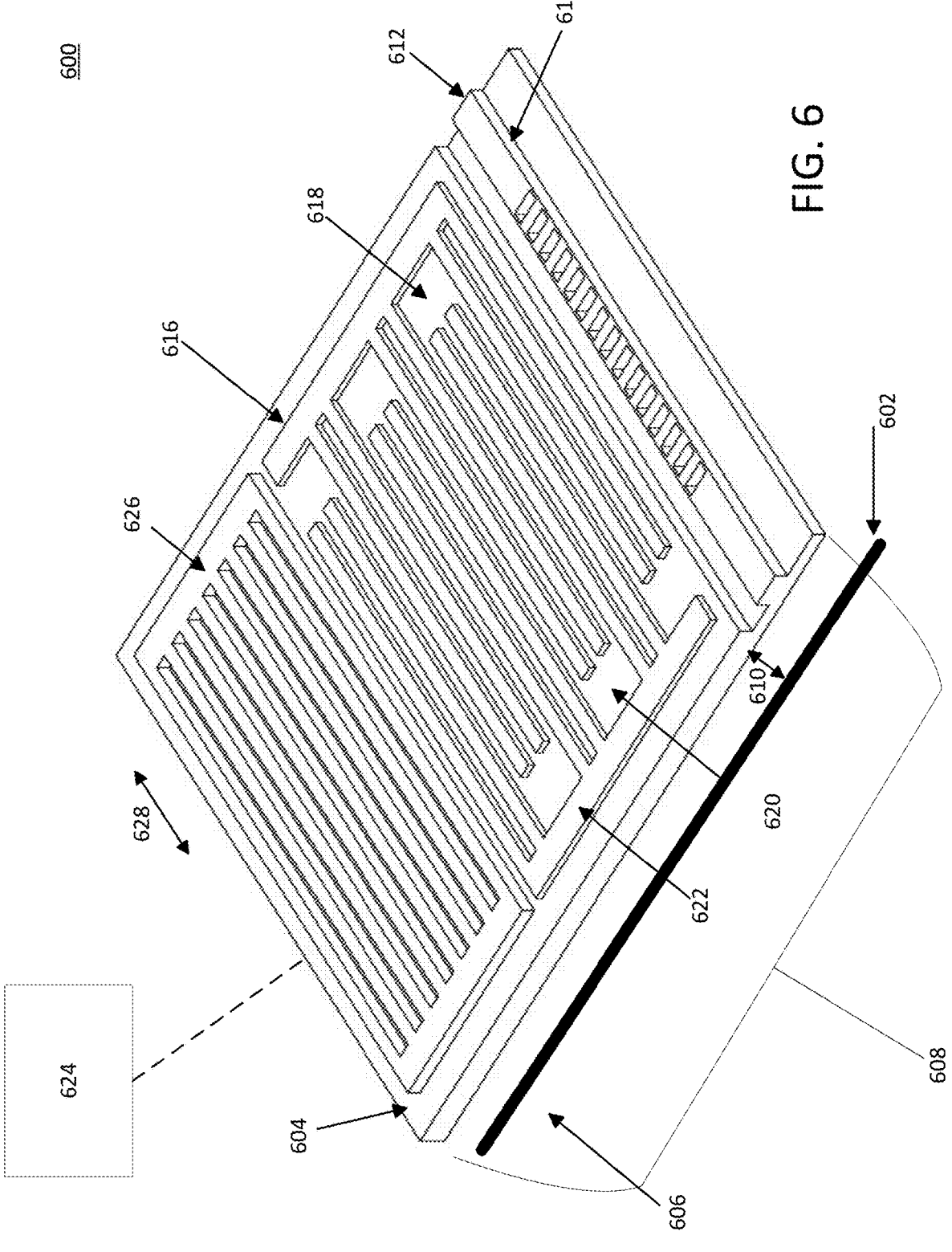
FIG. 6 is a non-limiting illustration of an AOM, according to an embodiment of the present disclosure.

FIG. 6 depicts an example AOM 600 comprising a Bragg reflector 626, according to an embodiment of the present disclosure. As shown, the AOM 600 includes a substrate 602, which serves as a foundation for the AOM 600. In the illustrated embodiment, the substrate 602 comprises a first portion 606 coupled to an optical layer 604. In the illustrated embodiment, the optical layer 604 includes or otherwise comprises a free-standing portion 608 shaped and positioned to define a gap 610 between the free-standing portion 608 of the optical layer 604 and the substrate 602. In the illustrated embodiment, the optical layer 604 includes or otherwise comprises a rib waveguide 612 comprising a photonic crystal 614. The photonic crystal 614 can be formed in the free-standing portion 608. In the illustrated embodiment, the optical layer 604 includes or otherwise comprises a piezo-electric transducer 616 mechanically coupled to the free-standing portion 608. In the illustrated embodiment, the piezoelectric transducer 616 includes or otherwise comprises a piezoelectric material 618 and a plurality of conductive electrodes 620 disposed in electrically conductive contact with the piezoelectric material 618. In the illustrated embodiment, the plurality of conductive electrodes 620 extend from a base portion 622 of the piezoelectric transducer 616. In an embodiment, the AOM 600 is coupled to a power source 624.

Still referring to FIG. 6, as shown, the AOM 600 includes a Bragg reflector 626 disposed on a side of the optical layer 604 opposite the rib waveguide 612. In an additional embodiment, the Bragg reflector 626 is configured to reverberate an acoustic wave in the substrate 602 on a plane 628 relative to the side of the optical layer 604 opposite the rib waveguide 612. In one or more embodiments, the AOM 600 comprises a reflection component (not shown) in lieu of or in addition to the Bragg reflector 626. In an embodiment, the Bragg reflector 626 comprises a plurality of layers of alternating materials with different mechanical stiffness. In an additional embodiment, each layer of the plurality of layers creates a partial reflection and a partial refraction of an acoustic wave or acoustic signal. The Bragg reflector is positioned to reflect the acoustic wave toward the photonic cavity 612 to improve the efficiency of the AOM 600.

Figure 7A:
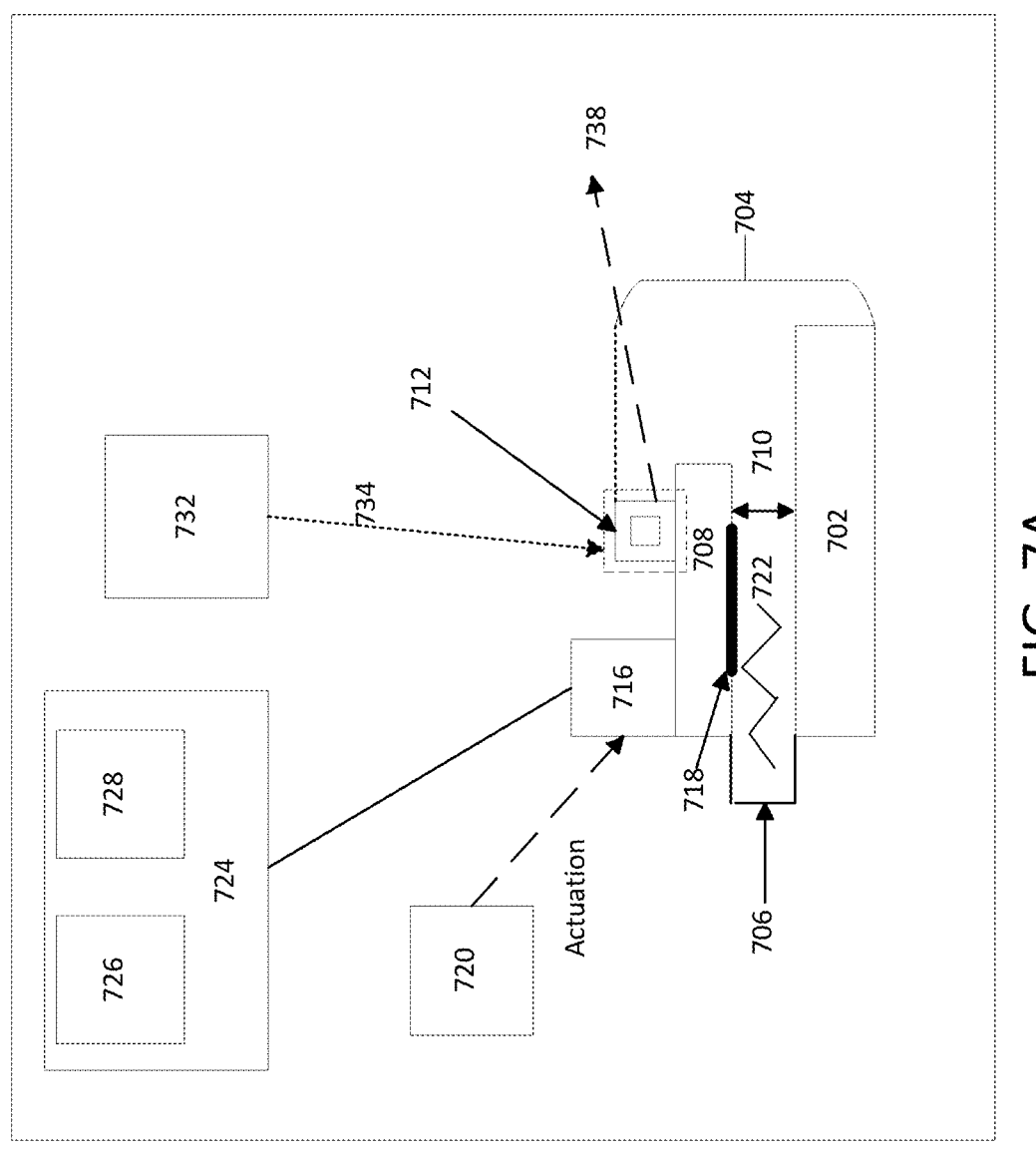
FIG. 7A is a non-limiting illustration of an optical computation system, according to an embodiment of the present disclosure.

Turning now to FIG. 7A, an optical computation system 700 according to an embodiment of the present disclosure, will now be described. As shown in FIG. 7A, the optical computation system 700 includes or otherwise comprises a piezoelectric transducer 716, the piezoelectric transducer 716 mechanically coupled with an optical layer 704, the optical layer 704 comprising: a substrate 702, wherein a first portion 706 of the substrate 702 is coupled to the optical layer 704; a free-standing portion 708 suspended, shaped, and positioned to define a gap 710 between a portion 718 of the optical layer 704 and the substrate 702; and a rib waveguide 712 comprising a photonic crystal 714 formed (or etched) in the free-standing portion 708, wherein an actuation of the piezoelectric transducer 716 generates an acoustic wave 722 localized in the substrate 702; a controller 724 comprising a memory 726 and one or more processors 728, wherein the controller 724 is operably connected to the piezoelectric transducer 716, wherein the memory 726 comprises computer-executable instructions stored thereon that, if executed by the one or more processors 728, cause the system 700 to perform operations described further in FIG. 7C.

As shown in FIG. 7A, in an embodiment, the actuation of the piezoelectric transducer 716 includes or otherwise comprises use of an actuation mechanism 720 operably connected to the piezoelectric transducer 716. In an embodiment, the actuation mechanism 720 is configured to generate an RF signal at a frequency that drives the piezoelectric transducer 716. The driving of the piezoelectric transducer 716 generates an acoustic wave 722 that is localized in the substrate 702, as the acoustic wave 722 propagates to the rib waveguide 712. In an embodiment, as the acoustic wave 722 propagates to the rib waveguide 712, an optical signal 734 is sent to the rib waveguide 712. In an additional embodiment, an interaction between the optical signal 734 and the acoustic wave 722 results in an efficient modulation such that there is minimal loss of signal and phase information in the interaction between the optical signal 734 and the acoustic wave 722.

Referring to FIGS. 7A and 7C, a controller 724 comprising a memory 726 and one or more processors 728, wherein the controller 724 is operably connected to the piezoelectric transducer 716, wherein the memory 726 comprises computer-executable instructions stored thereon that, if executed by the one or more processors 728, cause the system to perform: inputting 730, with light from a light source 732, an optical signal 734 to the rib waveguide 712 during the actuation of the piezoelectric transducer 716; and outputting 736 an output signal 738 based on an interaction of the optical signal 734 and the acoustic wave 722 in the photonic crystal 714, wherein the output signal 738 corresponds to a result of a matrix operation applied to one or more frequency-space components of the optical signal 734.

Figure 7B:
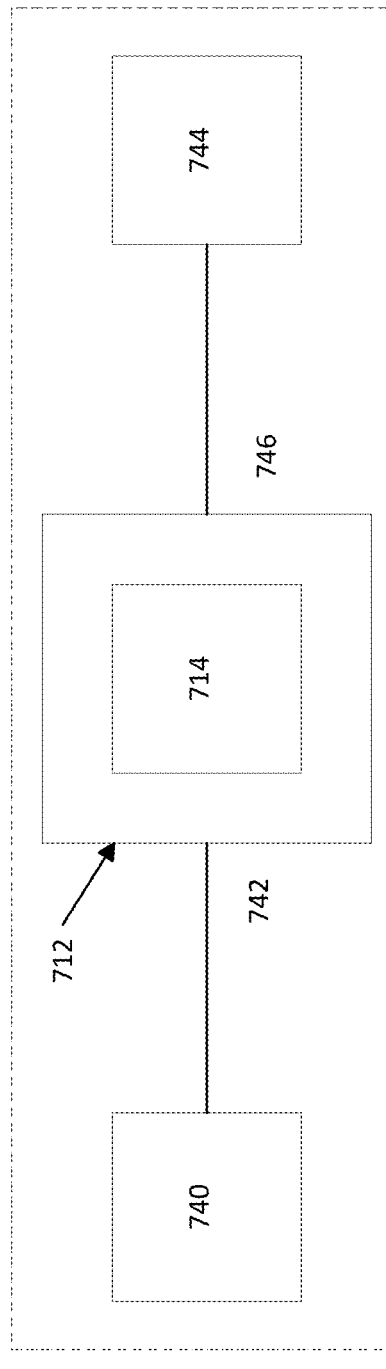
FIG. 7B is an expanded view of a section of the optical computation system of FIG. 7A, according to an embodiment of the present disclosure.

Turning now to FIGS. 7A and 7B, in an embodiment, an input photodetector 740 is coupled to an end 742 of the rib waveguide 712. In an additional embodiment, the inputting 730 comprises detecting the optical signal 734 via the input photodetector 740. In an additional embodiment, an output photodetector 744 is coupled to an end 746 of the rib waveguide 712. In an additional embodiment, the end 742 is opposite to the end 746. In an additional embodiment, the outputting 736 comprises detecting the interaction between the optical signal 734 and the acoustic wave 722 in the photonic crystal 714 via the output photodetector 744. In an embodiment, the photonic crystal 714 defines a plurality of recesses in the rib waveguide 712.

Turning to FIG. 7C, a computer-implemented method of controller 724 is described. In an embodiment, at 730, inputting, with light from a light source 732, an optical signal 734 to the rib waveguide 712 during the actuation of the piezoelectric transducer 716. In an additional embodiment, at 736, outputting an output signal 738 based on an interaction of the optical signal 734 and the acoustic wave 722 in the photonic crystal 714, wherein the output signal 738 corresponds to a result of a matrix operation applied to one or more frequency-space components of the optical signal 734.

Referring to FIG. 8, a method of optical computation 800 is described. At 802, the method 800 can comprise actuating a piezoelectric transducer, the piezoelectric transducer mechanically coupled with an optical layer, the optical layer comprising: a substrate, wherein a first portion of the substrate is coupled to the optical layer; a free-standing portion suspended shaped and positioned to define a gap between a portion of the optical layer and the substrate; and a rib waveguide comprising a photonic crystal formed in the free-standing portion, wherein the actuating the piezoelectric transducer generates an acoustic wave localized in the substrate. At 804, the method 800 can comprise inputting, with light from a light source, an optical signal during the actuation of the piezoelectric transducer. In an embodiment, the inputting comprises inputting the optical signal to the rib waveguide. In an embodiment, inputting the optical signal occurs at the same time as or at least partially overlapping with actuating the piezoelectric transducer. In such an embodiment, this provides efficient modulation with minimal loss of signal and phase information because of a combination of moving-boundary and photoelastic effects. At 806, the method 800 can comprise outputting an output signal based on an interaction of the optical signal and the acoustic wave in the photonic crystal, wherein the output signal corresponds to a result of a matrix operation applied to frequency-space components of the optical signal. In an embodiment, and as further described in Examples 2 and 3, the matrix operation applied to the frequency-space components of the optical signal comprises a plurality of amplitudes in a symmetrical distribution. In an embodiment, the method of FIG. 8 is facilitated in the optical computation system 700 illustrated and described in FIG. 7A.

In an embodiment, a method comprises generating an acoustic wave, confining the generated acoustic wave within a surface area of a substrate, wherein an optical layer is located above the surface area of the substrate, wherein a gap is present between the optical layer and the surface area of the substrate. In an additional embodiment, the method comprises inputting an optical signal to a section of the optical layer simultaneously as the generating the acoustic wave. In an additional embodiment, the method comprises outputting an interaction between the generated acoustic wave and the optical signal.

The order in which some or all of the process blocks appear in each process should not be deemed limiting. Rather, one of ordinary skill in the art having the benefit of the present disclosure will understand that some of the process blocks may be executed in a variety of orders not illustrated, or even in parallel.

The processes explained above are described in terms of computer software and hardware. The techniques described may constitute machine-executable instructions embodied within a tangible or non-transitory machine (e.g., computer)

readable storage medium, that when executed by a machine will cause the machine to perform the operations described. Additionally, the processes may be embodied within hardware, such as an application specific integrated circuit ("ASIC") or otherwise.

A tangible machine-readable storage medium includes any mechanism that provides (i.e., stores) information in a non-transitory form accessible by a machine (e.g., a computer, network device, personal digital assistant, manufacturing tool, any device with a set of one or more processors, etc.). For example, a machine-readable storage medium includes recordable/non-recordable media (e.g., read only memory (ROM), random access memory (RAM), magnetic disk storage media, optical storage media, flash memory devices, etc.).

Figure 9A:
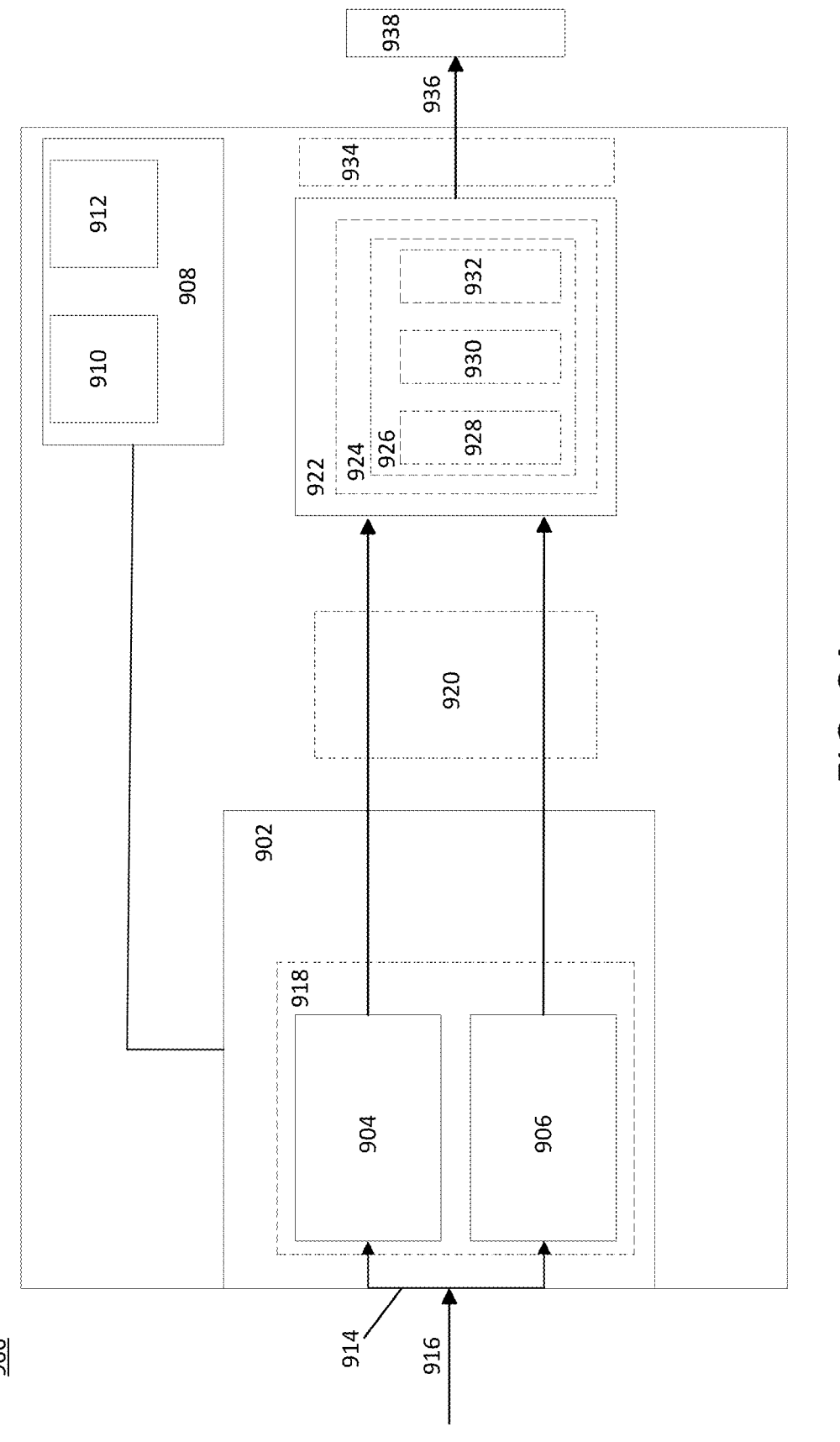
FIG. 9A is a non-limiting illustration of a multilayer optical computing system, according to an embodiment of the present disclosure.

Referring to FIGS. 9A-9C, a multilayer optical computing system 900 is described. As shown in FIGS. 9A-9C, in one or more embodiments, the multilayer optical computing system 900 includes or otherwise comprises an acousto-optic modulator (AOM) array 902. In one embodiment, the AOM array 902 comprises: a first AOM 904 disposed in a first position $P_1$ and comprising a first modulation index $\beta_1$ and a first phase $z_1$; and a second AOM 906 disposed in a second position $P_2$ different than and adjacent to the first position $P_1$ and comprising a second modulation index $\beta_2$ different than the first modulation index $\beta_1$ and a second phase $z_2$ different than the first phase $z_1$. In an embodiment, the multilayer optical computing system 900 includes or otherwise comprises a controller 908 comprising a memory 910 and one or more processors 912, wherein the controller 908 is operably connected to the AOM array 902. In an embodiment, the memory 910 comprises computer-executable instructions stored thereon that, if executed by the one or more processors 912, cause the system to perform: splitting 914 a data input 916 received by the AOM array 902 into a first vector $x_1$ and a second vector $x_2$, wherein the first AOM 904 receives the first vector $x_1$, wherein the second AOM 906 receives the second vector $x_2$, wherein the first vector $x_1$ is assigned a first weight $w_1$, and the second vector $x_2$ is assigned a second weight $w_2$. In an embodiment, the computer-executable instructions comprise processing 918 the first vector $x_1$ and the second vector $x_2$ to generate a first output vector $y_1$ and a second output vector $y_2$; sending 920 the first output vector $y_1$ and the second output vector $y_2$ to a training model 922. In an embodiment, the training model 922 comprises operations 924 for: reducing 926 a loss function, the reducing 926 comprises optimizing 928 the first weight $w_1$ and the second weight $w_2$ to create an optimized first weight $w_{O1}$ and an optimized second weight $w_{O2}$, optimizing 930 the first modulation index $\beta_1$ and the second modulation index $\beta_2$ to create an optimized first modulation index $\beta_{O1}$ and a second modulation index $\beta_{O2}$, and optimizing 932 the first phase $z_1$ and the second phase $z_2$ to create an optimized first phase $z_{O1}$ and an optimized second phase $z_{O2}$. In an embodiment, the operations 924 comprise outputting 934 a data output 936, the data output 936 comprising the optimized first weight $w_{O1}$ and the optimized second weight $w_{O2}$, the optimized first modulation index $\beta_{O1}$ and the second modulation index $\beta_{O2}$, and the optimized first phase $z_{O1}$ and the optimized second phase $z_{O2}$. In one embodiment, the processing 918 occurs when the data input 916 is received by the AOM array 902. In an embodiment, the first weight $w_1$ and the second weight $w_2$ comprise the weights of the modulator branches controlled by the beam splitting, as shown in Example 13.

Figure 11A:
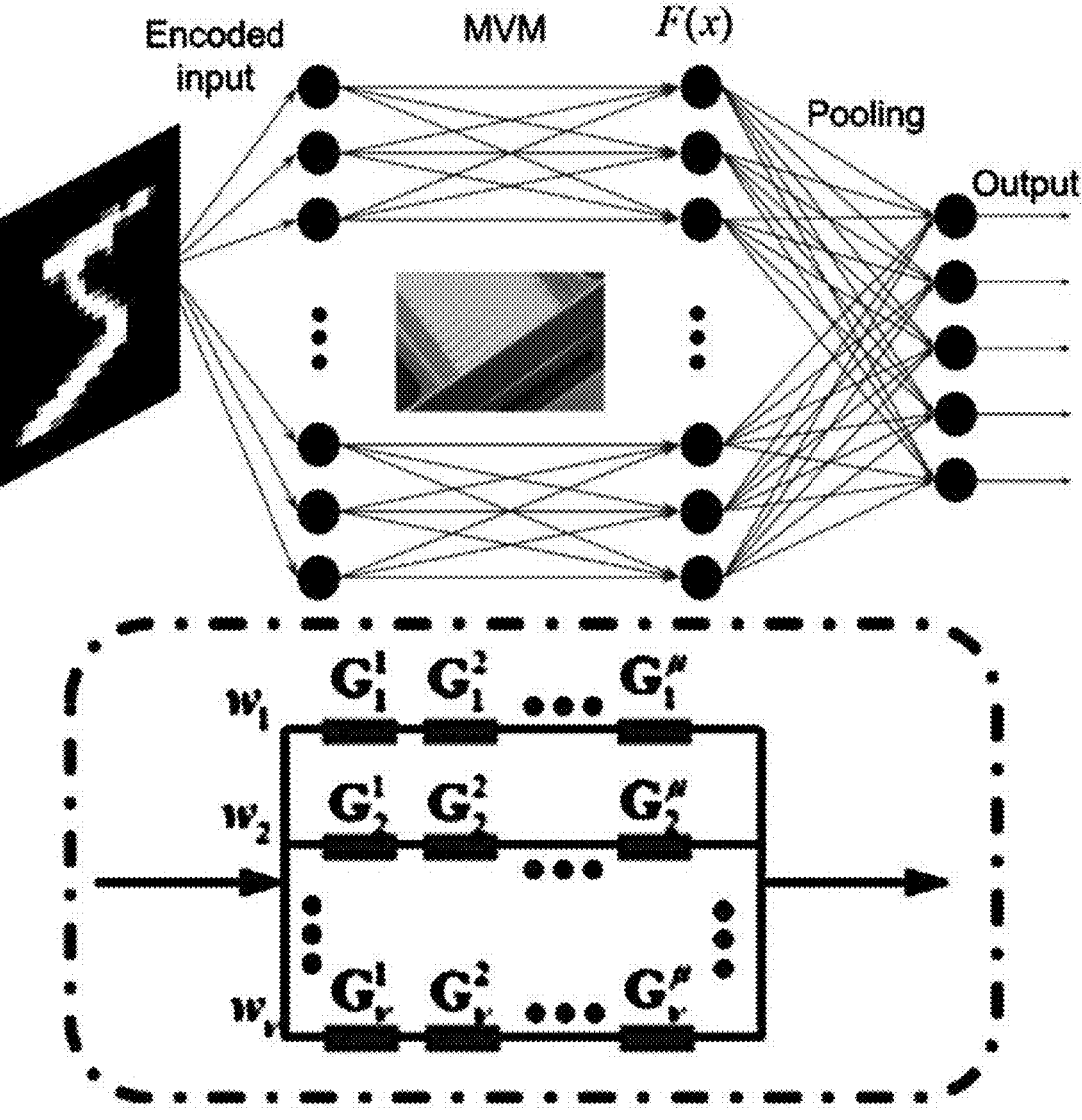
FIG. 11A is a non-limiting illustration of an optical multilayer neural network, according to an embodiment of the present disclosure.
Figures 11B, 11C:
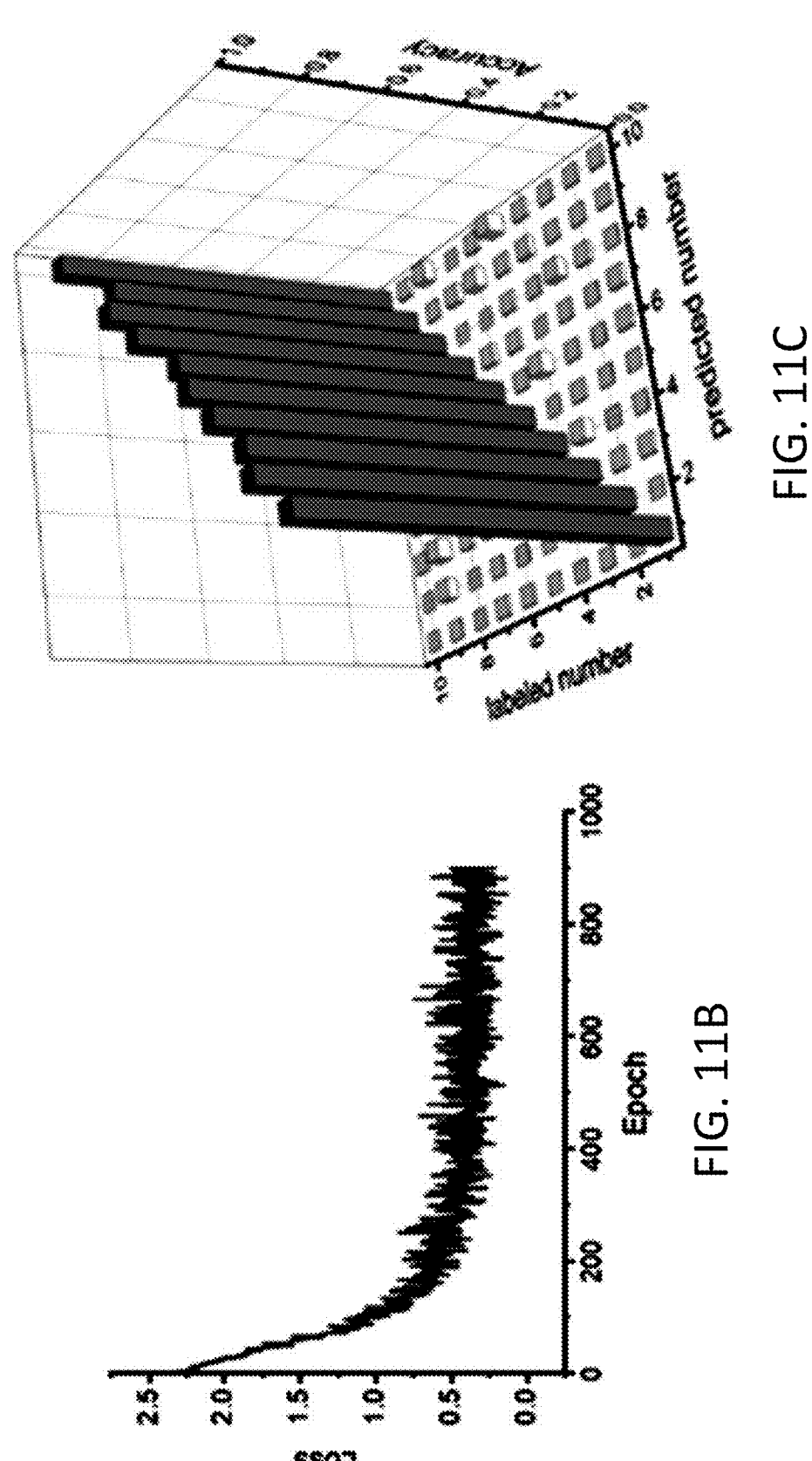
FIG. 11B is a non-limiting illustration of an evolution of a loss function, according to an embodiment of the present disclosure.
FIG. 11C is a non-limiting illustration of a recognition accuracy, according to an embodiment of the present disclosure.

In an embodiment, the first phase $z_1$ and the second phase $z_2$ comprise modulation phases of RF drives. In an embodiment, the first modulation index $\beta_1$ and the second modulation index $\beta_2$ comprise measurements of the dynamic modulation depth, which can be controlled by the power of the RF drives. In an embodiment, the first vector $x_1$ and the second vector $x_2$ comprise one or more coherent frequency components. In an embodiment, the first output vector $y_1$ and the second output vector $y_2$ comprise the result of vector-matrix multiplication operations. As further described in Example 13 and in FIGS. 11A-11C, an implementation of a multilayer optical computing system such as the multilayer optical computing system 900 includes efficient training of a neural network. In an additional embodiment, the implementation includes image recognition. In an additional embodiment, the implementation includes image classification, and video processing.

In FIG. 9A, in one embodiment, the first output vector $y_1$ and/or the second output vector $y_2$ can be detected by a photodetector 938 or an optical spectrum analyzer.

Referring to FIG. 9B, a computer-implemented method of the controller 908 is described. At 914, splitting a data input 916 received by the AOM array 902 into a first vector $x_1$ and a second vector $x_2$, wherein the first AOM 904 receives the first vector $x_1$, wherein the second AOM 906 receives the second vector $x_2$, wherein the first vector $x_1$ is assigned a first weight $w_1$, and the second vector $x_2$ is assigned a second weight $w_2$. At 918, processing the first vector $x_1$ and the second vector $x_2$ to generate a first output vector $y_1$ and a second output vector $y_2$. At 920, sending the first output vector $y_1$ and the second output vector $y_2$ to a training model 922, which can have multiple layers.

In one or more embodiments, a method of using the multilayer optical computing system 900 is described. In one embodiment, the method comprises splitting a data input received by an AOM array, the AOM array comprising a first modulation index $\beta_1$, a second modulation index $\beta_2$, a first phase $z_1$ and a second phase $z_2$. In an additional embodiment, the method comprises splitting the data input into a first vector $x_1$ and a second vector $x_2$, wherein the first vector $x_1$ is assigned a first weight $w_1$, and the second vector $x_2$ is assigned a second weight $w_2$. In an additional embodiment, the method comprises processing the first vector $x_1$ and the second vector $x_2$ to generate a first output vector $y_1$ and a second output vector $y_2$. In an additional embodiment, the method comprises sending the first output vector $y_1$ and the second output vector $y_2$ to a training model. In an additional embodiment, the method comprises reducing a loss function, the reducing comprises: optimizing the first weight $w_1$ and the second weight $w_2$ to create an optimized first weight $w_{O1}$ and an optimized second weight $w_{O2}$; optimizing the first modulation index $\beta_1$ and the second modulation index $\beta_2$ to create an optimized first modulation index $\beta_{O1}$ and a second modulation index $\beta_{O2}$; and optimizing the first phase $z_1$ and the second phase $z_2$ to create an optimized first phase $z_{O1}$ and an optimized second phase $z_{O2}$. In an additional embodiment, the method comprises outputting a data output, the data output comprising the optimized first weight $w_{O1}$ and the optimized second weight $w_{O2}$, the optimized first modulation index $\beta_{O1}$ and the second modulation index $\beta_{O2}$, and the optimized first phase $z_{O1}$ and the optimized second phase $z_{O2}$.

Referring to FIG. 9C, a computer-implemented method of the training model 922 is described. At 926, reducing a loss function, the reducing 926 comprises: At 928, optimizing the first weight $w_1$ and the second weight $w_2$ to create an optimized first weight $w_{O1}$ and an optimized second weight $w_{O2}$; at 930, optimizing the first modulation index $\beta_1$ and the second modulation index $\beta_2$ to create an optimized first modulation index $\beta_{O1}$ and a second modulation index $\beta_{O2}$; and at 932, optimizing the first phase $z_1$ and the second phase $z_2$ to create an optimized first phase $z_{O1}$ and an optimized second phase $z_{O2}$. At 934, outputting a data output 936, the data output 936 comprising the optimized first weight $w_{O1}$ and the optimized second weight $w_{O2}$, the optimized first modulation index $\beta_{O1}$ and the second modulation index $\beta_{O2}$, and the optimized first phase $z_{O1}$ and the optimized second phase $z_{O2}$. In an embodiment, an exemplary training model utilized for the training model 922 is a perceptron training model, also called a McCulloch-Pitts neuron training model. Additional training models can include convolutional neural networks, generative-adversarial networks, and Bayesian Neural Networks.

Figures 9D, 9E:
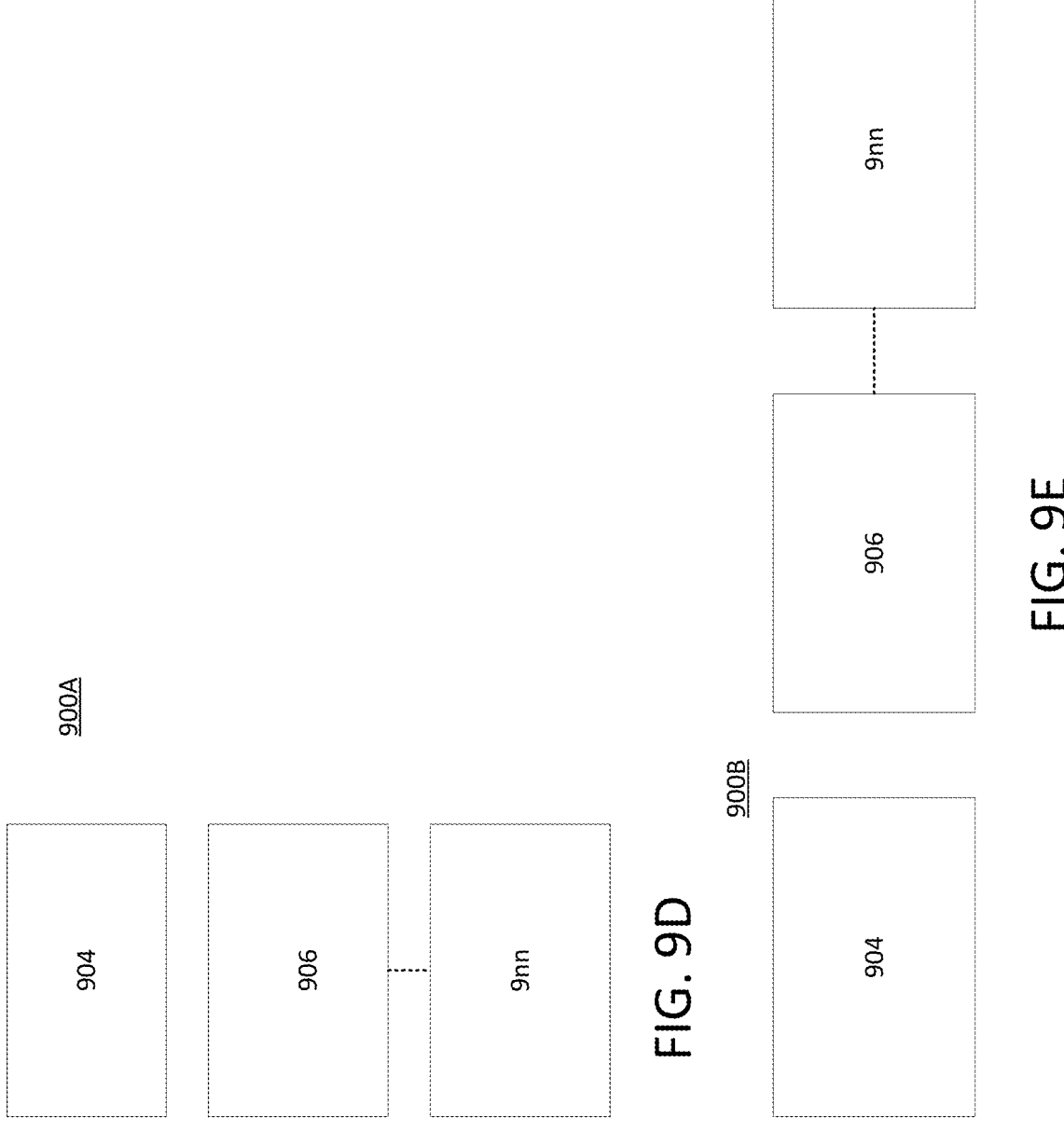
FIG. 9D is a non-limiting illustration of a parallel configuration of the multilayer optical computing system of FIG. 9A, according to an embodiment of the present disclosure.
FIG. 9E is a non-limiting illustration of a linear configuration of the multilayer optical computing system of FIG. 9A, according to an embodiment of the present disclosure.

Referring to FIGS. 9D-9E, respective systems 900A and 900B are described. As shown in FIG. 9D, in an embodiment, the system 900A comprises the first AOM 904 being adjacent to the second AOM 906 in a parallel orientation. As shown in FIG. 9E, in an embodiment, the system 900B comprises the first AOM 904 being adjacent to the second AOM 906 in a linear orientation. In FIG. 9D, subsequent AOMs 9nn are situated adjacent to the second AOM 906 in a parallel fashion. Still referring to FIG. 9D, it is foreseeable that AOMs 9nn are arranged in a fashion that precede the first AOM 904. In FIG. 9E, subsequent AOMs 9nn are situated adjacent to the second AOM 906 in a linear orientation. Still referring to FIG. 9E, it is foreseeable that AOMs 9nn are arranged in a fashion that precede the first AOM 904.

Referring to FIGS. 9A-9E, in one or more embodiments, the first AOM 904 and/or the second AOM 906 of the AOM array 902 comprises the AOM 500 illustrated and described in FIGS. 5A-5D. In one or more embodiments, the first AOM 904 and/or the second AOM 906 comprises the AOM 600 illustrated and described in FIG. 6. In one or more embodiments, the first AOM 904 and/or the second AOM 906 comprises the optical computation system 700 illustrated and described in FIGS. 7A-7C.

Aspects

Design and Characterizations of the Acousto-Optic Modulator.

Figure 1C:
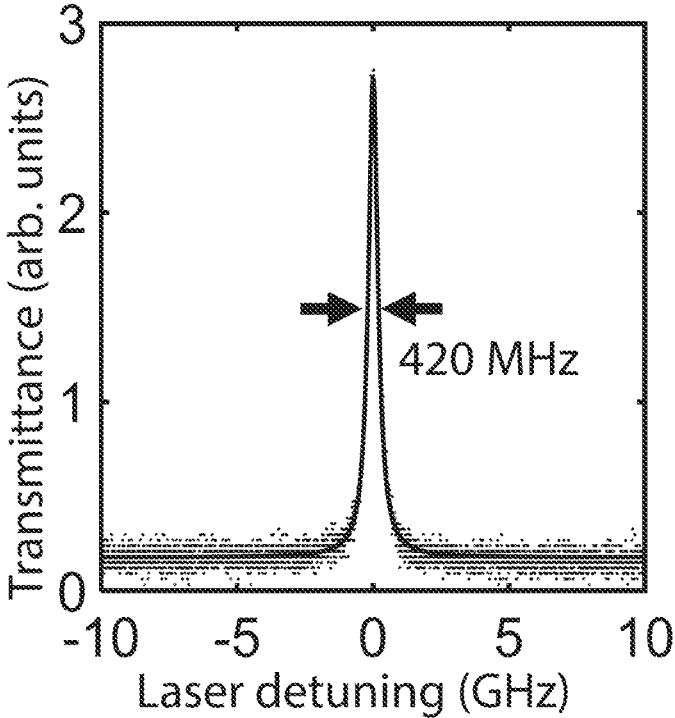
FIG. 1C graphically illustrates a measured optical transmission spectrum without modulation, showing a linewidth of 420 MHz, where the center optical resonance wavelength is around 1547.5 nm, according to an embodiment of the present disclosure.

FIG. 1B shows a scanning electron microscopy (SEM) image of our device fabricated on an AlN-on-SOI substrate (see Example 1). The modulator consists of a one-dimensional photonic crystal cavity etched in a suspended silicon rib waveguide which is connected to the AlN/Si piezoelectric region with a silicon sleeve area in between. The nanophotonic cavity is end-coupled to a pair of grating couplers for optical input/output. The device achieved a high loaded quality factor $Q_L=4.6\times10^5$, corresponding to a total cavity loss rate of $\kappa=(2\pi)\cdot420$ MHz (FIG. 1C). Acoustic waves are excited by driving a split-finger interdigital transducer (IDT) patterned on the free-standing AlN/Si region with an RF signal, and subsequently propagate to the optical waveguide via the silicon membrane. The IDT is designed with a period of 3 μm to excite a set of mechanical modes with angular frequencies $\Omega>\kappa$, reaching the sideband-resolved regime (FIG. 2A and Example 2). Etching a free-edge reflector on the lower side of the waveguide (FIG. 10 and Example 1) creates an acoustic resonator that coherently builds up a strong mechanical displacement field at the nanophotonic cavity. Such mechanical motion effectively modulates the optical resonance through a combination of moving-boundary and photoelastic effects. Under modulation, the intra-cavity photon dynamics can be described as $$\dot{a}(t)=[i(\Delta-\beta\cdot\Omega\cdot\tilde{f}(t)-\kappa/2]a(t)+\sqrt{\kappa_{ex}}a_{in}(t), \tag{1}$$

where $\kappa_{ex}$ is the external coupling rate, $a_{in}(t)$ is the input optical field, and $\Delta=\omega_p-\omega_0$ is the detuning of the input laser (angular) frequency $\omega_p$ from the cavity center frequency $\omega_0$. $\hat{f}(1)$ denotes the normalized modulation waveform. $\beta=2$ $g_{om}/\Omega$ is the modulation index that measures the dynamic modulation depth, where $g_{om}$ is the optomechanical coupling proportional to the amplitude of the mechanical mode. FIG. 2A illustrates the mechanical resonances in the zoom-in spectra at ~800 MHz and ~2.90 GHz having pronounced modulation efficiency, whereas the resonance at 3.95 GHz has a negligibly weak modulation effect. The star and diamond marks denote the prominent frequencies (803 MHz and 2.903 GHz) with enhanced modulation efficiencies for the corresponding mechanical modes.

Figure 2B:
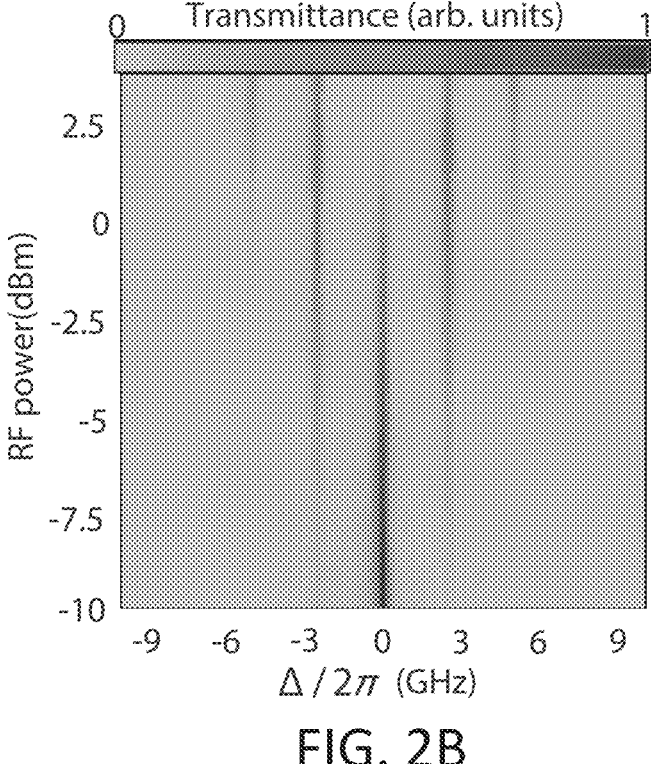
FIG. 2B is an optical transmission spectra under the modulation driven at 2.903 GHz with varying radio-frequency (RF) power, according to an embodiment of the present disclosure.
Figure 2C:
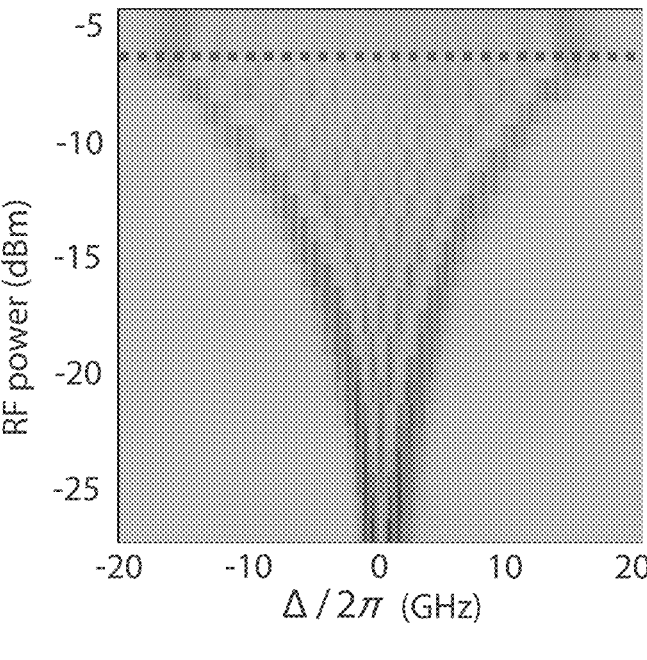
FIG. 2C is an optical transmission spectra under the modulation driven at 803 MHz with RF power, according to an embodiment of the present disclosure.

Acousto-optic modulators of the present disclosure feature improved modulation efficiency in the sideband-resolved regime. Resulting deep modulation can generate multiple resolved sidebands at $\omega_0\pm s\Omega$ with integer sideband order s, forming a synthetic lattice in the frequency domain. To quantify the modulation efficiency and the achievable size of the synthetic lattice, signals are provided to drive the IDT at the mechanical resonances of the optical cavity while measuring the optical transmission spectra with varying RF power. FIG. 2B shows the results of the 2.903 GHz drive ($\Omega/\kappa\sim7$), from which a characteristic half-wave voltage $V_\pi=580$ mV for $\beta=\pi$ is inferred by fitting the measurements with the theory (see Example 7). At an RF power of 3 dBm ($\beta=2.41$), multiple sidebands emerge, up to $\pm$3rd orders, comprising a finite lattice of seven sites. The 803 MHz drive ($\Omega/\kappa\sim2$) can induce much more efficient modulation with the lowest $V_\pi=19$ mV (FIG. 2C). A maximum-observed value for $\beta$ was $\beta=22.9$ at an RF power of −7 dBm, which generates a synthetic lattice of approximately 50 sites over a frequency range of 40 GHz. Still referring to FIG. 2C, the dashed line denotes the threshold of an electromechanical nonlinearity above which the number of sidebands ceases increasing.

Coherent Frequency Conversions in the Synthetic Frequency Dimension.

Figure 2D:
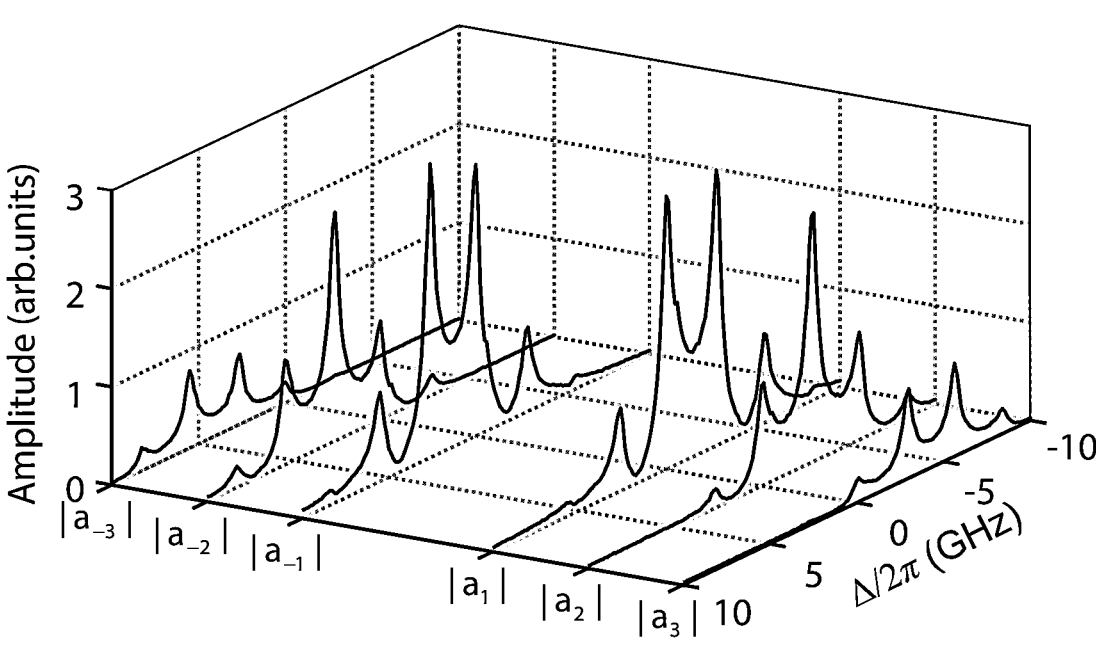
FIG. 2D is a measured optical spectra of the non-vanishing harmonic signal amplitudes, according to an embodiment of the present disclosure.
Figure 2E:
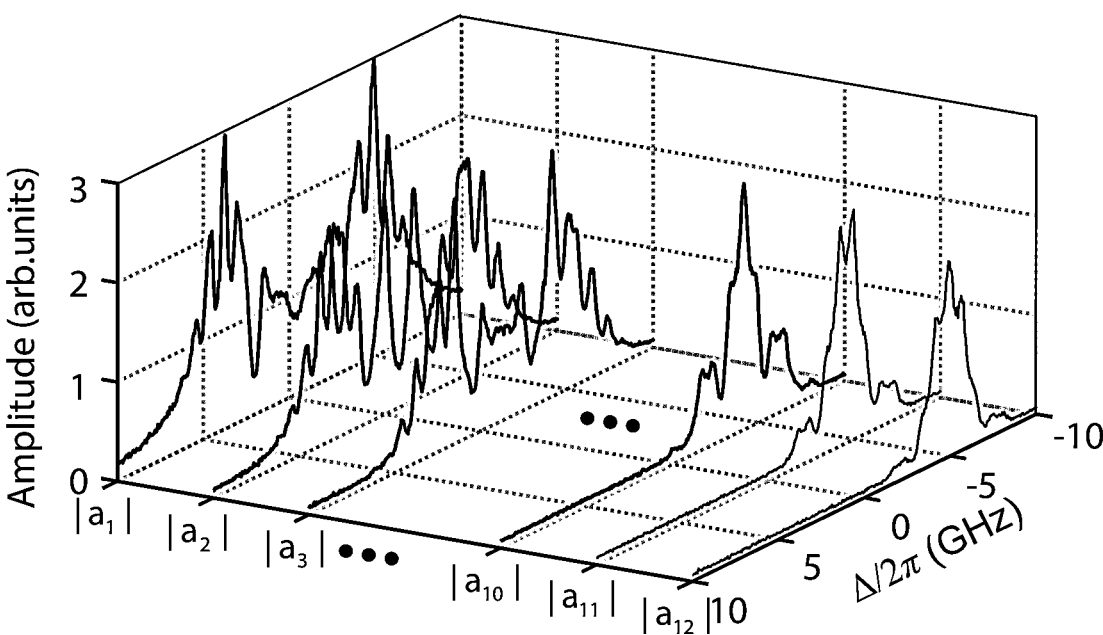
FIG. 2E is a spectra of the positive-order harmonic signal amplitudes, according to an embodiment of the present disclosure.

Fully connected MVM operations involve coherent conversions from each input frequency site to all the sites at the output. As a theoretical formulation, consider a monochromatic laser input and an RF drive with a single microwave tone $\hat{f}(1)=\cos(\Omega t+\phi)$ At a large $\beta$, the incident photons can absorb or emit multiple phonons because of the strong optomechanical coupling. Consequently, the input optical field is scattered to a set of harmonic signals $\{a_l\}$ detuned from the cavity center frequency by $\Delta+l\Omega$, where l is the harmonic order. By solving equation (1), it can be derived that $$a_l = \sum_k J_{l+k}(\beta)J_k(\beta)e^{-il\phi}\frac{\kappa_{ex}a_{in}}{i(-\Delta+k\Omega)+\kappa/2}, \qquad (2)$$

where $J_v(x)$ is the v-th order Bessel function of the first kind (see Example 3). We perform heterodyne measurements to characterize the amplitudes of all the harmonic signals with varying input laser frequency. FIG. 2D and FIG. 2E show the exemplary optical spectra of the harmonics measured at the RF drives of 2.903 GHz and 803 MHz, respectively, highly consistent with the theoretical values (see Example 8). When the input laser frequency is set on the n-th synthetic lattice sites, i.e., detuned by $\Delta=n\Omega$, each $a_1$ leads to a non-local frequency conversion from the n-th site to the m-th site, where m=n+1. In FIG. 2D, measured optical spectra of the non-vanishing harmonic signal amplitudes $|a_l|$ ($l=\pm1, \pm2, \pm3$) at 2.903 GHz, −2.5 dBm RF drive ($\beta=1.29$) are illustrated. In FIG. 2E, spectra of the positive-order harmonic signal amplitudes $|a_l51$ ($l=1, 2, 3, \ldots, 10, 11, 12$) at 803 MHz, −17 dBm RF drive ($\beta=6.90$) are illustrated. The higher-order harmonics decrease significantly beyond l=12 at this drive.

Hence, the entire set of harmonic generations at sidebands constitute a two-dimensional optomechanical coupling tensor $$G = [g_{mn}], m, n \in [-M, M]: g_{mn} = \frac{a_{m-n}(\Delta = n\Omega)}{a_{in}}, \qquad (3)$$

where 2M+1 is the size of the synthetic lattice determined by the modulation index $\beta$. Each $g_{mn}$ describes the connection between frequency lattice m and n. Therefore, tensor G represents the fully connected layer realized by our AOM. Since the coupling term $g_{mn}$ is only non-trivial for input frequency near the cavity resonance and for finite spans of frequency conversions, the size of the effective vector space in the synthetic frequency dimension is bounded (see Example 4). More generally, for an optical input vector on the synthetic lattice $x=(x_{-M}, \ldots, x_0, \ldots, x_M)^T$, modulators of the present disclosure perform complex-valued MVM operations $y=G\cdot x$, yielding an output vector $y=(y_{-M}, \ldots, y_0, \ldots, y_M)^T$. With $\beta_{max}=22.9$, a single such modulator provides an MVM unit with a scalable size of up to 50×50 in the frequency domain.

Large-Scale Coherent MVM Operations.

In addition to the high scalability, another outstanding advantage of the complex-valued MVM in the synthetic frequency dimension is the persistent phase coherence across the entire synthetic lattice. In contrast to spatial-domain schemes, which are susceptible to various causes of computational errors such as device defects, non-uniformity and thermal fluctuations, the phase information transmitted through the synthetic lattice is intrinsically preserved by the coherent photon-phonon interactions in our modulator. To demonstrate the scalable and complex-valued MVM, we operate our device using the $\Omega=803$ MHz drive and set $\beta=11.3$, which generates a 25×25 matrix G according to equation (3). A Mach-Zehnder intensity modulator $M_I$ is used to synthesize a vector input of three coherent frequency components, including the carrier transmission and the two opposite-sign sideband signals with their complex amplitudes controlled by a DC bias and an RF drive at $\Omega$, respectively. The temporal delay of the modulations is tuned to be zero ($\phi=0$) (see Example 9). The output on the synthetic frequency lattice is thereby a result of the weighted complex-number summation of the corresponding columns in G, representing the complex-valued MVM operation.

Figure 3A:
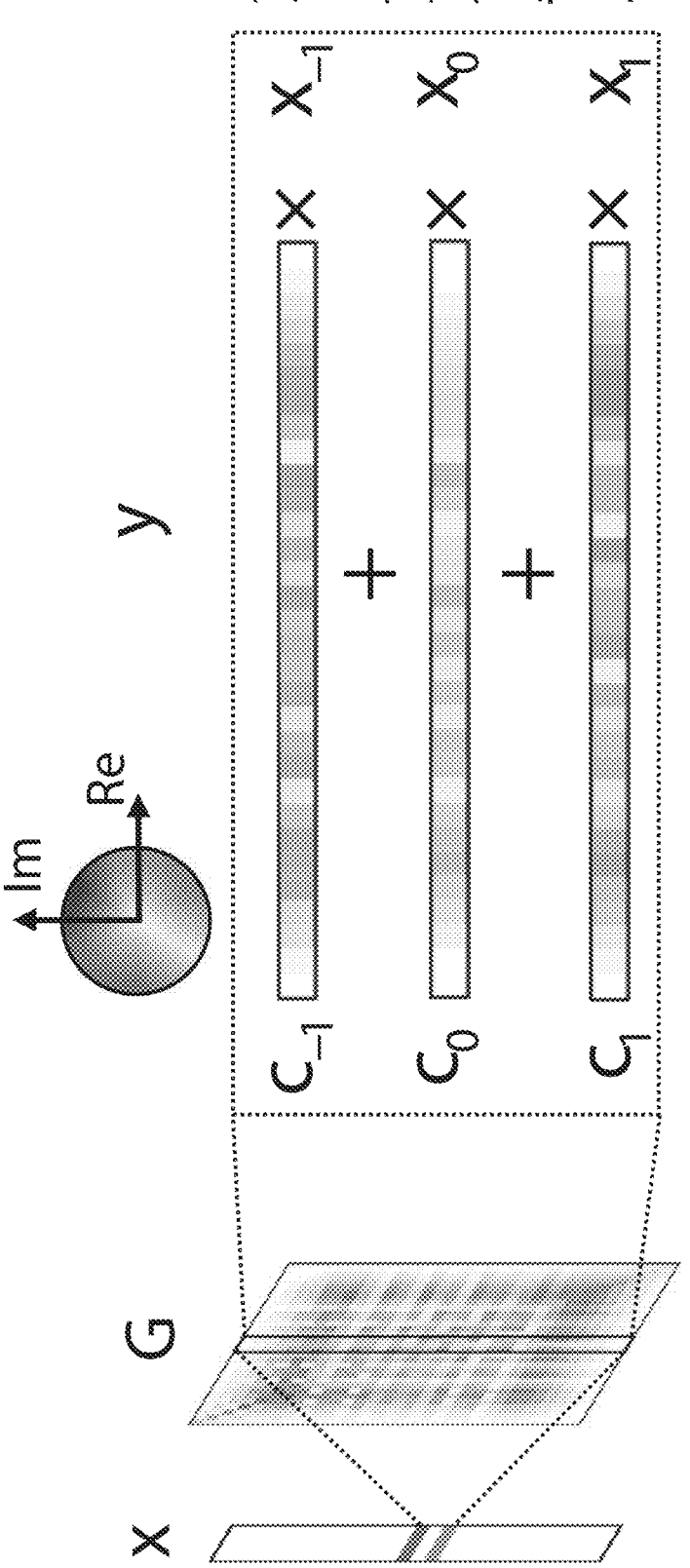
FIG. 3A is a matrix-vector multiplications (MVM) with laser frequency at the 0th synthetic lattice site ($\Delta=0$) and $M_I$ set at suppressed carrier transmission, according to an embodiment of the present disclosure.
Figure 3B:
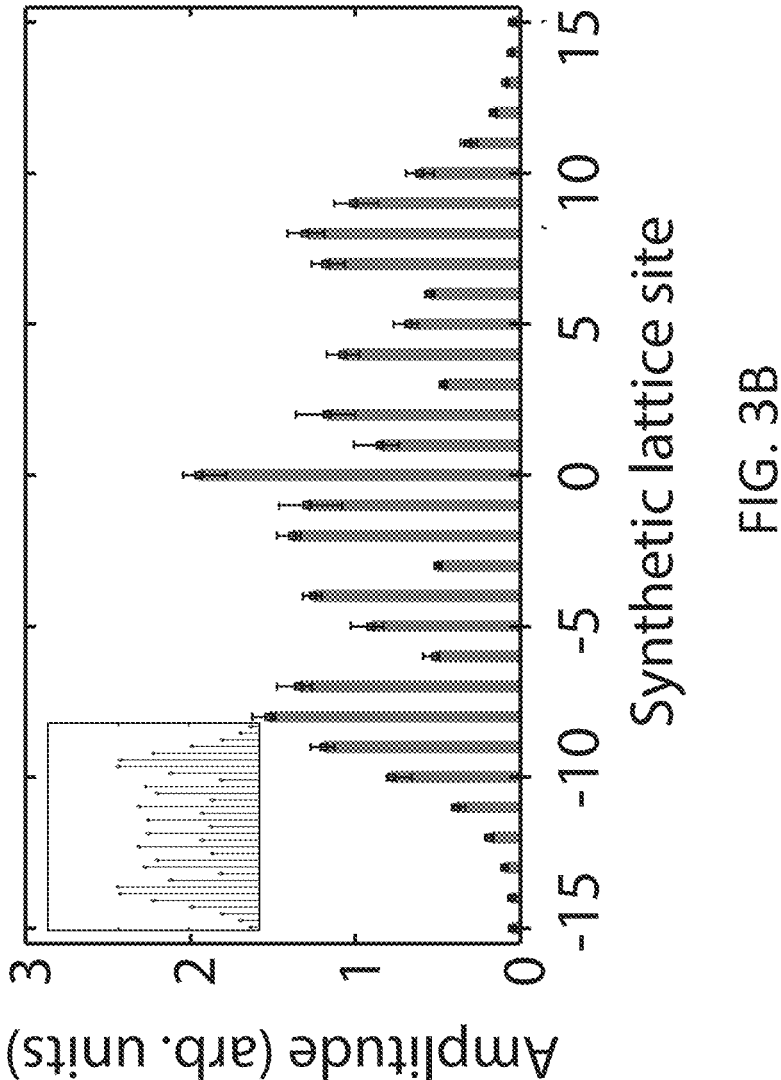
FIG. 3B is measured output amplitudes on the synthetic lattice from the settings in FIG. 3A, according to an embodiment of the present disclosure.

Referring to FIGS. 3A-3H, large-scale coherent matrix-vector multiplications (MVM) in the synthetic frequency dimension are shown. $c_j$ represents the j-th column of G, and $x_k$ denotes the input at the k-th lattice site. Error bars are calculated from 5 measurements. In an embodiment, the large matrix G is configured by driving our acousto-optic modulator at 803 MHz with −13 dBm power ($\beta=11.3$). In an embodiment, the vector input x of three coherent frequency components is synthesized and controlled by an intensity modulator $M_I$. In an exemplary embodiment representing an experimental MVM operation, the laser frequency was set at the center optical resonance ($\Delta=0$), and the carrier transmission was removed, thus providing an input vector $x=( \ldots,$ $0, x_{-1}, 0, x_1, 0, \ldots)^T$ where $x_{-1} = -x_1$ (FIG. 3A). These two input components couple to the 25 sites on the synthetic lattice through the non-local frequency conversions, which add up to a symmetric amplitude distribution at the output (FIG. 3B). The difference between the experimental results and the theory can be understood to be due at least in part to background transmission of the optical cavity (not included in the theoretical model), which becomes pronounced at high cavity modulation depth as the input optical field is scattered to many sidebands.

Figure 3C:
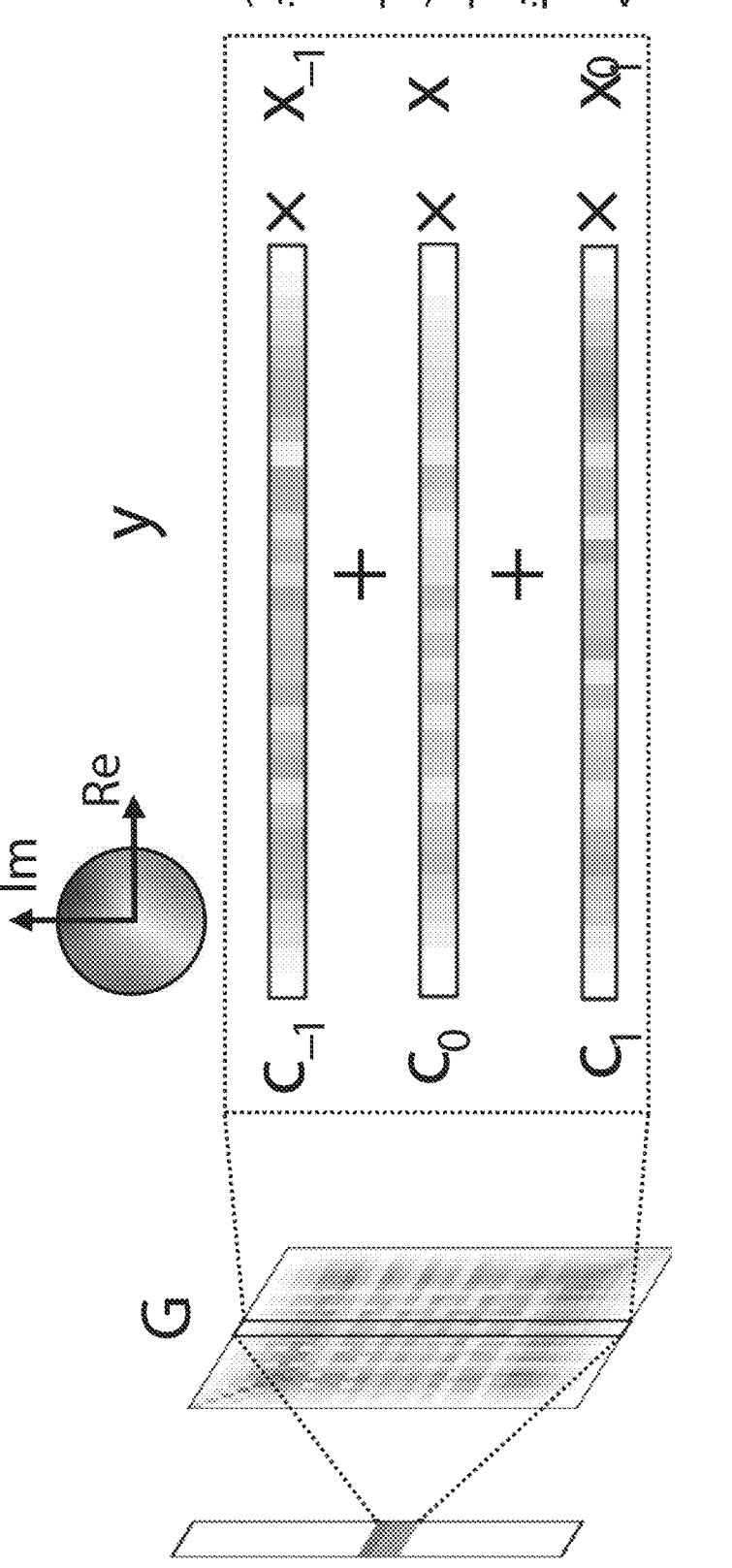
FIG. 3C is a MVM with laser frequency at Δ=0 and $M_I$ set with three equal-amplitude components and a negative phase on the carrier transmission, according to an embodiment of the present disclosure.
Figure 3D:
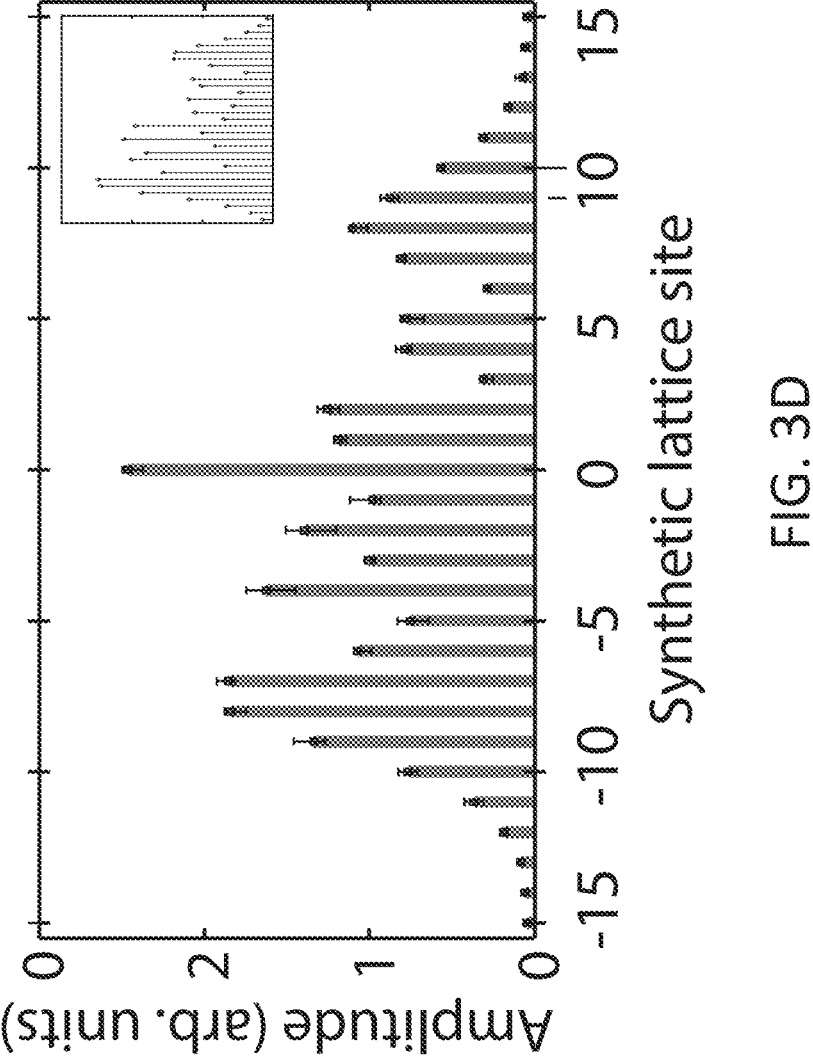
FIG. 3D is measured output amplitudes on the synthetic lattice from the settings in FIG. 3C, according to an embodiment of the present disclosure.
Figure 3E:
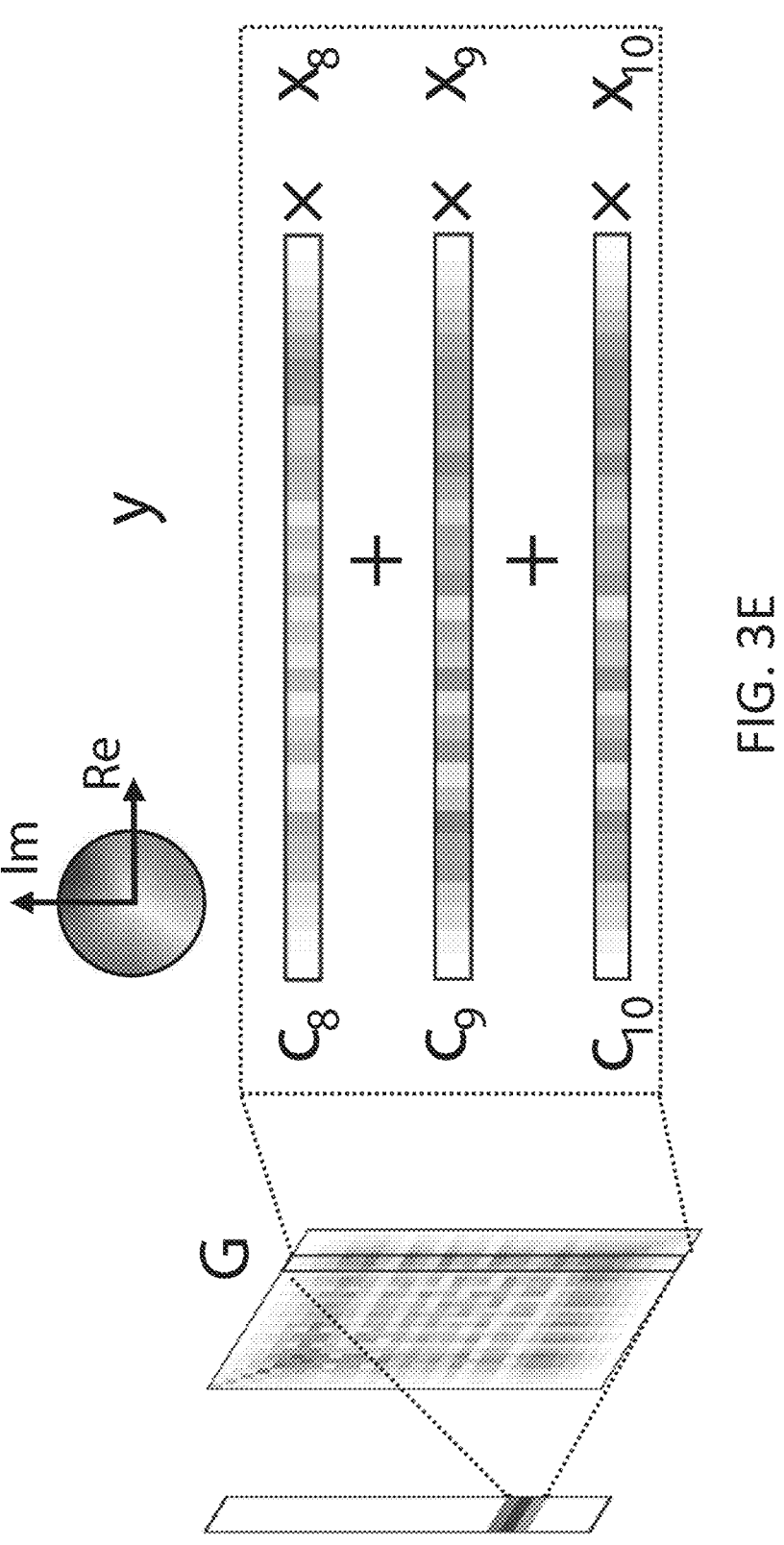
FIG. 3E is a MVM with laser frequency at Δ=9Ω and $M_I$ set with three equal-amplitude components and positive phases on the carrier transmission, according to an embodiment of the present disclosure.
Figure 3F:
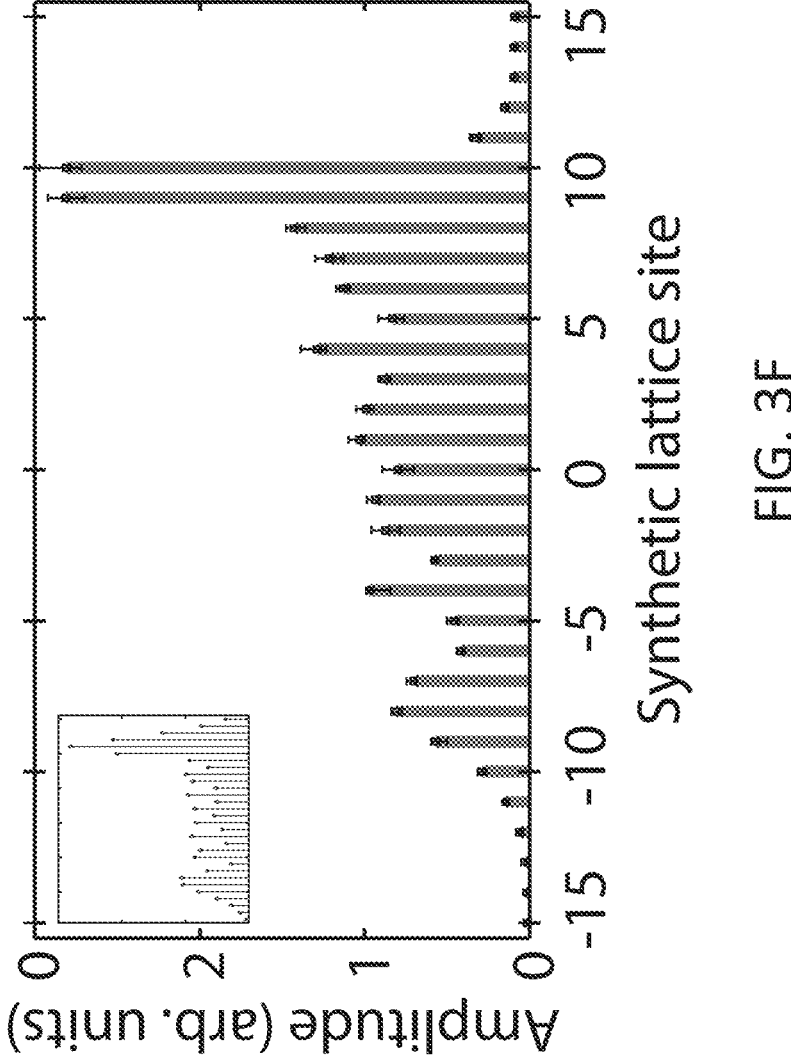
FIG. 3F is measured output amplitudes on the synthetic lattice from the settings in FIG. 3E, according to an embodiment of the present disclosure.
Figure 3G:
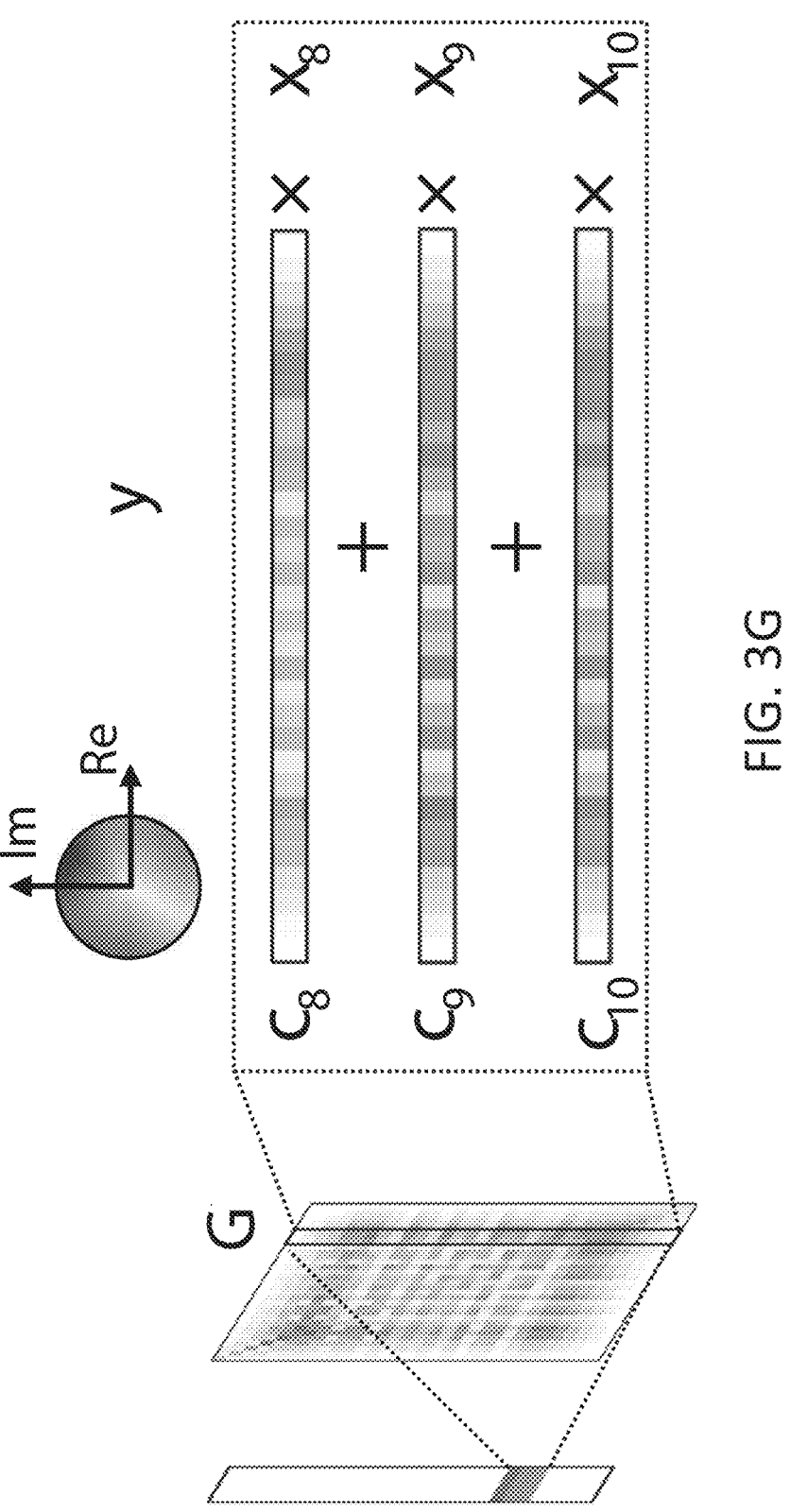
FIG. 3G is a MVM with laser frequency at Δ=9Ω and $M_I$ set with three equal-amplitude components and negative phases on the carrier transmission, according to an embodiment of the present disclosure.
Figure 3H:
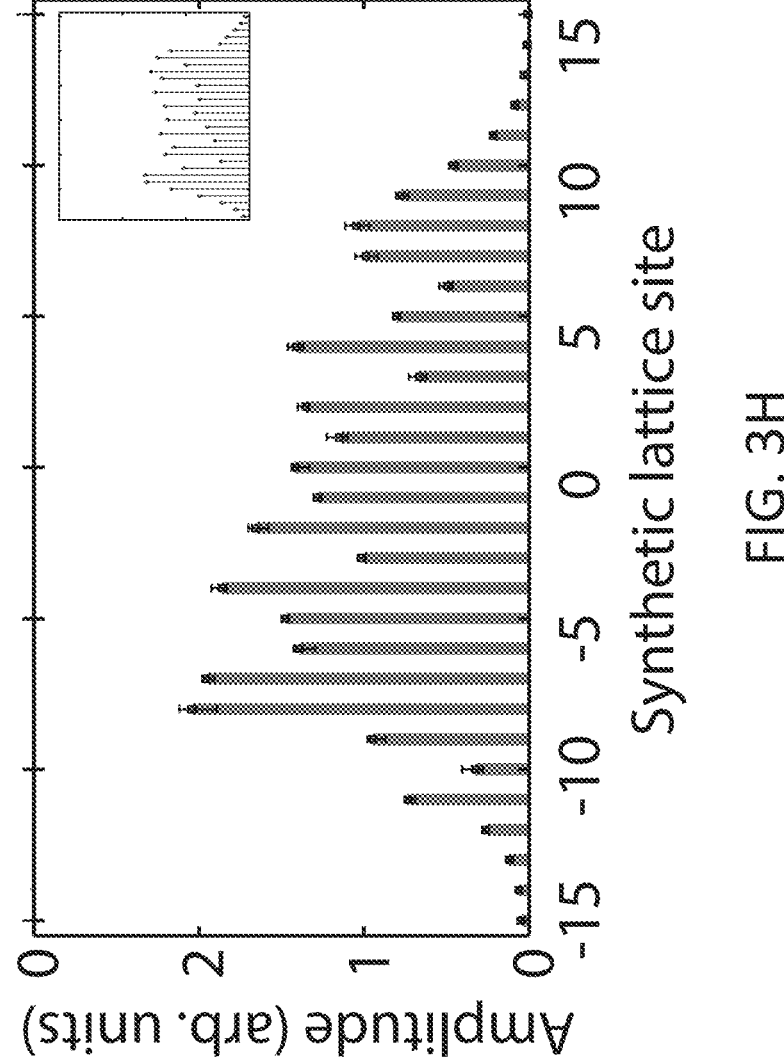
FIG. 3H is measured output amplitudes on the synthetic lattice from the settings in FIG. 3G, according to an embodiment of the present disclosure.

The DC bias can be modulated to generate an input $x = (\ldots, 0, x_{-1}, x_0, x_1, 0, \ldots)^T$, where $|x_0| = |x_1|$ and $\arg(x_0) = -\arcsin(x_1/a_{in})$ (FIG. 3C). The additional component $x_0$ is also coherently scattered to the entire frequency lattice and induces the interference with the pattern formed by $x_{\pm 1}$, leading to an asymmetry in FIG. 3D. To demonstrate the coherence of the full range "edge-to-edge" connections, the laser frequency was aligned to the 9th site ($\Delta = 9\Omega$), and $M_I$ was set to produce an input $x = (\ldots, 0, x_8, x_9, x_{10}, 0, \ldots)^T$ with $|x_8| = |x_9| = |x_{10}|$. The DC bias on $M_I$ was switched between the phase relation of either $\arg(x_9) = \arcsin(x_{10}/d_{in})$ (FIG. 3E) or $\arg(x_9) = -\arcsin(x_{10}/a_{in})$ (FIG. 3G). From the measured output amplitude patterns, observed properties include suppression (FIG. 3F) and revival (FIG. 3H) of the negative-order sites near the opposite edge by only phase-flipping of the carrier transmission, indicating built-in long-range phase coherence with the frequency-domain MVM operations.

Figures 4A, 4B:
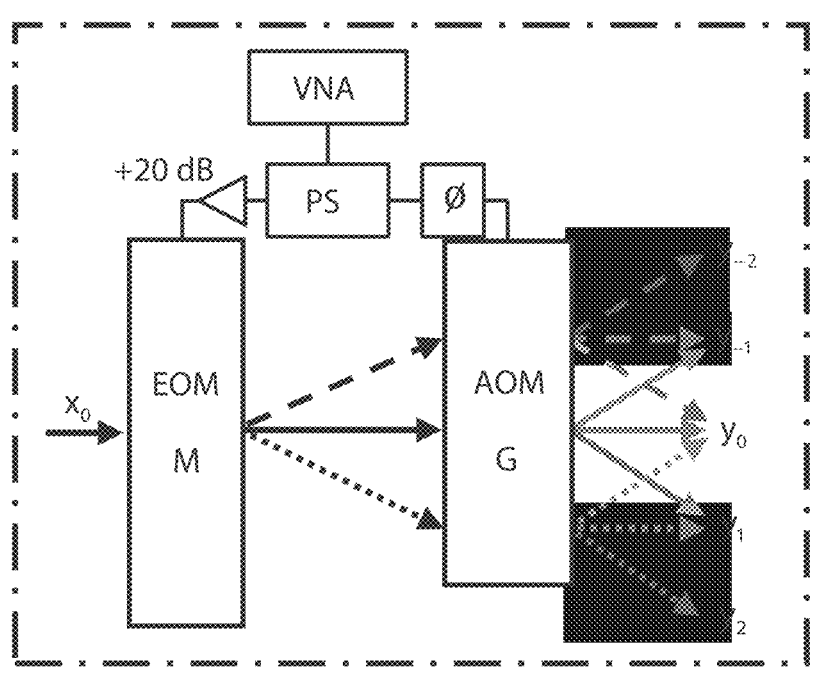
FIG. 4A is a setup of concatenated broadband electro-optic phase modulator (EOM, M) and photonic device (AOM, G) driven by the same vector network analyzer (VNA), wherein a laser input at Δ=0 ($x_0$) goes through the EOM first and then the AOM, $G \cdot M \cdot x_0$, according to an embodiment of the present disclosure.
FIG. 4B is a setup of the concatenation in the reverse order, $M \cdot G \cdot x_0$, according to an embodiment of the present disclosure.
Figure 4C:
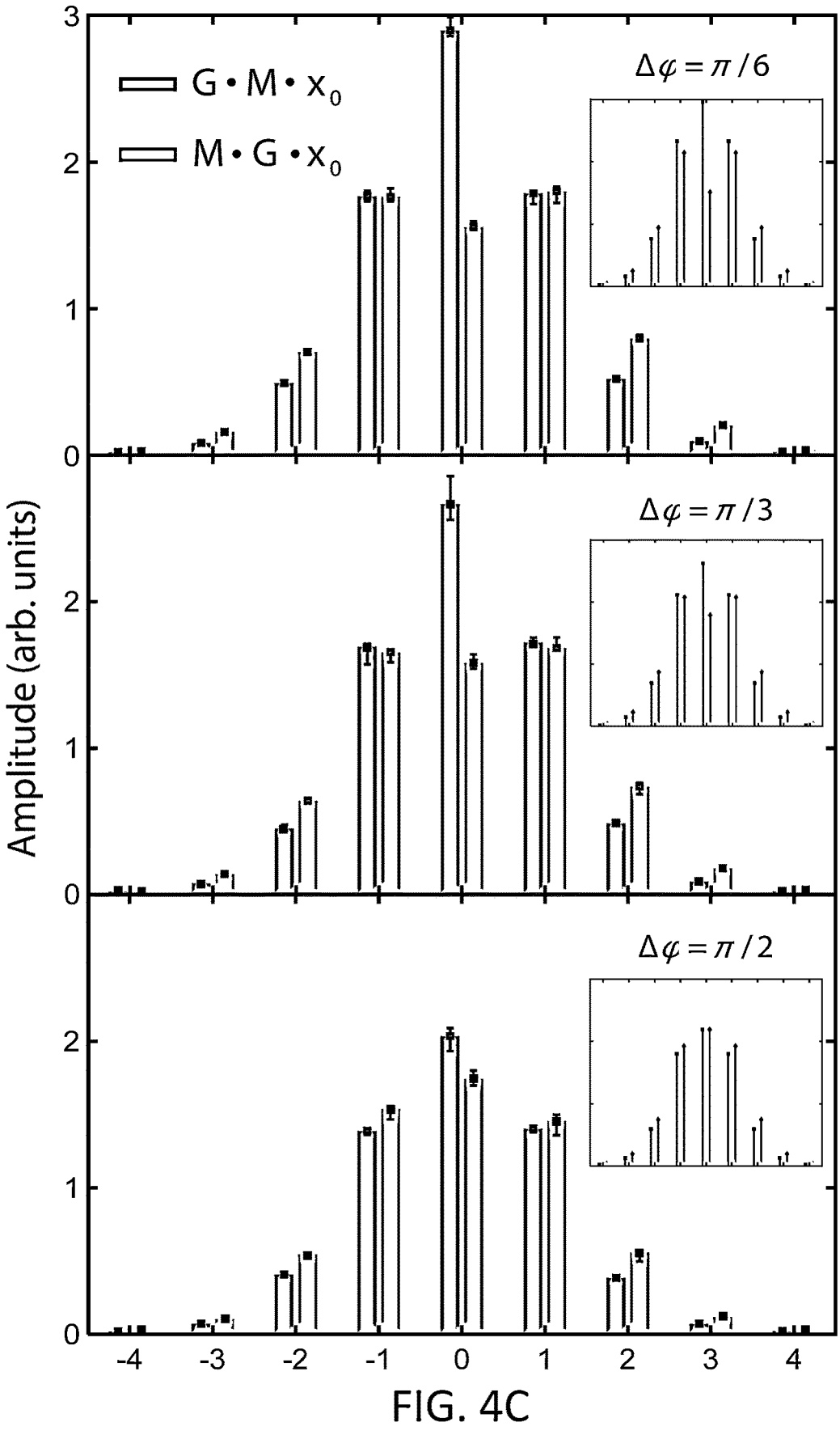
FIG. 4C is a contrast of the output between the two concatenation orders with varying phase Ao at the two modulations, according to an embodiment of the present disclosure.

Referring to FIGS. 4A-4C, in one or more embodiments, concatenated phase modulator networks are shown. In FIGS. 4A-4B, top, middle, and bottom lines emitted from the AOM represent the −1st, 0th (carrier) and 1st harmonic signals generated by the AOM, solid, dotted and dashed lines represent the carrier and +1st sideband signals by the EOM. $Y_k$ denotes the output of the k-th synthetic lattice sites. In an embodiment, PS: RF power splitter; +20 dB: RF amplifier with 20 dB gain; and φ: RF phase shifter. Practical optical computations using integrated photonics require programmability with a high degree of freedom to allow on-chip optimization processes such as backpropagation training in a neural network. For the frequency-domain computing architecture, a straightforward approach to increase independently tunable parameters is to concatenate multiple modulators controlled by separate electronics. To this end, general phase modulations in the full parametric space are effected, including broadband elements, constituting a non-abelian (noncommutative) group $\langle G, \cdot \rangle$, where the concatenation of modulators defines the binary operation "·" with matrix-matrix multiplication. The noncommutativity can manifest as nonreciprocal frequency conversions resulted from the coupling phase anisotropy and the non-unitarity (see Example 11). To demonstrate the feasibility of the concatenation architecture, two elements of the group G, $M \in \langle G, \cdot \rangle$ are implemented with devices of the present disclosure and a broadband electro-optic modulator (EOM), driven by the same microwave tone.

Cascaded devices were prepared in both G·M (FIG. 4A) and M·G (FIG. 4B) orders and the responses were probed with a laser frequency $\Delta = 0$. Since broadband EOMs typically have a low modulation efficiency with $V_\pi$ a at a few volts, RF drive at 2.903 GHz was chosen and a 20-dB amplifier added to the driving arm of the EOM to reach comparable modulation indices. In this scheme, the RF driving phases at both G and M count as independently programmable parameters in addition to the modulation depth. To reflect this increased programmability, a tunable RF phase shifter was used to control the temporal delay between the two modulations. FIG. 4C compares the measured output amplitudes for both the concatenation orders with varying modulation phase delay. Error bars are plotted from 5 measurements. The error bars at the 0th synthetic lattice site are slightly longer than the other sites due to a weak time-varying beating signal in the local oscillator in our heterodyne measurement. Nevertheless, the contrast of the results clearly shows the driving phase control of the noncommutative frequency conversions, featuring non-abelian algebraic structure.

EXAMPLES

Example 1. Example Optical Device Parameters and Fabrication Flow

TABLE 1

| Parameters of the exemplary cavity acousto-optic modulator | | | |
|---|---|---|---|
| Thickness of AlN (nm) | 320 | Thickness of Si (nm) | 220 |
| Thickness of buried oxide (μm) | 3 | Width of waveguide (nm) | 550 |
| Strip height of waveguide (nm) | 150 | Height of Si sleeve (nm) | 70 |
| Periodicity of photonic crystal (nm) | 350 | Depth of holes (nm) | 150 |
| Length of rectangular holes (nm) | 375 | Maximum hole width (nm) | 180 |
| Minimum hole width (nm) | 80 | Number of tapering | 25 |
| Thicknesses of Al electrodes (nm) | 220 | Periodicity of IDT (μm) | 3 |
| Width of IDT finger (nm) | 375 | Total IDT length (μm) | 150 |
| Distance from IDT to waveguide (μm) | 10 | Distance from waveguide to free-edge reflector (μm) | 2.4 |

Figure 10:
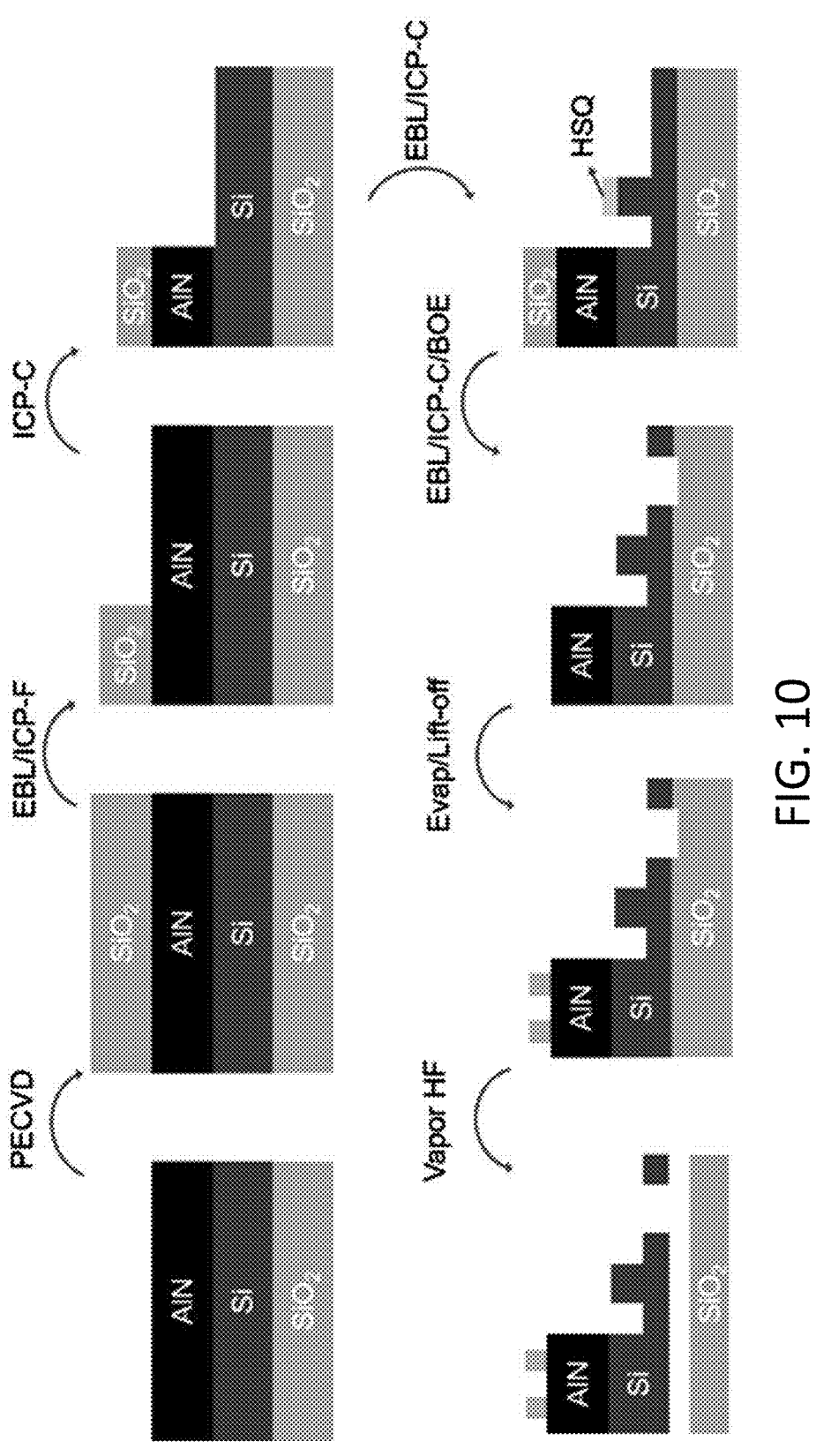
FIG. 10 is a non-limiting illustration of a method of fabricating an AOM, according to an embodiment of the present disclosure.

Referring to FIG. 10, a method of fabrication for a cavity acousto-optic modulator on an AlN-on-SOI platform is described. In one embodiment, plasma-enhanced chemical vapor deposition (PECVD) of an insulator, such as silicon dioxide ($SiO_2$), on a conductive layer, such as AlN, takes place. In an additional embodiment, electron-beam lithography (EBL) and/or fluorine-based inductively-coupled-plasma etching (ICP-F) removes a portion of the top $SiO_2$ layer, exposing a portion of the AlN layer. In an additional embodiment, chlorine-based inductively-coupled-plasma etching (ICP-C) removes a portion of the AlN layer exposed and not covered by the $SiO_2$ layer. In an additional embodiment, EBL and/or ICP-C removes a portion of the silicon (Si) layer. In an additional embodiment, hydrogen silsesquioxane (HSQ) is added to form films. In an additional embodiment, EBL, ICP-C, and/or buffered oxide etchant (BOE) removes the top $SiO_2$ layer, exposing the entire AlN layer. In an additional embodiment, electron-beam evaporation (Evap.) and lift-off produces a plurality of conductive electrodes. In an additional embodiment, vapor hydrofluoric acid (Vapor HF) creates a gap between the Si layer and the bottom $SiO_2$ layer.

Example 2. Analysis of the Piezoelectrically Transduced Mechanical Modes

The IDT patterned on the heterogeneous AlN/Si region is used to resonantly excite multiple mechanical modes, which have very distinct acousto-optic modulation efficiencies on the nanophotonic cavity. To understand the relation between the acousto-optic modulations and these mechanical modes, numerical simulations (COMSOL Multiphysics 5.5) were performed to model the displacement fields in the suspended AlN/Si layer, corresponding to the resonances measured by the IDT Si response. The mechanical modes that are of the interest are the fundamental Lamb mode (large out-of-plane displacement) at ~800 MHz and the fundamental compressional mode (large in-plane displacement) at ~2.9 GHz. Because of the long wavelengths, these two modes strongly couple to the 70-nm Si membrane and the optical nanobeam cavity therefore can induce strong phase modulations. The acousto-optic modulations are characterized by measuring the microwave-to-optical transduction signal $S_{OE}$ and can be used as modes for the frequency-domain matrix-vector multiplications.

The IDT with the split-finger design can also excite higher-order mechanical modes with odd-number modal orders. In the 500 MHz to 8 GHz spectrum, Mode III is the 3rd-order Lamb mode; Mode V is the 5th-order compressional mode; Mode IV is the 3rd-oder Love mode; and Mode VII is the 3rd-oder AlN/Si Lamb-compression hybrid mode. These higher-order modes are associated with significantly reduced wavelengths which increase the mechanical power dissipation and decrease the modal overlap between the mechanical modes and the optical cavity field (so weaker optomechanical coupling). Consequently, the higher-order mechanical modes have negligible acousto-optic phase modulation efficiencies (compared to the fundamental orders) and dominantly contribute to thermo-optic tuning of the optical cavity resonance. In addition, excitations of a symmetric breathing mode (VI) were observed. Although this breathing mode shows a larger piezoelectric transduction efficiency, it does not couple to the acoustic wave in the silicon membrane (in Lamb mode) due to the mismatch of the modal symmetry, therefore has no phase modulation effect.

Example 3. Analytical Solutions to the Intra-Cavity Photon Dynamics

The intra-cavity photon dynamics under the acousto-optic modulation (equation (1)) has explicit solutions when a single microwave tone is applied on the IDT, i.e. $\hat{f}(t)=\cos(\Omega t+\phi)$. The solution provides the insight of the physics under our interrogation. The derivation of the analytical solutions of both the intra-cavity and the output optical fields are provided below.

The dynamics of the modulator can be rewritten with $\hat{f}(t)=\cos(\Omega t+\phi)$ as $$\dot{a}(t)=i\Delta a(t)-i\beta\cdot\Omega\cdot\cos(\Omega t+\phi)a(t)-\kappa a(t)/2+\sqrt{\kappa_{ex}}a_{in}(t), \quad (1)$$

where a(t) and $a_{in}(t)$ are the intra-cavity and input optical fields, respectively; $\kappa$ and $\kappa_{ex}$ denote the total optical cavity decay rate and external coupling rate, respectively; $\Delta=\omega_p-\omega_0$ is the detuning of the input laser angular frequency Op from the cavity center frequency $\omega_0$; $\Omega$, o are the frequency and phase of microwave drive applied to the IDT, respectively; $\beta=2 g_{om}/\Omega$ is the modulation index; and $g_{om}$ is the total optomechanical coupling. By the transformation $a(t)=\alpha(t)\exp[-i\beta \sin(\Omega t+\phi)]$, we obtain $$\dot{\alpha}=(i\Delta-\kappa/2)\alpha+\sqrt{\kappa_{ex}}e^{i\beta \sin(\Omega t+\phi)}a_{in}. \quad (2)$$

Using Jacobi-Anger expansion $$\exp[i\beta \sin(\Omega t+\phi)]=\Sigma_k J_k(\beta)\exp[ik(\Omega t+\phi)], \quad (3)$$

where $J_v(x)$ is the Bessel function of the first kind, equation (2) can be decomposed in Fourier series $\alpha(t)=\Sigma_k\alpha_k\exp(ik\Omega t)$ to obtain $$ik\Omega\alpha_k=(i\Delta-\kappa/2)\alpha_k+J_k(\beta)e^{ik\phi}a_{in}, \quad (4)$$

which leads to $$\alpha_k = e^{ik\phi}J_k(\beta)\frac{a_{in}\sqrt{\kappa_{ex}}}{i(-\Delta + k\Omega) + \kappa/2}. \quad (5)$$

The dynamics of the intra-cavity optical field can then be expressed as $$a(t) = e^{-i\beta\sin(\Omega t+\phi)} \cdot \sum_k \alpha_k\exp(ik\Omega t) \quad (6)$$
$$= \sum_n e^{-in\Omega t} \sum_k J_{n+k}(\beta)J_k(\beta)e^{-in\phi}\frac{\sqrt{\kappa_{ex}}\, a_{in}}{i(-\Delta + k\Omega) + \kappa/2}.$$

The optical output at the exit facet of the end-coupled optical nanobeam cavity can be explicitly calculated as $$a_{out}(t) = \sum_n e^{-i(\omega_p+n\Omega)t} \sum_k J_{n+k}(\beta)J_k(\beta)e^{-in\phi}\frac{\kappa_{ex}a_{in}}{i(-\Delta + k\Omega) + \kappa/2}. \quad (7)$$

At high modulation index $\beta>>0$, the Bessel functions $J_v(\beta)$ are non-vanishing for $v>>1$, leading to large amplitudes at higher order harmonic signals. Hence, the output optical signal for a single-frequency input at Op can be thought of as a compositional baseband of many RF harmonics modulated by the optical carrier frequency $\omega_p$.

Example 4. Boundedness of the Effective Vector Space of the Matrix-Vector Multiplications in the Synthetic Frequency Dimension Providing a bounded vector space when performing matrix-vector multiplications in the synthetic frequency reduces optical energy loss to unwanted sidebands. For cascaded modulator systems that involve only broadband modulators and/or resonating modulators with spectrally uniform modes (such as ring resonators), the vector space will spread out infinitely along the cascaded chain. However, approaches described herein include acousto-optic modulation of a single nanophotonic cavity mode where the coherent frequency conversions occur among a finite number of sidebands bounded near the cavity resonance frequency. The size of the non-trivial vector space, i.e., the number of relevant sidebands that participate in the frequency conversions, can be determined by the boundary of nonzero entries of the optomechanical coupling matrix G (equation (3)), since the zero terms outside the boundary denote the vanishing of the indexed sideband couplings. This boundary is restricted by the modulation index $\beta$, which can be controlled by the driving power.

To understand quantitatively, we notice the coupling coefficient from the n-th sideband to the m-th sideband in the is $$g_{mn} = \sum_k J_{m-n+k}(\beta)J_k(\beta)e^{-i(m-n)\phi}\frac{\kappa_{ex}}{i(k-n)\Omega + \kappa/2}, \quad (8)$$

where $J_v(\beta)$ is the v-th order Bessel function of the first kind. Because of the sideband-resolved resonance feature $(\Omega>\kappa)$, the above summation can be approximated by a relatively few terms around k=n while the other terms vanish. Meanwhile, with finite $\beta$, the value of $J_v(\beta)$ is only non-trivial for the first several orders, that is, the terms in the summation that contribute to the frequency conversion have upper bounds for both k(n) and m−n+k. Hence, the frequency conversions only happen for optical frequencies at a finite number of sidebands (n) near the cavity resonance, and the range of the frequency coupling (m−n) is restricted by the modulation index. These two factors lead to the truncation of the effective vector length in MVM operations. For the same reasons, in a cascaded network of single-resonance modulators, the size of the vector space is also naturally bounded, and is determined by the frequency span (modulation index) at the last modulator of the cascaded chain. Therefore, by controlling the driving power applied to the modulators such that the modulation indices increase along the cascading order, the size of the effective vector space for performing MVM operations can be regulated with a finite basis, while reducing and/or minimizing the optical energy loss to irrelevant sidebands.

Example 5. Experimental Characterization of the Cavity Acousto-Optic Modulator Homodyne and heterodyne measurement schemes were used to characterize the modulation in terms of the microwave-to-optical transduction signal ($S_{OE}$) and the harmonic signal generations (FIGS. 2-4), respectively. Example 5 describes the experimental setup. The interdigital transducer (IDT) was driven by the transmitter port (Port 1) of a calibrated vector network analyzer (VNA) with tunable RF frequency and power output. The optical input was realized by coupling a continuous-wave (CW) laser to the on-chip grating coupler through a polarization-maintained fiber, and the output was collected from the output grating coupler by another aligned fiber. Spectra of the direct-current (DC) transmitted optical power (FIG. 1C, FIG. 2B and FIG. 2C) were measured by switching the optical output from our device to a low-speed photodetector (LPD) while sweeping the laser frequency. The high-frequency components of the transmitted optical signal are interrogated by a square-rule high-speed photodetector (HPD) with a bandwidth of 12 GHz, which down-converts the beating notes of the detected optical signal to corresponding RF voltages.

In the homodyne branch, the acousto-optic frequency shifter (AOFS) was switched off and sent the down-converted signal from the HPD to the receiver port (Port 2) of the VNA. The $S_{21}$ parameter of VNA then measured the HPD-generated RF signal at the driving microwave frequency normalized by the input RF complex amplitude, which is proportional to the first-order optical beating note in $a_{out} \cdot a^*_{out}$, where $a_{out}$ is the output field in equation (7), i.e., $$S_{21} \propto \Sigma_n a_n \cdot a^*_{n-1}. \tag{9}$$

$S_{21}$ assumes a nonzero value when the electromechanically transduced acoustic wave modulates the optical field. It is therefore also named the microwave-to-optical transduction signal ($S_{OE}=S_{21}$). In most of previous works where the modulation index is small (only $a_0$, $a_1$ and $a_{-1}$ are relevant), $S_{OE}$ can be simplified to $S_{OE} \propto a_0 a^*_{-1} + a_1 a^*_0$, which is widely used as the metric to the modulation depth and bandwidth when the laser frequency is tuned at the red sideband ($\Delta=-\Omega$, $S_{OE} \propto a_1$) or the blue sideband ($\Delta=\Omega$, $S_{OE} \propto a^*_{-1}$) for sideband-resolved acousto-optic systems. Another functionality of our homodyne measurements is to identify the center optical resonance frequency $\omega_0$ because $S_{OE}$ equals zero at exactly zero detuning $\Delta=0$ and has a large gradient in the vicinity. Traces of the $|S_{21}|$ center local minimum can be used to characterize the thermo-optic shift induced by the acoustic wave. For our acousto-optic modulator with high modulation index, however, $S_{OE}$ is a complicated composition contributed from the frequency conversions between the adjacent sidebands, and therefore cannot fully characterize the dynamic phase modulation.

This necessitates the heterodyne measurements that can spectrally resolve all the harmonic signals received by the HPD.

In the heterodyne branch, the AOFS was driven at an angular frequency $\omega_\mu=(2\pi)\cdot103$ MHz, which shifts the optical frequency of the local oscillator (LO) to $\omega_\mu+\omega_p$. When combined with the optical output from our acousto-optic modulator, the signal received at the HPD can be written as (by ignoring the high frequency components)

$$U_{hetero} \propto \tag{10}$$
$$\left( c_0 e^{-i(\omega_p+\omega_\mu)t} + \sum_n a_n e^{-i(\omega_p+n\Omega)t} \right)\left( c_0 e^{-i(\omega_p+\omega_\mu)t} + \sum_n a_n e^{-i(\omega_p+n\Omega)t} \right)^*.$$

The down-converted RF voltage contains the frequency components at $\omega_\mu-n\Omega$ which have the amplitudes proportional to the corresponding n-th harmonic signals in the optical output by a factor of the LO amplitude $h_0$, i.e.

$$|u_{\omega_p,n\Omega}| \propto h_0 |a_n|. \tag{11}$$

Therefore, by mapping out all the RF frequency components in a real-time spectrum analyzer (RSA), the amplitudes of the harmonic generations induced by the acousto-optic modulation can be captured. The heterodyne measurements were used to obtain the experimental results in FIG. 2D, FIG. 2E, FIGS. 3A-3H, and FIGS. 4A-4C.

Example 6. RF Spectra of the Microwave-to-Optical Transduction

Homodyne measurements were used to characterize the spectrum of the acousto-optic modulation and the associated thermo-optic shift for the RF drive at varying RF tone. Example 6 describes the spectrum of the measured microwave-to-optical transduction signal at the mechanical resonances, including the prominent fundamental Lamb mode and compressional mode. The acoustic resonator formed by the free-edge reflector gives rise to a series of resonances in the IDT bandwidth. By mapping out the RF spectrum of $S_{OE}$, on-resonance microwave tones were identified that can induce efficient modulation for each mechanical mode. The laser frequency was swept around the intrinsic nanophotonic cavity resonance to probe $S_{OE}$ at all sidebands.

For the fundamental Lamb mode excitation at ~800 MHz, $S_{OE}$ was observed at multiple resolved sidebands even at a low RF power of −16 dBm. In particular, the 803 MHz drive with an RF bandwidth of 1.3 MHz induces a significantly increased number of sidebands, consistent with the most pronounced electromechanical conversion efficiency measured from $S_{11}$. This RF tone thus facilitates the resonantly enhanced acousto-optic modulation, demonstrating scalable MVM at a large-scale synthetic frequency lattice. The minimum at zero laser frequency detuning indicates a constant optical center resonance frequency (no pronounced thermo-optic shift) at the −16 dBm RF power. For the fundamental compressional mode excitation at ~2.9 GHz, the highest modulation efficiency is achieved at 2.903 GHz, where the optical mode overlaps with the anti-node of the acoustic resonator. The 2.935 GHz resonance has a weaker modulation because the optical mode primarily overlaps with the node of the mechanical standing wave. The acoustic resonances in this frequency range are subject to more mechanical power dissipation, evidenced by the increased linewidth of 7.5 MHz. As a result, a substantial red shift of the optical center resonance frequency can be observed at the RF power of −6 dBm. As mentioned in Example 2, other higher-order mechanical modes have much reduced modulation efficiency. As an example, a spectrum of $S_{OE}$ for the 5th-order compressional mode is described, which is barely measurable even at the RF power of 0 dBm. Excitations of higher-order mechanical modes, while contributing negligibly to the dynamic phase modulation, can function as thermo-optic resonance tuning, beneficial for aligning the operation frequencies in concatenated modulator networks.

Example 7. Determining the Modulation Index from the Spectra of Optical Transmittance One of the consequences of the high acousto-optic modulation index is the generation of multiple sidebands in the optical transmission spectrum. In a sideband resolved system, the modulation index can be extracted by fitting the measured spectral features of the split sidebands. Exemplary fitting results under single microwave tone drives at 2.903 GHz and 803 MHz are provided.

The theoretical values of the DC transmittance can be derived from equation (7) and takes the form $$\langle a_{out} \cdot a_{out}^* \rangle = \sum_n \left| J_n(\beta) \frac{\kappa_{ex} a_{in}}{i(-\Delta + n\Omega) + \kappa/2} \right|^2. \tag{12}$$

Equation (12) can be used to fit the measured spectra of the optical transmittance at varying RF driving power (FIGS. 2B-2C), where the parameters $\kappa$, $\kappa_{ex}$, $\neq$, $a_{in}$ were fixed and only the modulation index $\beta$ is varied to reproduce the spectral features. Example 7 describes the fit of a transmittance spectrum at $\Omega=2.903$ GHz and 2 dBm RF power. From the agreement between the measured and calculated spectra, modulation index $\beta=2.15$.

For large modulation depth observed at $\Omega=803$ MHz, the transmission eigenstate distributes to all of the sidebands spanning a wide spectral range and is superposed into the non-uniform background transmission. A good characterization of the spectral features can be observed from fit parameter 8. Example 7 describes the fit of the measured transmittance spectrum at $\Omega=803$ MHz and $-7$ dBm RF power. This corresponds to the maximum modulation index of $8=22.9$ obtained before the onset of electromechanical nonlinearity, where the modulation index ceases to increase proportional to the square-root of the RF power.

Example 8. Optical Spectra of the High-Order Harmonic Signal Generations

The heterodyne measurement setup was used to characterize all the harmonic signal generations whose amplitudes are proportional to the corresponding frequency components in the converted RF voltage at the HPD. The theoretical results of the n-th harmonic amplitude is $$|a_n| = \sum_k J_{n+k}(\beta) J_k(\beta) \left| \frac{\kappa_{ex} a_{in}}{i(-\Delta + k\Omega) + \kappa/2} \right|. \tag{13}$$

As we show in Eq. (10), the n-th harmonic amplitudes can be experimentally characterized by measuring the heterodyne beating note at the frequency $\omega_\mu - n^\circ \Omega$ (with a factor determined by the LO intensity). The accuracy of heterodyne characterizations are described in Example 8, showing the agreement of the measured spectrum of the first-order beating note with the theoretical result by equation (12), where $\Omega=2.903$ MHz and the RF power is $-2.5$ dBm ($\beta=1.29$).

The characterization scheme also works for large modulation indices observed at $\Omega=803$ MHz. Within the HPD bandwidth (12 GHz), Example 8 describes examples of the fit to demonstrate that harmonic signals can be read out with high fidelity ($\beta=6.90$).

Example 9. Driving Phase Dependence of Matrix-Vector Multiplications

The optomechanical coupling matrix represented by equation (3) has a dependence on the phase of the RF drive applied on the IDT. Example 9 displaces the theoretically calculated dependence on the modulation phase $\phi$ when the device is driven at 803 MHz and with $\beta=11.3$. While this phase variation maintains the amplitudes of the site-to-site couplings ($|g_{mn}|$), a strong phase anisotropy in $g_{mn}$ can be observed, which leads to very different MVM outputs for spectrally coherent vector input. Specifically, for $\phi=0$, the adjacent columns of G have minimum phase contrast, while the long-range coupling phases are considerable. Therefore, in phase-coherent MVM demonstrations (FIG. 3), $\phi=0$ to emphasize the persistence of the phase information of the long-range couplings.

Example 10. Measuring the Output of the MVM Operations on the Synthetic Frequency Lattice The output amplitude at each frequency site, resulted from the MVM operations (FIG. 3), was interrogated by the heterodyne measurements as described in Example 5. The experimental setup for the large-scale MVM operations is described in Example 10. The LO frequency $\omega_p + \omega_\mu$ is controlled by the tunable CW laser. When $\omega_p$ is set at one of the frequency sites ($\Delta=s\Omega$), the amplitude of the harmonic signal $|a_t|$ captured by the spectrum analyzer then corresponds to the amplitude at the synthetic lattice site of the order $s+1$. Therefore, output amplitudes at the synthetic frequency lattice were read out by measuring all non-vanishing harmonic signals. With a photodetector bandwidth of 12 GHz, up to 15th-order harmonic signals were interrogated with high fidelity. Harmonic signals at orders above 15 are subject to decreased detection efficiencies, which set an effective upper bound for the size of the synthetic lattice in experimental demonstrations. By using a photodetector with higher bandwidth (>40 GHz), systems of the present disclosure can experimentally realize coherent 50×50 MVM operations with high-fidelity readout.

Example 11. Interrogating the Noncommutativity of Concatenated Modulators

Example 11 describes the experimental setup for concatenation of exemplary nanophotonic cavity acousto-optic modulator (G) with a fiber-coupled broadband electro-optic phase modulator (M), in both G·M and M·G orders. It was assumed that the modulation phases of the RF drives G and M are $\phi_1$ and $\phi_2$, and the optical delay between the two modulators is $\tau$. Under the same RF driving tone $\Omega$, the modulation waveforms for the M·G order are $$\begin{cases} \hat{f}_M(t) = \cos(\Omega t + \phi_2) \\ \hat{f}_G(t) = \cos[\Omega(t + \tau) + \phi_1] \end{cases}, \tag{14}$$

whereas for the reverse order (G·M), the modulation waveforms are $$
\begin{cases}
\hat{f}'_M(t) = \cos[\Omega(t+\tau)+\phi'_2] \\
\quad \hat{f}'_G(t) = \cos(\Omega t + \phi'_1)
\end{cases}
\tag{15}
$$

The modulation phase differences are defined using the expressions:

$$\Delta\phi = \arg\{\hat{f}_G(t)\} - \arg\{\hat{f}_M(t)\} = \Omega\tau + \phi_1 - \phi_2 \text{ and}$$

$$\Delta\phi = \arg\{\hat{f}_G'(t)\} - \arg\{\hat{f}_{M'}(t)\} = \phi_1' - \phi_2' - \Omega\tau.$$

In experiments, modulation phases were controlled $\phi_1 - \phi_2$ ($\phi_1' - \phi_2'$) by the RF phase shifter with a tunable phase range $[0, 2\pi]$. The optical phase delay $\tau$ was controlled to unify the two modulation phase differences associated with the two concatenation orders, by comparing the phase dependences of output amplitudes with the theoretical values.

To understand the noncommutativity of the non-abelian group formed by cascaded phase modulators, matrix-matrix multiplications between M: $[m_{kl}]$ and G: $[g_{kl}i]$ were analyzed. The matrix of a broadband modulator is tri-diagonal represented by the carrier transmission on the diagonal entries $m_{kk}$ and the two opposite-sign sideband generations $m_{k(k-1)}$ and $m_{k(k+1)}$ on the off-diagonal entries ($\phi_2=0$). The matrix of exemplary acousto-optic modulators is represented by equation (3). For simplicity of the analytical calculations, a moderate modulation index is assumed that only produces 1st order harmonics ($|k-l|<2$). With a laser input at $\Delta=0$, the resulted output vector through $y=G\cdot M\cdot x_0$ can be expressed as $$y_{-2} = m_{-1,0}g_{-2,-1}$$

$$y_{-1} = m_{0,0}g_{-1,0} + m_{-1,0}g_{-1,-1}$$

$$y_0 = m_{-1,0}g_{0,-1} + m_{0,0}g_{0,0} + m_{1,0}g_{0,1}.$$

$$y_1 = m_{0,0}g_{1,0} + m_{1,0}g_{1,1}$$

$$y_2 = m_{1,0}g_{2,1}
\tag{16}$$

For comparison, the output vector through $y'=M\cdot G\cdot x_0$ is $$y_{-2}' = m_{-1,0}g_{-2,-1}$$

$$y_{-1}' = m_{0,0}g_{-1,0} + m_{-1,0}g_{-1,-1}$$

$$y_0' = m_{-1,0}g_{0,-1} + m_{0,0}g_{0,0} + m_{1,0}g_{0,1}.$$

$$y_1' = m_{0,0}g_{1,0} + m_{1,0}g_{1,1}$$

$$y_2' = m_{1,0}g_{2,1}
\tag{17}$$

Using $m_{k(k+1)} = -m_{k(k-1)} = m$, $m_{l(l+1)} = m_{k(k\pm1)}$ and $m_{kk}=m_{ll}$, we obtain $\Delta y = (G\cdot M - M\cdot G)\cdot x_0$, where $$\Delta y_{-2} = m(g_{-2,-1} - g_{-1,0})$$

$$\Delta y^{-1} = m(g_{-1,-1} - g_{0,0})$$

$$\Delta y_0 = m(g_{0,-1} + g_{-1,0} - g_{1,0} - g_{0,1}).$$

$$\Delta y_1 = -m(g_{1,1} - g_{0,0})$$

$$\Delta y_2 = -m(g_{2,1} - g_{1,0})
\tag{18}$$

From here, we can attribute the arising of the noncommutativity to two aspects of the optomechanical coupling matrix of our modulator: 1) unlike the broadband EOM, the transmission through the modulated nanophotonic cavity at the center frequency $g_{0,0}$ is significantly different than that from the sidebands ($g_{1,1}$ and $g_{-1,-1}$), i.e. the non-unitarity, associated with the synthetic lattice of our resonating acousto-optic modulator, therefore $\Delta y_{\pm1}$ are generally non-trivial and are more pronounced at larger transmission difference; 2) as explained in Example 9, the two-way frequency conversions between a pair of sidebands ($g_{kl}$ and $g_{lk}$) are highly phase-anisotropic and have a strong dependence on the driving phase $\phi$, which result in non-vanishing contrast at the center-frequency component ($\Delta y_0$) of the output. While exemplary results involve a broadband and a resonating phase modulators, it is noted that these two factors provide for noncommutativity of the cascaded phase modulator group with the full parametric space of ($\beta$, $\Omega$, $\phi$, $\omega_0$, $\kappa$, $\kappa_{ex}$).

Example 12. Enhancing Programmability of the Frequency-Domain Matrix-Vector Multiplication Using Modulation Waveform Shaping A high degree of programmability in matrix-vector multiplications is important for practical optical computation. In addition to cascading modulators, another approach that can enhance the programmability of the frequency-domain MVM is to synthesize flexible periodic acousto-optic modulation waveform from harmonic acoustic wave activations.

To see how an arbitrary periodic acoustic waveform controls the optomechanical coupling matrix, it is assumed that devices of the present disclosure are modulated by an acoustic wave with a fundamental angular frequency 22 as $$\hat{f}_{wave}(t+2\pi/\Omega) = \hat{f}_{wave}(t) = \Sigma_v s_v \cos(v\Omega t + \phi_v),
\tag{19}$$

where $s_v$, $\phi_v$ are the normalized amplitude and phase of the harmonic tone at $v\Omega$, respectively. Under this modulation waveform, the intra-cavity photon dynamics reads $$a(t) = i\Delta a(t) - i\beta \cdot \Omega \cdot \Sigma_v \hat{s}_v \cos(v\Omega t + \phi_v)a(t) - \kappa a(t)/2 + \sqrt{\kappa_{ex}} a_{in}(t),
\tag{20}$$

where $\hat{s}_v = s_v \cdot v\beta_v/\beta$ is the modulation weight of the $v\Omega$ tone, and $\beta_v$ is the corresponding modulation index at $v\Omega$ ($\beta_1=\beta$). Similar to the solution in Example 3, using the transformation $$a(t) = \alpha(t) \cdot \exp\left[-i\beta\sum_v \frac{\hat{s}_v}{v}\sin(v\Omega t + \phi_v)\right],
\tag{21}$$

and rewriting equation (20) as $$\dot{\alpha} = (i\Delta - \kappa/2)\alpha + \sqrt{\kappa_{ex}}\, e^{-i\beta\sum_v \frac{\hat{s}_v}{v}\sin(v\Omega t + \phi_v)} a_{in}.
\tag{22}$$

For simplicity of the analytical expression, the Fourier series of the Jacobi-Anger expansion is written as $$\exp\left[i\beta\sum_v \frac{\hat{s}_v}{v}\sin(v\Omega t + \phi_v)\right] =$$

$$\prod_v\left[\sum_k J_k(\hat{s}_v\beta/v)e^{ik(v\Omega t + \phi_v)t}\right] \equiv \sum_k x_k(\{s_v\}, \{\phi_v\})e^{ik\Omega t}.
\tag{23}$$

With $\alpha(t)=\Sigma_k\alpha_k\ \exp(ik\Omega t)$, the expression for $ik\Omega\alpha_k$ becomes $$ik\Omega\alpha_k = (i\Delta - \kappa/2)\alpha_k + x_k(\{s_v\}, \{\phi_v\})a_{in}, \tag{24}$$

and $$\alpha_k = x_k(\{s_v\}, \{\phi_v\})\frac{a_{in}\sqrt{\kappa_{ex}}}{i(-\Delta + k\Omega) + \kappa/2}. \tag{25}$$

The intra-cavity photon dynamics and the output optical field are derived as, respectively, $$a(t) = e^{-i\beta\Sigma_v\frac{s_v}{v}\sin(v\Omega t + \phi_v)} \cdot \sum_k \alpha_k \exp(ik\Omega t) \tag{26}$$

$$= \sum_n e^{-in\Omega t} \sum_k x_{n+k}(\{s_v\}, \{\phi_v\}) \cdot x_k(\{s_v\}, \{\phi_v\})\frac{\kappa_{ex}a_{in}}{i(-\Delta + k\Omega) + \kappa/2},$$

$$a_{out}(t) = \tag{27}$$

$$\sum_n e^{-i(\omega_p + n\Omega)t} \sum_k x_{n+k}(\{s_v\}, \{\phi_v\}) \cdot x_k(\{s_v\}, \{\phi_v\})\frac{\kappa_{ex}a_{in}}{i(-\Delta + k\Omega) + \kappa/2}.$$

The optomechanical coupling matrix corresponding to the modulation waveform is therefore $$G = [g_{m,n}] : g_{m,n} = \tag{28}$$

$$\sum_k x_{m-n+k}(\{s_v\}, \{\phi_v\}) \cdot x_k(\{s_v\}, \{\phi_v\})\frac{\kappa_{ex}}{i(-n + k)\Omega + \kappa/2}.$$

Changing of the periodic modulation waveform is equivalent to the control of the coefficients $s_v$ and $\phi_v$ for each harmonic tone, which in turn alters the entries of the coupling matrix G in equation (28). It is therefore understood that MVM operations can be programmed by the modulation waveform shaping, where the number of independent variables increases as 2N for a synthesized waveform comprising N harmonic tones.

Experimentally, realizing more flexible modulation waveform in the acousto-optic modulator requires efficient actuation of the acoustic modes at multiple harmonic frequencies and accurate controls of their amplitudes and phases. To this end, many technical advances have been made to successfully generate multi-harmonic acoustic waves and synthesize arbitrary acoustic waveform by designs of the electromechanical transducer. For example, systems using frequency-chirped interdigital transducers (IDT) to generate up to N=5 harmonic tones of acoustic modes can be applied on the heterogeneous integrated platforms of the present disclosure to enable the conversions of the RF drive into acoustic tones. Additionally, amplitudes and phases of the harmonic acoustic waves can also be programmed by the RF drive from an arbitrary waveform generator (AWG).

Example 13. Applications of Frequency-Domain MVM in an Optical Neural Network Referring to FIGS. 11A-11C, a non-limiting example of a simulation of an optical multilayer perceptron neural network that incorporates frequency-domain MVM is described. Benefiting from the synthetic frequency dimension (sideband space), nanophotonic cavity acousto-optic modulators fulfilled large-scale linear complex-valued matrix-vector multiplications (MVM) in a hardware-efficient way, thus representing an advance of optical computing systems such as optical neural networks. To demonstrate such a prospect, a design and simulation of a multilayer perceptron neural network for image recognition and classification were completed, where the computationally intensive linear MVM operations were performed in the synthetic frequency dimension using devices of the present disclosure.

Pixelated images are first color-mapped into rows of complex-valued vectors and encoded on the basis of the optical sidebands. The fully connected linear MVM layer was physically implemented by an array of modulators connected in parallel (beam-splitting) and/or series (cascading) (lower inset, FIG. 11A), which composed the total matrix operator in the synthetic frequency dimension $$G=\Sigma_q w_q(\phi_p G_p{}^q),$$

where $w_v$ are the weights of the modulator series branches controlled by the beam splitting, $G_p{}^q$ is the coupling matrix of the indexed modulator, p and q are the indices of the modulators in series and in parallel, respectively. The vectors after the MVM are subsequently activated by a nonlinear function F(x) and sent to a pooling layer which yields the output of the network.

In simulations, the network was trained and deployed for recognition of handwritten digits using the standard MNIST database. The 28×28, 8-bit grayscale images of handwritten digits were encoded in 28 vectors of size 28×1 and fed into the input layer column by column. To prove the concept, the MVM layer was designed with three copies of our acousto-optic modulators in parallel (p=1, q=1,2,3) and each input vector was split into three paths with the weights $w_1$, $w_2$, $w_3$. The modulation index for each modulator was set around 10 to realize the 28×28 fully connected layer. The results of the MVM were read out, applied to a nonlinear activation function (sigmoid) and to the pooling layers. The output vectors of the network were compared with the prediction which defines the loss function. During the training process, the beam-splitting weights ($w_1$, $w_2$, $w_3$), modulation indices and phases of the three parallel modulators and the pooling layers were optimized, such that the loss function was minimized. Example 11 describes the decrease of the loss function as the training process evolves with epochs. Iteration of the process for all digits from "0" to "9" reached an accuracy over 90% in simulation (Example 11). It is noted that the 28×28 matrix operator has enough trainability to carry out image recognitions in simulations is realized by three copies of the simulated device, demonstrating the improvement of performance in devices of the present disclosure as compared to optical computation techniques.

The complete disclosure of all patents, patent applications, and publications, and electronically available material cited herein are incorporated by reference in their entirety. Materials referenced in publications (such as tables, figures, materials and methods, and/or experimental data) are likewise incorporated by reference in their entirety. In the event that any inconsistency exists between the disclosure of the present application and the disclosure(s) of any document incorporated herein by reference, the disclosure of the present application shall govern. The foregoing detailed description and examples have been given for clarity of understanding only. No unnecessary limitations are to be understood therefrom. The disclosure is not limited to the exact details shown and described, for variations obvious to one skilled in the art will be included within the disclosure defined by the claims.

The description of embodiments of the disclosure is not intended to be exhaustive or to limit the disclosure to the precise form disclosed. While the specific embodiments of, and examples for, the disclosure are described herein for illustrative purposes, various equivalent modifications are possible within the scope of the disclosure.

Specific elements of any foregoing embodiments can be combined or substituted for elements in other embodiments. Moreover, the inclusion of specific elements in at least some of these embodiments may be optional, wherein further embodiments may include one or more embodiments that specifically exclude one or more of these specific elements. Furthermore, while advantages associated with certain embodiments of the disclosure have been described in the context of these embodiments, other embodiments may also exhibit such advantages, and not all embodiments need necessarily exhibit such advantages to fall within the scope of the disclosure.

As used herein and unless otherwise indicated, the terms "a" and "an" are taken to mean "one", "at least one" or "one or more". Unless otherwise required by context, singular terms used herein shall include pluralities and plural terms shall include the singular.

Unless the context clearly requires otherwise, throughout the description and the claims, the words 'comprise', 'comprising', and the like are to be construed in an inclusive sense as opposed to an exclusive or exhaustive sense; that is to say, in the sense of "including, but not limited to". Words using the singular or plural number also include the plural and singular number, respectively. Additionally, the words "herein," "above," and "below" and words of similar import, when used in this application, shall refer to this application as a whole and not to any particular portions of the application.

Unless otherwise indicated, all numbers expressing quantities of components, molecular weights, and so forth used in the specification and claims are to be understood as being modified in all instances by the term "about." Accordingly, unless otherwise indicated to the contrary, the numerical parameters set forth in the specification and claims are approximations that may vary depending upon the desired properties sought to be obtained by the present disclosure. At the very least, and not as an attempt to limit the doctrine of equivalents to the scope of the claims, each numerical parameter should at least be construed in light of the number of reported significant digits and by applying ordinary rounding techniques.

Notwithstanding that the numerical ranges and parameters setting forth the broad scope of the disclosure are approximations, the numerical values set forth in the specific examples are reported as precisely as possible. All numerical values, however, inherently contain a range necessarily resulting from the standard deviation found in their respective testing measurements.

All headings are for the convenience of the reader and should not be used to limit the meaning of the text that follows the heading, unless so specified.

All of the references cited herein are incorporated by reference. Aspects of the disclosure can be modified, if necessary, to employ the systems, functions, and concepts of the above references and application to provide yet further embodiments of the disclosure. These and other changes can be made to the disclosure in light of the detailed description.

It will be appreciated that, although specific embodiments of the disclosure have been described herein for purposes of illustration, various modifications may be made without deviating from the spirit and scope of the disclosure. Accordingly, the disclosure is not limited except as by the claims.

The embodiments of the invention in which an exclusive property or privilege is claimed are defined as follows:

1. An optical computation system, the system comprising:
   a substrate;
   an optical layer coupled to a first portion of the substrate, the optical layer comprising:
   a free-standing portion suspended shaped and positioned to define a gap between the free-standing portion of the optical layer and the substrate;
   a rib waveguide comprising a photonic crystal formed in the free-standing portion; and
   a piezoelectric transducer mechanically coupled to the free-standing portion, wherein an actuation of the piezoelectric transducer generates an acoustic wave localized in the substrate;
   a controller comprising a memory and one or more processors, wherein the controller is operably connected to the piezoelectric transducer, wherein the memory comprises computer-executable instructions stored thereon that, if executed by the one or more processors, cause the system to perform:
   inputting, with light from a light source, an optical signal to the rib waveguide during the actuation of the piezoelectric transducer; and
   outputting an output signal based on an interaction of the optical signal and the acoustic wave in the photonic crystal, wherein the output signal corresponds to a result of a matrix operation applied to one or more frequency-space components of the optical signal.

2. The system of claim 1, further comprising an input photodetector, wherein the input photodetector is coupled to an end of the rib waveguide.

3. The system of claim 2, wherein the inputting comprises detecting the optical signal via the input photodetector.

4. The system of claim 1, further comprising an output photodetector, wherein the output photodetector is coupled to an end of the rib waveguide.

5. The system of claim 4, wherein the outputting comprises detecting the interaction between the optical signal and the acoustic wave in the photonic crystal via the output photodetector.

6. The optical computation system of claim 1, wherein the piezoelectric transducer comprises an interdigital transducer (IDT) disposed overlying the optical layer.

7. The optical computation system of claim 6, further comprising a power source, wherein the IDT is resonantly excited by the power source.

8. The optical computation system of claim 6, wherein the plurality of conductive electrodes of the IDT comprises a period, wherein excitation of the plurality of the conductive electrodes occurs at one or more frequencies where an angular frequency ($\Omega$) of the frequencies is greater than a total optical cavity decay rate (K) of the optical layer.

9. The optical computation system of claim 1, further comprising a free-edge reflector disposed on a side of the optical layer opposite the rib waveguide.

10. The optical computation system of claim 9, wherein the free-edge reflector is configured to be reverberated on a plane relative to the side.

11. The optical computation system of claim 1, wherein the piezoelectric transducer comprises an aluminum nitride (AlN) layer disposed overlying the optical layer.

12. The optical computation system of claim 1, wherein the photonic crystal defines a plurality of recesses in the rib waveguide, a recess of the plurality of recesses being characterized by a width.

13. The optical computation system of claim 1, wherein the photonic crystal defines a plurality of recesses in the rib waveguide, a recess of the plurality of recesses being characterized by a length.

14. The optical computation system of claim 1, further defining a gap between the piezoelectric transducer and the rib waveguide, the gap characterized by a width.

15. The optical computation system of claim 1, wherein the rib waveguide is characterized by a strip height.

16. The optical computation system of claim 1, further comprising a grating coupler optically coupled to an end of the optical layer.

17. The optical computation system of claim 16, wherein the grating coupler is a first grating coupler, further comprising a second grating coupler, wherein the end is a first end, and the optical layer further comprises a second end opposite to the first end, wherein the first grating coupler is coupled to the first end, and the second grating coupler is coupled to the second end.

18. The optical computation system of claim 17, wherein the first grating coupler is an input coupler coupled to the first end, configured to receive an optical input from a coherent light source, and the second grating coupler is an output coupler coupled to the second end, configured to produce an optical output to an optical collection device.

19. A method of optical computation, the method comprising:

actuating a piezoelectric transducer of an optical layer coupled to a substrate at a first portion, the optical layer comprising:

a free-standing portion suspended shaped and positioned to define a gap between the free-standing portion of the optical layer and the substrate;

a rib waveguide comprising a photonic crystal formed in the free-standing portion, wherein the actuating the piezoelectric transducer generates an acoustic wave localized in the substrate; and the piezoelectric transducer mechanically coupled to the free-standing portion;

inputting, with light from a light source, an optical signal during the actuation of the piezoelectric transducer; and outputting an output signal based on an interaction of the optical signal and the acoustic wave in the photonic crystal, wherein the output signal corresponds to a result of a matrix operation applied to frequency-space components of the optical signal.

* * * * *